US006135089A

United States Patent [19]

Shibagaki

[11] Patent Number: 6,135,089

[45] Date of Patent: Oct. 24, 2000

[54] METHOD OF CONTROLLING AN AIR-FUEL RATIO OF AN ENGINE

[75] Inventor: Nobuyuki Shibagaki, Toyota, Japan

[73] Assignee: Toyota Jidosha Kabushiki Kaisha, Toyota, Japan

[21] Appl. No.: 09/495,179

[22] Filed: Feb. 1, 2000

Related U.S. Application Data

[62] Division of application No. 08/992,342, Dec. 17, 1997.

[30] Foreign Application Priority Data

| | | | |
|---|---|---|---|
| Dec. 19, 1996 | [JP] | Japan | 8-339974 |
| Sep. 11, 1997 | [JP] | Japan | 9-246939 |

[51] Int. Cl.[7] .............................. F02M 7/00; G06F 19/00

[52] U.S. Cl. ........................... 123/436; 123/480; 701/110

[58] Field of Search ..................................... 123/436, 480, 123/687, 679, 406.25, 406.24; 477/107, 110; 701/109, 110

[56] References Cited

U.S. PATENT DOCUMENTS

| | | | |
|---|---|---|---|
| 4,651,290 | 3/1987 | Masaki et al. | 701/102 |
| 4,691,286 | 9/1987 | Obayashi et al. | 701/111 |
| 5,016,593 | 5/1991 | Takaoka | 123/436 |
| 5,269,178 | 12/1993 | Vigmostad et al. | 73/116 |
| 5,277,287 | 1/1994 | Ishii et al. | 192/3.31 |
| 5,311,773 | 5/1994 | Bradshaw et al. | 73/116 |
| 5,357,788 | 10/1994 | Kantschar et al. | 73/117.3 |
| 5,450,836 | 9/1995 | Kashiwabara | 123/683 |
| 5,504,682 | 4/1996 | Shiraishi et al. | 73/117.3 |
| 5,694,901 | 12/1997 | Togai et al. | 123/436 |
| 5,724,944 | 3/1998 | Minowa et al. | 123/436 |

FOREIGN PATENT DOCUMENTS

| | | |
|---|---|---|
| 0 610 508 A1 | 8/1994 | European Pat. Off. . |
| 0 811 758 A2 | 12/1997 | European Pat. Off. . |
| 4-224361 | 8/1992 | Japan . |
| 7-33809 | 4/1995 | Japan . |
| 7-180593 | 7/1995 | Japan . |
| 7-269395 | 10/1995 | Japan . |
| 7-269405 | 10/1995 | Japan . |
| 7-279735 | 10/1995 | Japan . |

*Primary Examiner*—Henry C. Yuen
*Assistant Examiner*—Mahmoud M Gimie
*Attorney, Agent, or Firm*—Oliff & Berridge

[57] ABSTRACT

The elapsed time Ta(i) of 30° crank angle near top dead center of compression and the elapsed time Tb(i) of 30° crank angle near 90° after top dead center of compression are found. The difference DTa(i) of the elapsed times Ta(i) between 720° crank angle for a first cylinder and a second cylinder performing combustion after the first cylinder is found. The assumed elapsed time when assuming that there is no torque fluctuation is calculated from the difference DTa(i) of the elapsed time of the first cylinder and the elapsed time of the second cylinder is calculated and the assumed elapsed time is used to calculate the amount of torque fluctuation. It is judged if the vehicle is driving over a rough road from the amplitude and cycle of fluctuation of the vehicle speed. When it is judged that the vehicle is driving over a rough road, correction of the air-fuel ratio based on the amount of torque fluctuation is prohibited.

11 Claims, 43 Drawing Sheets

METHOD OF CONTROLLING AN AIR-FUEL RATIO OF AN ENGINE

This is a Division of application Ser. No. 08/992,342 filed Dec. 17, 1997. The entire disclosure of the prior application(s) is hereby incorporated by reference herein in its entirety.

BACKGROUND OF THE INVENTION

1. Field of the Invention

The present invention relates to a method of controlling an air-fuel ratio of an engine.

2. Description of the Related Art

Known in the art is an internal combustion engine which finds a first angular velocity of the crankshaft during the time required for the crankshaft to rotate from 30° to 60° after top dead center of the compression stroke from this period, finds a second angular velocity of the crankshaft during the time required for the crankshaft to rotate from 90° to 120° after top dead center of the compression stroke from this period, finds the torque generated by a cylinder from the square of the first angular velocity and the square of the second angular velocity, and calculates the amount of fluctuation of the torque from the amount of fluctuation of the generated torque (see U.S. Pat. No. 4,691,286).

That is, when combustion is performed in a cylinder, the combustion pressure causes the angular velocity of the crankshaft to rise from a first angular velocity $\omega a$ to a second angular velocity $\omega b$. At this time, if the moment of inertia of rotation of the engine is I, the combustion pressure causes the kinetic energy to rise from $(1/2)\cdot I\omega a^2$ to $(1/2)\cdot I\omega b^2$. Roughly speaking, the amount of rise of the kinetic energy $(1/2)\cdot I\cdot(\omega b^2-\omega a^2)$ causes a torque to be generated, so the generated torque becomes proportional to $(\omega b^2-\omega a^2)$. Therefore, the generated torque is found from the difference between the square of the first angular velocity $\omega a$ and the square of the second angular velocity $\omega b$ and, therefore, in the above-mentioned internal combustion engine, the amount of fluctuation of the torque is calculated from the thus found generated torque.

However, if it is possible to calculate the amount of fluctuation of the torque in this way, it would also be possible to control the air-fuel ratio to the lean limit based on this amount of torque fluctuation. That is, when the air-fuel ratio is at the rich side of the lean limit, the amount of torque fluctuation is small, while when the air-fuel ratio is at the lean side of the lean limit, the amount of torque fluctuation becomes large, so by correcting the air-fuel ratio based on the amount of torque fluctuation so that the amount of torque fluctuation becomes within a predetermined range, it is possible to control the air-fuel ratio to the lean limit. This type of control of the air-fuel ratio becomes possible when the torque fluctuation calculated based on the first angular velocity $\omega a$ and second angular velocity $\omega b$ expresses the torque fluctuation due to the fluctuation of the combustion pressure.

When the vehicle is driving over a rough road, however, the engine drive system experiences large amplitude torsional vibration and, as a result, the torque calculated based on the first angular velocity $\omega a$ and the second angular velocity $\omega b$ fluctuates considerably. The occurrence of the large torque fluctuation when torque fluctuation not due to the fluctuation of the combustion pressure occurs means that if the air-fuel ratio is corrected, the air-fuel ratio will end up deviating considerably from the lean limit. Therefore, it is necessary to prohibit correction of the air-fuel ratio when large torque fluctuations occur due to driving over a rough road.

The related art of the above internal combustion engines explained above, however, do not give any suggestions on the occurrence of torque fluctuations due to driving over a rough road and therefore application of the methods described in the above related art would result in the problem of the air-fuel ratio deviating from the target air-fuel ratio.

SUMMARY OF THE INVENTION

An object of the present invention is to provide a method of control of an air-fuel ratio capable of preventing the air-fuel ratio from deviating from a target air-fuel ratio when a vehicle is driving over a rough road.

According to one aspect of the present invention, there is provided a method of control of an air-fuel ratio in an engine, comprising the steps of setting a first crank angle range in a crank angle region from the end of a compression stroke to the beginning of an expansion stroke, detecting a first angular velocity of the crankshaft in the first crank angle range, setting a second crank angle range in a crank angle region in the middle of the expansion stroke a predetermined crank angle away from the first crank angle range, detecting a second angular velocity of the crankshaft in the second crank angle range, finding the output fluctuation of the cylinders based on the first angular velocity and the second angular velocity, judging whether the vehicle is driving over a rough road from the amplitude and cycle of fluctuation of the vehicle speed, and prohibiting the correction of the air-fuel ratio based on the output fluctuation when it is judged that the vehicle is driving over a rough road.

According to another aspect of the present invention, there is provided a method of control of an air-fuel ratio in an engine, comprising the steps of setting a first crank angle range in a crank angle region from the end of a compression stroke to the beginning of an expansion stroke, detecting a first angular velocity of the crankshaft in the first crank angle range, setting a second crank angle range in a crank angle region in the middle of the expansion stroke a predetermined crank angle away from the first crank angle range, detecting a second angular velocity of the crankshaft in the second crank angle range, finding the output fluctuation of the cylinders based on the first angular velocity and the second angular velocity, judging whether the vehicle is driving over a rough road from the elapsed time from when a peak value of fluctuation of the rotational speed of a vehicle's front wheels occurs to when a peak value of fluctuation of the rotational speed of the vehicle's rear wheels occurs and from the vehicle speed, and prohibiting the correction of the air-fuel ratio based on the output fluctuation when it is judged that the vehicle is driving over a rough road.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
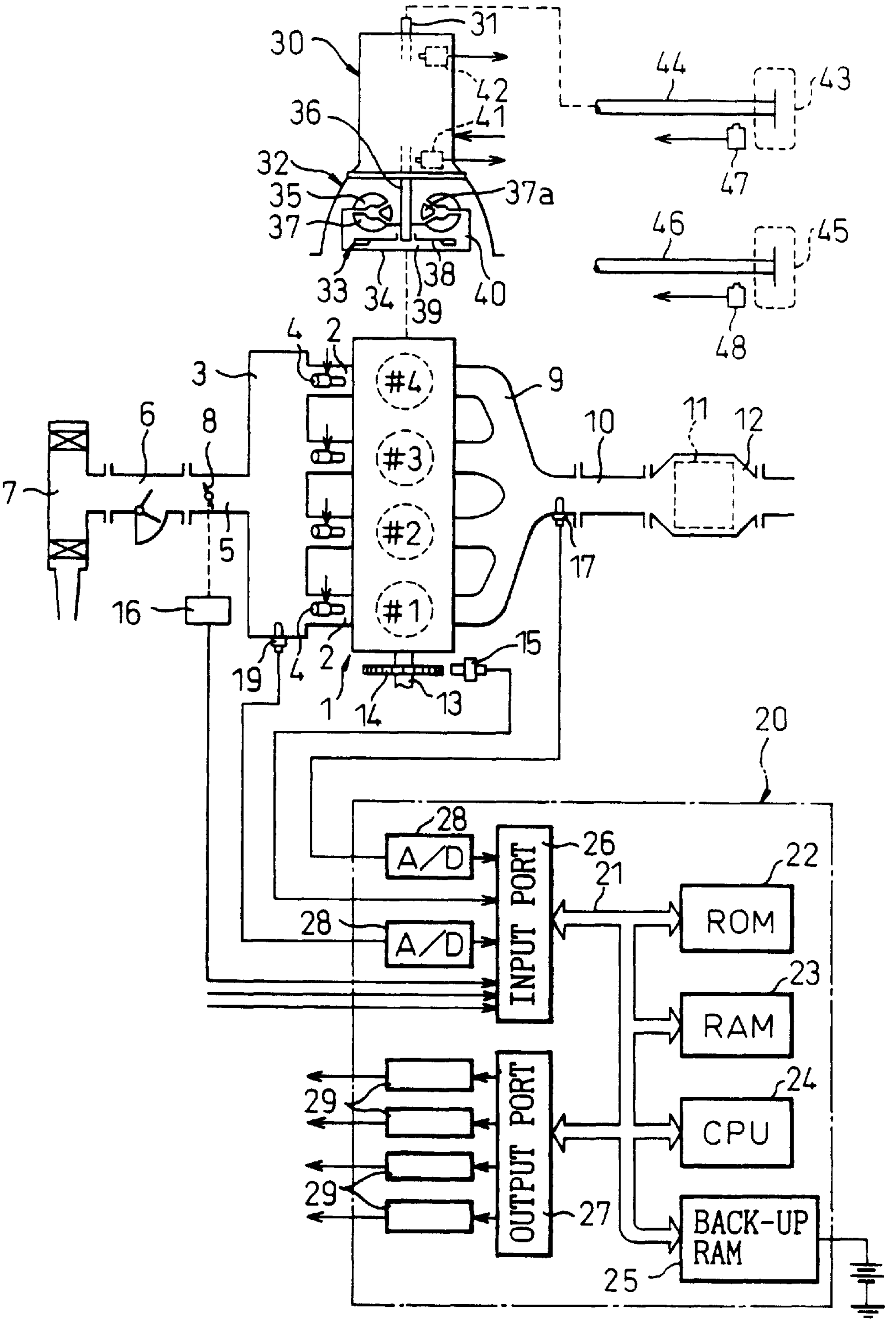
FIG. 1 is an overall view of an internal combustion engine.

Referring to FIG. 1, 1 shows an engine body provided with four cylinders consisting of the No. 1 cylinder #1, No. 2 cylinder #2, No. 3 cylinder #3, and No. 4 cylinder #4. The cylinders #1, #2, #3, and #4 are respectively connected through the corresponding intake pipes 2 to a surge tank 3. In the intake pipes 2 are provided fuel injectors 4 for injecting fuel toward the corresponding intake ports. The surge tank 3 is connected through an intake duct 5 and air flow meter 6 to an air cleaner 7. In the intake duct 5, a throttle valve 8 is arranged. On the other hand, the cylinders #1, #2, #3, and #4 are connected through an exhaust manifold 9 and an exhaust pipe 10 to a casing 12 accommodating an NOx absorbent 11. This NOx absorbent 11 has the function of absorbing the NOx included in the exhaust gas when the air-fuel ratio is lean and discharging and reducing the absorbed NOx when the air-fuel ratio is the stoichiometric air-fuel ratio or rich.

The electronic control unit 20 is comprised of a digital computer and is provided with a ROM (read only memory) 22, a RAM (random access memory) 23, a CPU (microprocessor) 24, a backup RAM 25 connected to a constant power supply, an input port 26, and an output port 27 connected with each other by a bidirectional bus 21. The output shaft 13 of the engine has attached to it a rotor 14 with outer teeth. A crank angle sensor 15 comprising an electromagnetic pickup is arranged facing the outer teeth of the rotor 14. In the embodiment shown in FIG. 1, the rotor 14 has an outer tooth formed on its periphery at every 30° crank angle and, for example, has part of the outer teeth removed for detecting the top dead center of the compression stroke of the No. 1 cylinder. Therefore, except for the portion where the outer teeth are removed, that is, the non-tooth portion, the crank angle sensor 15 generates an output pulse every time the output shaft 13 turns by 30° crank angle. This output pulse is input to the input port 26.

The air flow meter 6 generates an output voltage proportional to the amount of intake air. This output voltage is input through a corresponding A/D converter 28 to the input port 26. Further, the throttle valve 8 has attached to it an idle switch 16 for detecting when the throttle valve 8 is at the idling opening position. The output signal of this idle switch 16 is input to the input port 26. Further, the exhaust manifold 9 has disposed in it an air-fuel ratio sensor ($O_2$ sensor) 17 for detecting the air-fuel ratio. The output signal of this air-fuel ratio sensor 17 is input through the corresponding AD converter 28 to the input port 26. On the other hand, the output port 27 is connected through the corresponding drive circuit 29 to the fuel injectors 4.

As shown in FIG. 1, the output shaft 13 of the engine is connected to an automatic transmission 30. The output shaft 31 of the automatic transmission 30 is connected to the drive wheels 43. The automatic transmission 30 is provided with a torque converter 32. The torque converter 32 is provided inside it with a lockup mechanism 33. That is, the torque converter 32 is provided with a pump cover 34 connected to the output shaft 13 and rotating together with the output shaft 13, a pump impeller 35 supported by the pump cover 34, a turbine runner 37 attached to the input shaft 36 of the automatic transmission 30, and a stator 37*a*. The rotational motion of the output shaft 13 is transmitted through the pump cover 34, pump impeller 35, and turbine runner 37 to the input shaft 36.

On the other hand, the lockup mechanism 33 is provided with a lockup clutch plate 38 which is attached to the input shaft 36 to be able to move in the axial direction and rotates together with the input shaft 36. Normally, that is, when the lockup mechanism is off, pressurized oil is supplied through an oil passage in the input shaft 36 to the inside of the chamber 39 between the lockup clutch plate 38 and pump cover 34, then the pressurized oil flowing out from the chamber 39 is fed into the chamber 40 around the pump impeller 35 and the turbine runner 37 and exhausted through the oil passage in the input shaft 36. At this time, there is almost no pressure difference between the chambers 39 and 40 at the two sides of the lockup clutch plate 38, so the lockup clutch plate 38 moves away from the inner wall of the pump cover 34. Therefore, at this time, the rotational force of the output shaft 13 is transmitted through the pump cover 34, pump impeller 35, and turbine runner 37 to the input shaft 36.

On the other hand, when the lockup mechanism is on, pressurized oil is supplied to the inside of the chamber 40 through the oil passage in the input shaft 36. The oil in the chamber 39 is exhausted through the oil passage in the input shaft 36. At this time, the pressure in the chamber 40 becomes higher than even the pressure in the chamber 39, therefore the lockup clutch plate 38 is pressed against the inner circumference of the pump cover 34 so the crankshaft and the input shaft 36 are directly connected and rotate at the same speed. The control of the supply of oil into the chambers 39 and 40, that is, the on-off control of the lockup mechanism 33, is performed by a control valve provided in the automatic transmission. This control valve is controlled based on an output signal of the electronic control unit 20. Further, a plurality of clutches are provided for the transmission operation in the automatic transmission 20. These clutches are controlled based on the output signal of the electronic control unit 20.

Further, the automatic transmission 30 has disposed in it a rotational speed sensor 41 for generating an output pulse showing the rotational speed of the input shaft 36, that is, the turbine runner 37, and a rotational speed sensor 42 for generating an output pulse showing the rotational speed of the output shaft 31. The output pulses of the rotational speed sensors 41 and 42 are input to the input port 26.

The internal combustion engine of FIG. 1 is used for a vehicle provided with a front shaft 44 supporting the front wheels 43 and a rear shaft 46 for supporting the rear wheels 45. The front shaft 44 is connected to the output shaft 31 of the automatic transmission 30. TA rotational speed sensor 47 generates an output pulse showing the rotational speed of the front shaft 44, that is, the front wheels 43, while a rotational speed sensor 48 generates an output pulse showing the rotational speed of the rear shaft 46, that is, the rear wheels 45. The output pulses of the rotational speed sensors 47 and 48 are input to the input port 26.

In the internal combustion engine shown in FIG. 1, the fuel injection time TAU is calculated based on the following equation:

$$TAU=TP\cdot FLEAN\cdot FLLFB\cdot FAF+TAUV$$

Here, TP shows a basic fuel injection time, FLEAN a lean correction coefficient, FLLFB a lean limit feedback correction coefficient, FAF a stoichiometric air-fuel ratio feedback correction coefficient, and TAUV an invalid injection time.

The basic fuel injection time TP shows the injection time required for making the air-fuel ratio the stoichiometric air-fuel ratio. This basic fuel injection time TP is found from experiments. This basic fuel injection time TP is stored in the ROM 22 in advance in the form of a map shown in FIG. 2 as a function of the engine load Q/N (amount of intake air Q/engine speed N) and the engine speed N.

The lean correction coefficient FLEAN is a correction coefficient for making the air-fuel ratio a lean air-fuel ratio. This lean correction coefficient FLEAN is stored in advance in the ROM 22 in the form of the map shown in FIG. 4 as a function of the engine load Q/N and the engine speed N.

Figure 5:
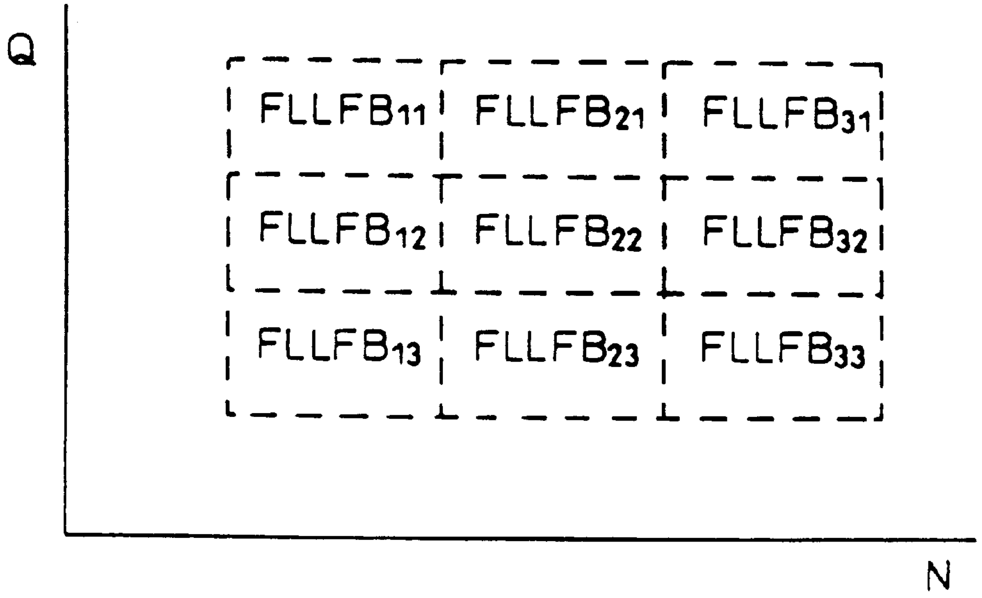
FIG. 5 is a view of a map of a lean limit feedback correction coefficient.

The lean limit feedback correction coefficient FLLFB is a correction coefficient for maintaining the air-fuel ratio at the lean limit. In this embodiment according to the present invention, the learning region for the lean air-fuel ratio feedback control for the amount of intake air Q and the engine speed N is divided into nine regions as shown in FIG. 5 for example. Lean limit feedback correction coefficients $FLLFB_{11}$ to $FLLFB_{33}$ are set for the learning regions.

The stoichiometric air-fuel ratio feedback correction coefficient FAF is a coefficient for maintaining the air-fuel ratio at the stoichiometric air-fuel ratio. The stoichiometric air-fuel ratio feedback correction coefficient FAF is controlled based on the output signal of the air-fuel ratio sensor 17 so as to maintain the air-fuel ratio at the stoichiometric air-fuel ratio. At this time, the stoichiometric air-fuel ratio feedback correction coefficient FAF varies substantially about 1.0.

Figure 4:
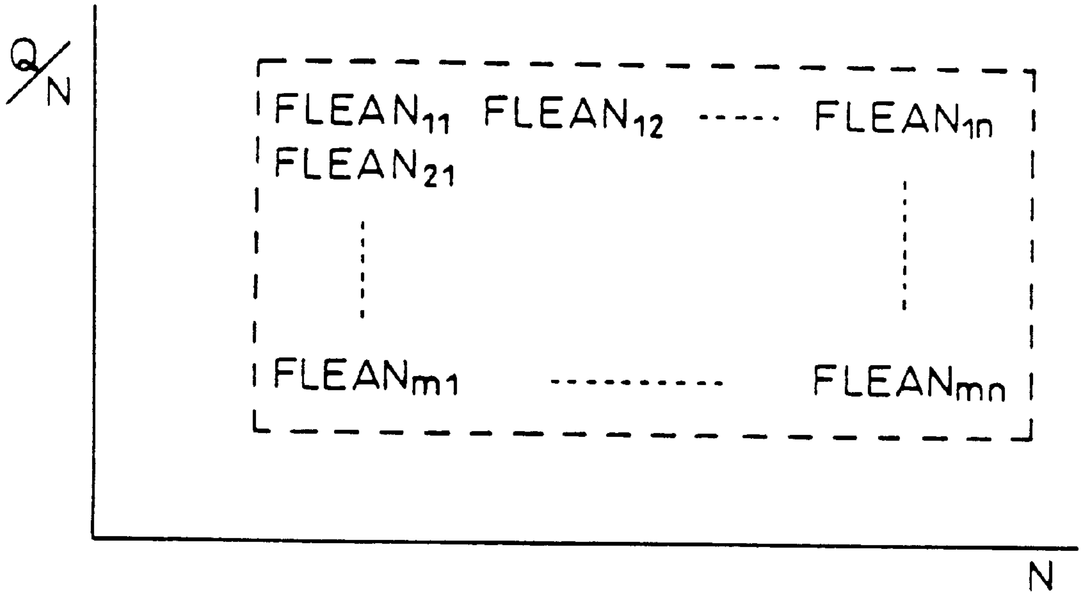
FIG. 4 is a view of a map of a lean correction coefficient.

The lean correction coefficient FLEAN is set in accordance with the operating state of the engine for the operating region enclosed by the broken lines in FIG. 4. In this operating region, the air-fuel ratio is maintained at the lean air-fuel ratio. As opposed to this, in the operating region outside the region enclosed by the broken line in FIG. 4, the air-fuel ratio is maintained at the stoichiometric air-fuel ratio. When the air-fuel ratio is to be maintained at the stoichiometric air-fuel ratio, the lean correction coefficient FLEAN and the lean limit feedback correction coefficient FLLFB are fixed at 1.0 and the stoichiometric air-fuel ratio feedback correction coefficient FAF is controlled based on the output signal of the air-fuel ratio sensor 17.

On the other hand, when the air-fuel ratio is to be maintained at the lean air-fuel ratio, the stoichiometric air-fuel ratio feedback correction coefficient FAF is fixed at 1.0, that is, the feedback control based on the output signal of the air-fuel ratio sensor 17 is stopped, and the lean correction coefficient FLEAN and the lean limit feedback correction coefficient FLLFB are used to control the air-fuel ratio to the lean air-fuel ratio.

Figure 3:
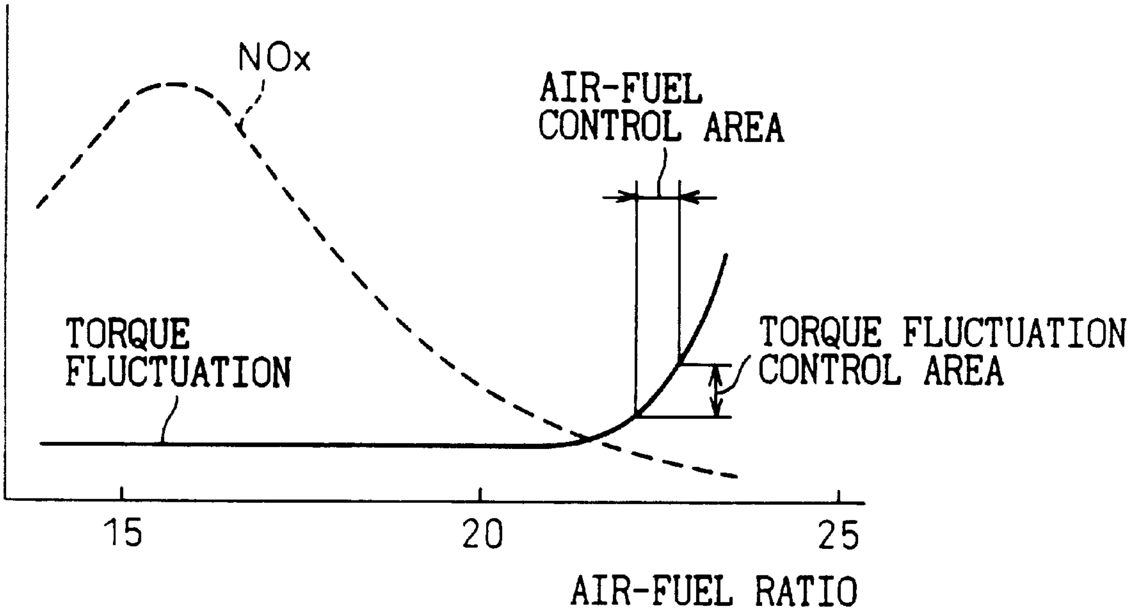
FIG. 3 is a view of the amount of generation of NOx and torque fluctuation.

Next, the lean limit feedback control will be explained referring to FIG. 3. FIG. 3 shows the relationship between the amount of torque fluctuation of the engine output and the amount of generation of NOx and the air-fuel ratio. The leaner the air-fuel ratio, the smaller the fuel consumption rate. Further, the leaner the air-fuel ratio, the smaller the amount of generation of NOx. Therefore, viewed from these points, the air-fuel ratio should desirably be made as lean as possible. Note, however, that when the air-fuel ratio becomes leaner than a certain extent, the combustion becomes unstable and, as a result, as shown in FIG. 3, the amount of torque fluctuation becomes large. Therefore, in this embodiment according to the present invention, as shown in FIG. 3, the air-fuel ratio is maintained in the air-fuel ratio control region where the torque fluctuation starts to increase.

That is, explaining this in more detail, the lean correction coefficient FLEAN is determined so that the air-fuel ratio becomes the middle of the air-fuel ratio control region shown in FIG. 3 when the lean limit feedback correction coefficient FLLFB is made 1.0. On the other hand, the lean limit feedback correction coefficient FLLFB is controlled to within the torque fluctuation control region shown in FIG. 3 in accordance with the amount of torque fluctuation. When the amount of torque fluctuation becomes larger, the lean limit feedback correction coefficient FLLFB is increased, that is, the air-fuel ratio is made smaller, while when the amount of torque fluctuation becomes smaller, the lean limit feedback correction coefficient FLLFB is reduced, that is, the air-fuel ratio is made larger. In this way, the air-fuel ratio is controlled to within the air-fuel ratio control region shown in FIG. 3.

Note that the lean limit feedback correction coefficient FLLFB is set to cover the engine operating region where the lean correction coefficient FLEAN is set.

If the amount of torque fluctuation is controlled to within the torque fluctuation control region shown in FIG. 3, an excellent drivability of the vehicle may be ensured while the fuel consumption rate and the amount of generation of NOx can be greatly reduced. However, since the amount of torque fluctuation is controlled to be within the torque fluctuation control region in this way, the amount of torque fluctuation must be detected.

Various methods have been proposed in the past for calculating the amount of torque fluctuation. Mentioning typical ones, there are the method of providing a combustion pressure sensor in the combustion chamber and calculating the amount of torque fluctuation based on the output signal of this combustion pressure sensor or the method of, as explained at the beginning, calculating the amount of torque fluctuation from the difference between the square of the first angular velocity ωa and the square of the second angular velocity ωb.

If a combustion pressure sensor is used, there is the advantage that the torque generated in the cylinder provided with the combustion pressure sensor can be reliably detected, but there is conversely the disadvantage that the combustion pressure sensor is required. As opposed to this, the angular velocities ωa and ωb can be calculated from the output signal of the crank angle sensor provided in the internal combustion engine in the past, so when calculating the output torque based on the angular velocities ωa and ωb, there is the advantage that there is no need to mount a new sensor. However, in this case, as explained at the beginning, if the engine drive system experiences torsional vibration, there is the problem that the generated torque can no longer be accurately detected. It is clear, however, that if this problem could just be solved, then the method of calculation of the torque based on the angular velocity, which does not require a new sensor, would be preferable. Therefore, the present invention can calculate the generated torque based on the angular velocities and can prohibit correction of the air-fuel ratio when it is judged that the vehicle is driving over rough roads.

While it is possible to find the output fluctuation and the torque fluctuation of the engine so long as the angular velocity of the crankshaft is used as the basis, when the engine drive system or crankshaft itself suffers from torsional vibration or when there is variation in the outer teeth of the rotor, it is not possible to accurately calculate the output fluctuation and torque fluctuation of the engine. Therefore, in this embodiment of the present invention, use is made of the new method of calculation of the output fluctuation and torque fluctuation so as to enable accurate detection of the output fluctuation and torque fluctuation of the engine even when the engine drive system or crankshaft itself suffers from torsional vibration or there is variation in the outer teeth of the rotor.

Next, the method for calculating the output fluctuation and torque fluctuation of the engine will be explained.

Figure 6A:
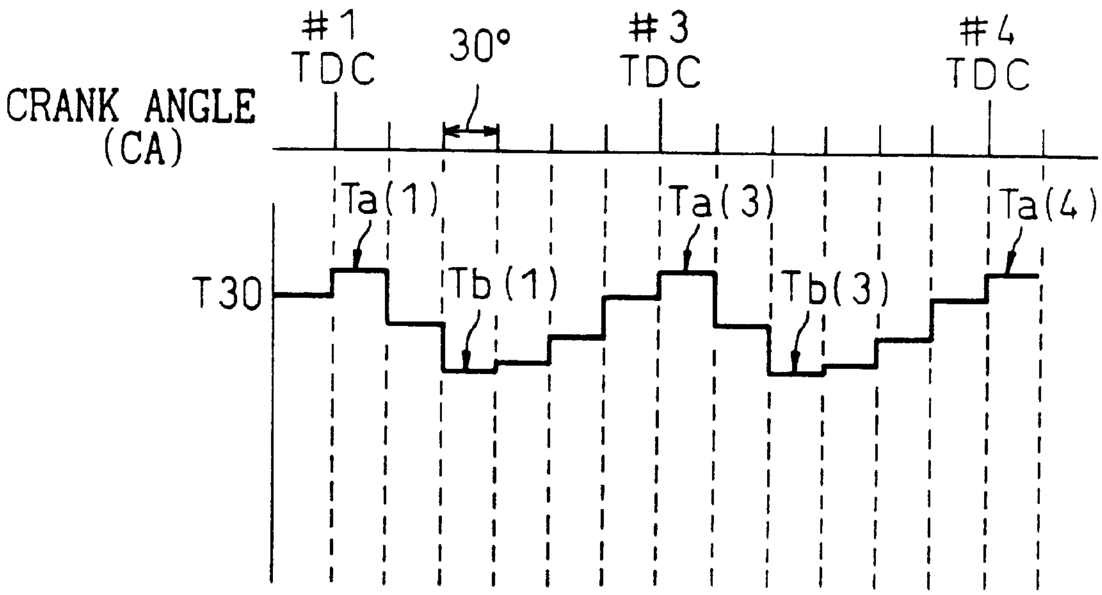
FIGS. 6A and 6B are time charts of the changes in the elapsed times Ta(i) and Tb(i) of 30° crank angle.
Figure 6B:
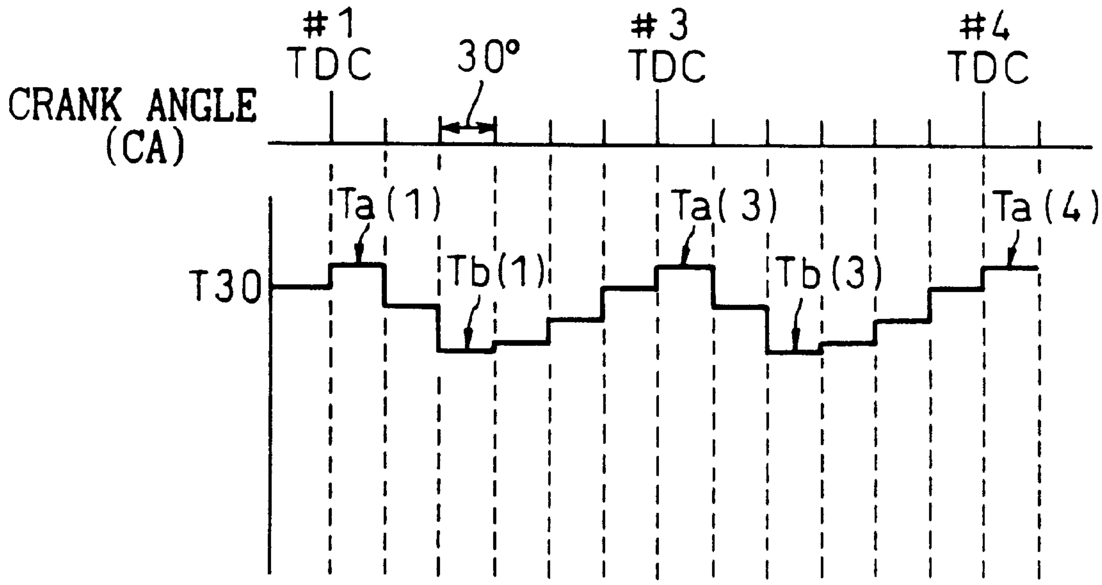

First, the method of calculating the drive force generated by each cylinder and the torque generated in each cylinder will be explained while referring to FIGS. 6A and 6B showing the steady operating state where the engine drive system does not experience torsional vibration. As explained above, the crank angle sensor 15 produces an output pulse each time the crankshaft rotates by 30° crank angle. Further, the crank angle sensor 15 is arranged to generate an output pulse at the top dead center TDC of the compression stroke of the cylinders #1, #2, #3, and #4. Therefore, the crank angle sensor 15 produces an output pulse for each 30° crank angle from the top dead center TDC of the compression stroke of the cylinders #1, #2, #3, and #4. Note that, the ignition sequence of the internal combustion engine used in the present invention is 1-3-4-2.

In FIGS. 6A and 6B, the vertical axis T30 shows the elapsed time of 30° crank angle from when the crank angle sensor 15 produces an output pulse to when it produces the next output pulse. Further, Ta(i) shows the elapsed time from the top dead center of the compression stroke (hereinafter referred to as TDC) to 30° after top dead center of the compression stroke (hereinafter referred to as ATDC) of the No. i cylinder, while Tb(i) shows the elapsed time from ATDC 60° to ATDC 90° of the No. i cylinder. Therefore, for example, Ta(1) shows the elapsed time from TDC to ATDC 30° of the No. 1 cylinder, while Tb(1) shows the elapsed time from ATDC 60° to ATDC 90° of the No. 1 cylinder. On the other hand, if the 30° crank angle is divided by the elapsed time T30, the result of the division shows the angular velocity ω. In this embodiment according to the present invention, 30° crank angle/Ta(i) is referred to as the first angular velocity ωa in the No. i cylinder, while 30° crank angle /Tb(i) is referred to as the second angular velocity ωb in the No. i cylinder. Therefore, 30° crank angle/Ta (1) shows the first angular velocity ωa of the No. 1 cylinder, while 30° crank angle/Tb(1) shows the second angular velocity ωb of the No. 1 cylinder.

Taking note of the No. 1 cylinder of FIGS. 6A and 6B, when the combustion is started and the combustion pressure rises, the elapsed time falls from Ta(1) to Tb(1) then rises from Tb(1). In other words, the angular velocity ω of the crankshaft rises from the first angular velocity ωa to the second angular velocity ωb, then falls again from the second angular velocity ωb. That is, the combustion pressure causes the angular velocity ω of the crankshaft to increase from the first angular velocity ωa to the second angular velocity ωb. FIG. 6A shows the case where the combustion pressure is relatively high, while FIG. 6B shows the case where the combustion pressure is relatively low. As shown in FIGS. 6A and 6B, when the combustion pressure is high, the amount of reduction of the elapsed time (Ta(i)−Tb(i)) becomes larger compared with when the combustion pressure is low, therefore the amount of increase (ωb−ωa) of the angular velocity ω becomes larger. When the combustion pressure becomes higher, the drive force generated by the cylinder becomes larger, therefore if the amount of increase (ωb−ωa) of the angular velocity ω becomes larger, the drive force generated by the cylinder becomes larger. Therefore, it is possible to calculate the drive force generated by a cylinder from the difference (ωb−ωa) between the first angular velocity ωa and the second angular velocity ωb.

On the other hand, if the moment of inertia of rotation of the engine is I, the combustion pressure causes the kinetic energy to increase from $(\frac{1}{2})I\omega a^2$ to $(\frac{1}{2})I\omega b^2$. The amount of increase of the kinetic energy $(\frac{1}{2})\cdot I(\omega b^2-\omega a^2)$ expresses the torque generated by that cylinder, therefore it becomes possible to calculate the torque generated by a cylinder from the difference ($\omega b^2 - \omega a^2$) between the square of the first angular velocity ωa and the square of the second angular velocity ωb.

By detecting the first angular velocity ωa and the second angular velocity ωb in this way, it becomes possible to calculate the drive force generated by the corresponding cylinder and the torque generated by the corresponding cylinder from the detected values. Note that the change in the elapsed time T30 shown in FIGS. 6A and 6B differs somewhat depending on the engine, therefore the crank angle range for detecting the first angular velocity ωa and the crank angle range for detecting the second angular velocity ωb are set in accordance with the engine so that (ωb−ωa) best expresses the drive force generated by the engine or so that ($\omega b^2 - \omega a^2$) best expresses the torque generated by the engine.

Therefore, depending on the engine, the crank angle range for detecting the first angular velocity ωa may be from before the top dead center of the compression stroke BTDC 30° to TDC, while the crank angle range for detecting the second angular velocity ωb may be from ATDC 90° to ATDC 120°.

Therefore, explaining the method of detecting the angular velocities ωa and ωb in general terms, the first crank angle range is set in the crank angle region from the end of the compression stroke to the beginning of the expansion stroke, the second crank angle range is set in a crank angle region in the middle of the expansion stroke a predetermined crank angle away from the first crank angle range, the first angular velocity ωa of the crankshaft in the first crank angle range is detected, and the second angular velocity of the crankshaft ωb in the second crank angle range is detected.

As explained above, by detecting the angular velocities ωa and ωb, it becomes possible to calculate the drive force and the torque generated by a corresponding cylinder based on the detected values. The engine drive system, however, experiences torsional vibration occurring at the natural frequency of the drive system due to the successive explosive actions of the cylinders. If the engine drive system experiences such torsional vibration, it no longer becomes possible to accurately detect the drive force and the torque generated by a cylinder based on the angular velocities ωa and ωb. Next, this will be explained with reference to FIG. 7 and FIG. 8.

Figure 7:
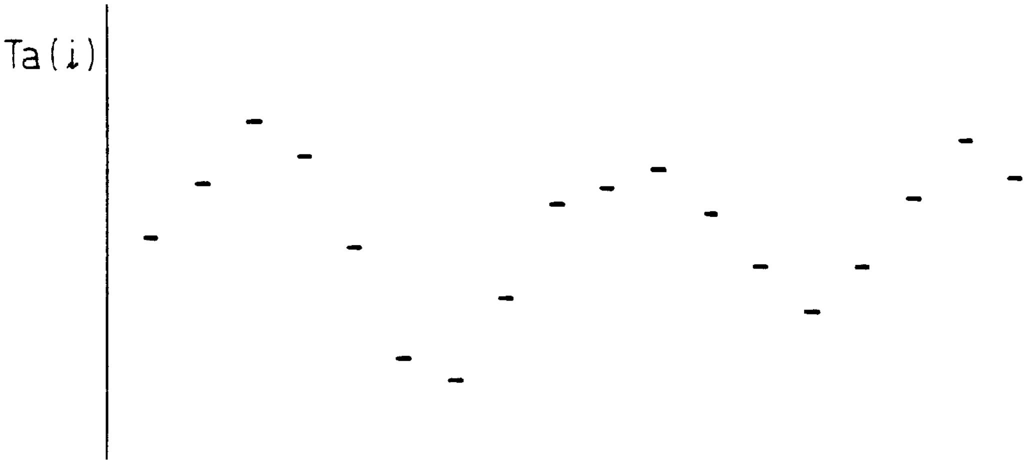
FIG. 7 is a time chart of the changes in the elapsed time Ta(i) of 30° crank angle.

FIG. 7 shows the changes in the elapsed time Ta(i) successively calculated for each cylinder when the engine drive system experiences torsional vibration. When the engine drive system experiences torsional vibration, this torsional vibration causes the angular velocity of a crankshaft to be cyclically increased and decreased, so the elapsed time Ta(i) increases and decreases cyclically as shown in FIG. 7.

Figure 8:
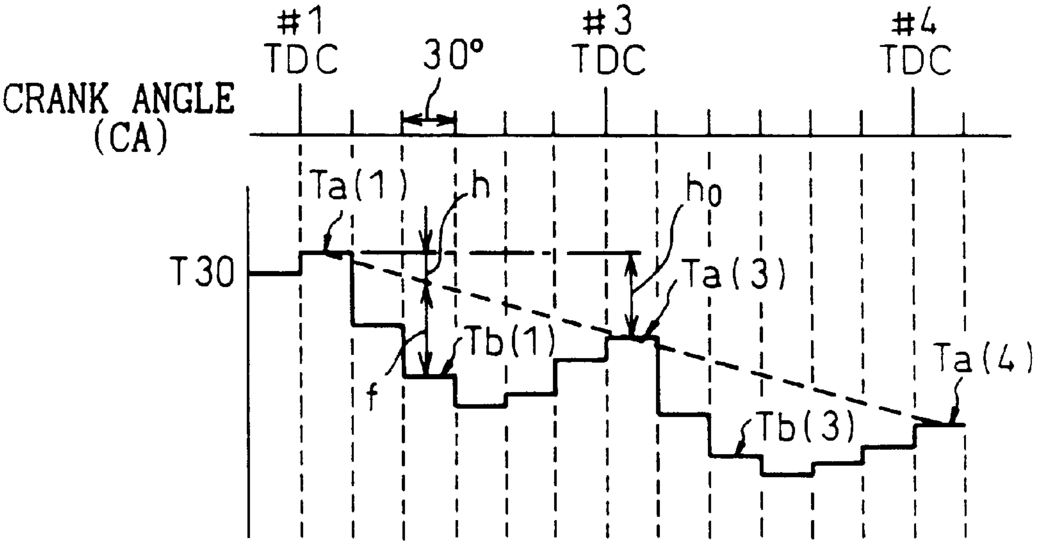
FIG. 8 is a time chart of the changes in the elapsed times Ta(i) and Tb(i) of 30° crank angle.

On the other hand, FIG. 8 shows the portion where the elapsed time Ta(i) is reduced in an enlarged manner.

As shown in FIG. 8, the elapsed time Ta(i) falls by exactly the time $h_0$ between Ta(1) and Ta(3). This reduction of the time $h_0$ is believed to be due to an increase in the amount of torsion due to the torsional vibration. In this case, the amount of decrease of the elapsed time due to the torsional vibration between Ta(1) and Ta(3) is believed to increase substantially linearly along with the elapse of time, therefore this amount of decrease of the elapsed time due to the torsional vibration is shown by the difference between the broken line connecting Ta(1) and Ta(3) and the horizontal line passing through Ta(1). Therefore, between Ta(1) and Tb(1), the torsional vibration causes the elapsed time to fall by exactly h.

In this way, when torsional vibration occurs in the engine drive system, Tb(1) is lower in elapsed time than Ta(1), but this lower elapsed time includes the amount of decrease f of the elapsed time due to the combustion pressure and the amount of decrease h of the elapsed time due to the torsional vibration. Therefore, to find just the elapsed time Tb'(1) decreased due to the combustion pressure, it becomes necessary to add h to Tb(1). That is, even if finding the drive force or torque generated by each cylinder based on the detected elapsed time Ta(i) and Tb(i), it is not possible to find the true drive output or torque and therefore not possible to find the true output fluctuation or torque fluctuation of the engine.

Further, in a multi-cylinder internal combustion engine, in addition to the torsional vibration of the engine drive system, there is torsional vibration of the crankshaft itself. When this torsional vibration of the crankshaft itself occurs, it is no longer possible to find the true output fluctuation or torque fluctuation of the engine. Next, this will be explained with reference to FIG. 9.

Figure 9:
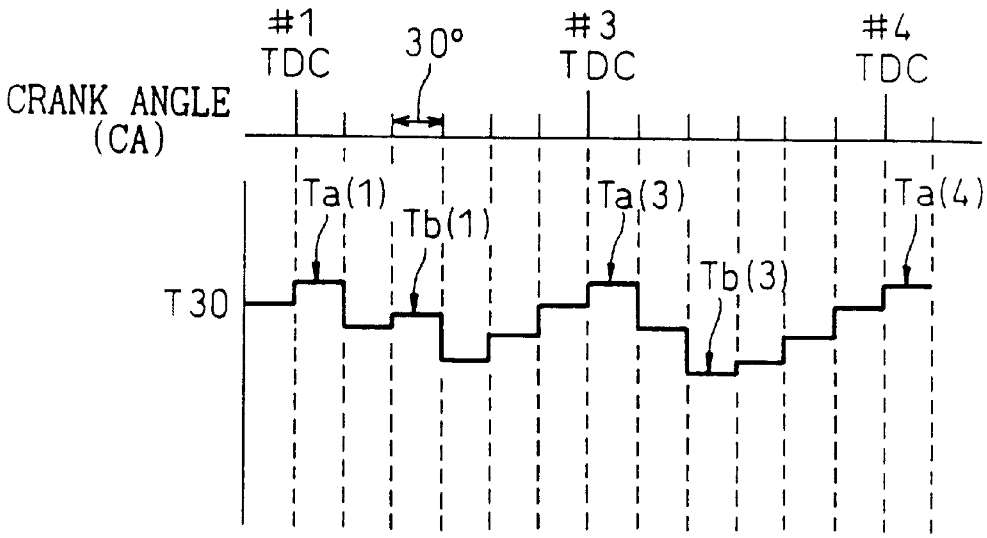
FIG. 9 is a time chart of the changes in the elapsed times Ta(i) and Tb(i) of 30° crank angle.

In a multi-cylinder internal combustion engine, for example, a four-cylinder internal combustion engine as shown in FIG. 1, a large torsional vibration occurs in the No. 1 cylinder and the No. 2 cylinder. That is, in a cylinder where almost no torsional vibration of the crankshaft itself occurs, for example, the No. 3 cylinder #3, as shown in FIG. 9, the elapsed time gradually falls from Ta(3) to Tb(3), but in the No. 1 cylinder #1, the elapsed time does not gradually fall from Ta(1) to Tb(1) and the torsional vibration of the crankshaft itself causes the elapsed time Tb(1) to become longer. As a result, it is not possible to find the true drive force or torque for the No. 1 cylinder #1 even if finding the drive force or torque generated by the No. 1 cylinder #1 based on the detected elapsed times Ta(1) and Tb(1), therefore it is not possible to find the true output fluctuation or torque fluctuation of the engine.

Therefore, in the present invention, use is made of a new method of calculation which enables calculation of the true output fluctuation and torque fluctuation of the engine even if torsional vibration of the engine drive system occurs and even if torsional vibration of the crankshaft occurs. Next, this new method of calculation will be explained with reference to FIG. 10.

Figure 10:
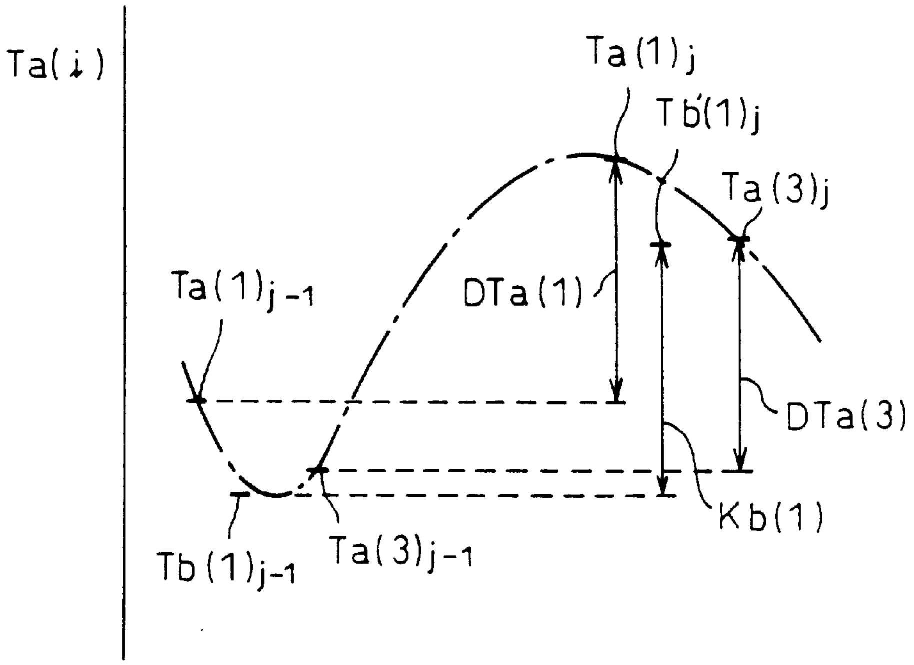
FIG. 10 is a time chart of the changes in the elapsed time Ta(i) of 30° crank angle.

In FIG. 10, $Ta(1)_{j-1}$ and $Tb(1)_{j-1}$ show the elapsed times at the time of the previous combustion of the No. 1 cylinder #1. $Ta(1)_j$ and $Tb(1)_j$ show the elapsed times at the time of the next combustion of the No. 1 cylinder #1. On the other hand, $Ta(3)_{j-1}$ shows the elapsed time at the time of the previous combustion of the No. 3 cylinder #3 performed after the previous combustion of the No. 1 cylinder #1, while Ta(3)j shows the elapsed time at the time of the next combustion of the No. 3 cylinder #3.

First, the difference DTa(1) ($=Ta(1)_j - Ta(1)_{j-1}$) between $Ta(1)_j$ and $Ta(1)_{j-1}$ and the difference DTa(3) ($=Ta(3)_j - Ta(3)_{j-1}$) between $Ta(3)_j$ and $Tb(3)_{j-1}$ are found. Next, the assumed elapsed time from ATDC 60° to ATDC 90° at the time of the next combustion of the No. 1 cylinder #1, when assuming that the output torque at the time of the previous combustion of the No. 1 cylinder #1 and the output torque at the time of the next combustion are identical, is made Tb'(1) and the difference Kb(1) ($=Tb'(1)_j - Tb(1)_{j-1}$) between $Tb'(1)_j$ and $Tb(1)_{j-1}$ is found. The differences DTa(1), Kb(1), and DTa(3) become as shown in FIG. 11 when rewritten as heights on a straight line.

Figure 11:
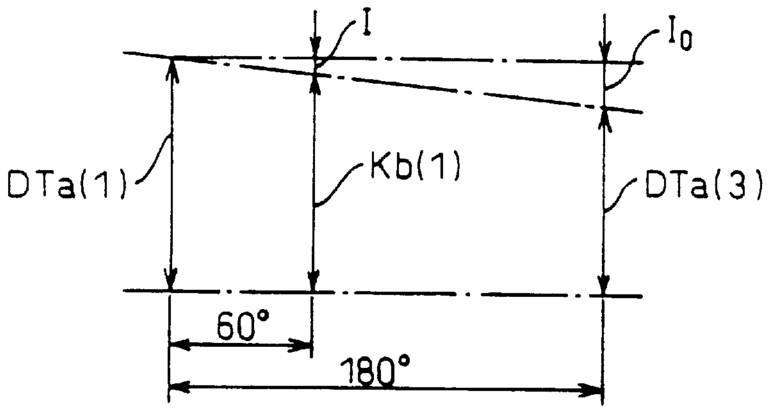
FIG. 11 is a view of the relationship between differences of elapsed times DTa(i) and Kb(i)

The difference of elapsed times falls by exactly the time $I_0$ between the differences of elapsed times DTa(1) and DTa(3) as shown in FIG. 11. Even if torsional vibration occurs in the crankshaft itself, the effect of the torsional vibration does not appear in the difference of the elapsed times and therefore the decrease of the time $I_0$ in the difference of elapsed times is due to the torsional vibration of the drive system. In this case, the amount of decrease of the difference of elapsed times due to the torsional vibration of the engine drive system may be considered to increase substantially linearly along with the elapse of time between DTa(1) and DTa(3). Therefore, if it is assumed that the output torque at the time of the previous combustion of the No. 1 cylinder #1 and the output torque at the time of the next combustion are identical, the difference of elapsed times can be considered to decrease by exactly I due to the torsional vibration of the engine drive system between the differences of elapsed times DTa(1) and Kb(1). Therefore, as will be understood from FIG. 11, the assumed difference of elapsed times Kb(1) when assuming that the output torque at the time of previous combustion of the No. 1 cylinder #1 and the output torque at the time of the next combustion are identical is expressed as an interpolated value from DTa(1) and DTa(3) and becomes as shown in the following equation:

$$Kb(1)=(2DTa(1)+DTa(3))/3$$

The assumed elapsed time $Tb'(\mathbf{1})_j$ of the No. 1 cylinder #1 when assuming that the output torque at the time of the previous combustion of the No. 1 cylinder #1 and the output torque at the time of the next combustion are identical is expressed as follows:

$$Tb'(1)_j=Tb(1)_{j-1}+Kb(1)$$

Therefore, the assumed output torque DNS(1) at the time of the next combustion of the No. 1 cylinder #1 when assuming that the output torque at the time of the previous combustion of the No. 1 cylinder #1 and the output torque at the time of the next combustion are identical is expressed as follows:

$$DNS(1)=\{30°/Tb'(1)_j\}^2-\{30°/Ta(1)_j\}^2$$

$$=\{30°/Tb(1)_{j-1}+Kb(1))\}^2-\{30°/Ta(1)_j\}^2$$

On the other hand, when calculating the actual output torque using the actual elapsed time $Tb(\mathbf{1})_j$ from ATDC 60° to ATDC 90° at the time of the next combustion of the No. 1 cylinder #1, the output torque DN(1) is expressed by the following equation:

$$DN(1)=\{30°/Tb(1)_j\}^2-\{30°/Ta(1)_j\}^2$$

In this case, the difference between the assumed output torque DNS(1) of the No. 1 cylinder #1 and the actual output torque DN(1) shows the amount of torque fluctuation of the No. 1 cylinder #1. Therefore, the amount of torque fluctuation DLN(1) of the No. 1 cylinder #1 is shown by the following equation:

$$DLN(1)=DNS(1)-DN(1)=\{30°/Tb'(1)_j\}^2-\{30°/Tb(1)_j\}^2$$

Expressed generally, the amount of torque fluctuation DLN(i) of the No. i cylinder can be shown by the following equation:

$$DLN(i)=DNS(i)-DN(i)=\{30°/Tb(i)\}^2-\{30°/Tb(i)\}^2$$

That is, the amount of torque fluctuation of the No. i cylinder can be found from the error between the square of the assumed second angular velocity of the No. i cylinder and the square of the actual second angular velocity. By calculating the amount of torque fluctuation by this method, even if torsional vibration occurs in the engine drive system, it is possible to accurately detect the amount of torque fluctuation of the cylinders even if torsional vibration occurs in the crankshaft itself.

On the other hand, when calculating the amount of torque fluctuation by this method, it is not possible to accurately detect the amount of torque fluctuation of the cylinders if there is a variation in the spaces of the outer teeth formed along the outer circumference of the rotor 14 (FIG. 1). Therefore, in this embodiment of the present invention, even if there is a variation in the spaces of the outer teeth of the rotor 14, it is made possible to correct the elapsed times Ta(i), Tb(i) detected so as to enable accurate detection of the amount of torque fluctuation of the cylinders. Next, an explanation will be made of the method of correction of the elapsed time Ta(i) with reference to FIG. 12.

In this embodiment of the present invention, the elapsed time Ta(i) is calculated based on the following equation:

$$Ta(i)=(\text{time required from } TDC \text{ to } ATDC \text{ } 30° \text{ of No. } i \text{ cylinder})\cdot(1+KTa(i))$$

Here, KTa(i) shows the correction coefficient for the No. i cylinder. The correction coefficient KTa(i) is calculated at the time when the fuel supply is stopped during a deceleration operation where torsional vibration of the engine drive system does not occur and torsional vibration of the crankshaft does not occur either.

Figure 12:
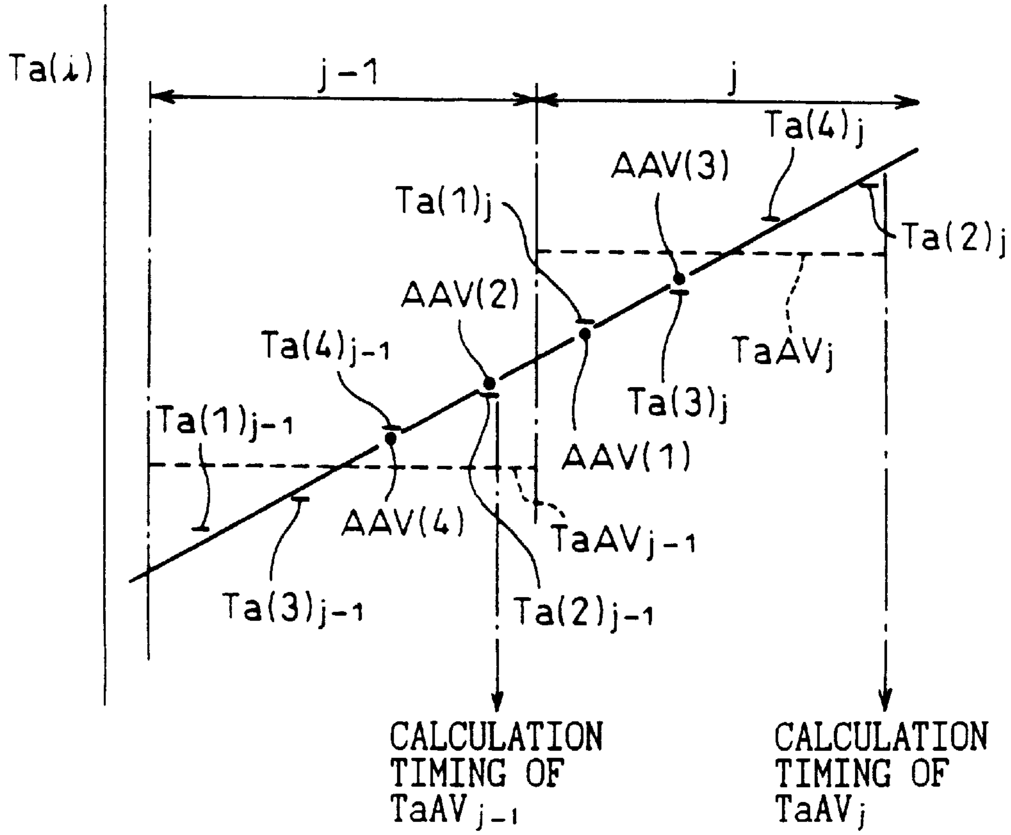
FIG. 12 is a time chart of the changes in the elapsed time Ta(i) during a deceleration operation.

FIG. 12 shows the change of the elapsed time Ta(i) at the time of a deceleration operation. At the time of a deceleration operation, the rotational speed of the crankshaft gradually falls, so the elapsed time Ta(i) gradually increases as shown by $Ta(\mathbf{1})_{j-1}$, $Ta(\mathbf{3})_{j-1}$, $Ta(\mathbf{4})_{j-1}$, $Ta(\mathbf{2})_{j-1}$, $Ta(\mathbf{1})_j$, $Ta(\mathbf{3})_j$, $Ta(\mathbf{4})_j$, and $Ta(\mathbf{2})_j$. At this time, if the spaces between the outer teeth of the rotor 14 are the same, the elapsed time Ta(i) can be considered to change along the solid line in FIG. 12. When the detected elapsed time Ta(i) deviates from the solid line of FIG. 12, it is considered that the spaces of the outer teeth for detection of the elapsed time Ta(i) deviated from the solid line deviate from the correct spaces. Therefore, in this embodiment of the present invention, when the elapsed time Ta(i) deviates from the line shown in FIG. 12, the elapsed time Ta(i) is corrected by the correction coefficient KTa(i) so that the elapsed time Ta(i) is positioned on the solid line of FIG. 12.

Explaining this in more detail, in this embodiment of the present invention, the average value $TaAV_{j-1}$ $\{=(Ta(\mathbf{1})_{j-1}+Ta(\mathbf{3})_{j-1}+Ta(\mathbf{4})_{j-1}+Ta(\mathbf{2})_{j-1})/4\}$, $TaAV_j$ $\{=Ta(\mathbf{1})_j+Ta(\mathbf{3})_j+Ta(\mathbf{4})_j+Ta(\mathbf{2})_j)/4\}$, . . . of the elapsed times Ta(i) of four cylinders in a 720° crank angle range (j−1), (j) . . . Next, it is considered that the elapsed times $Ta(\mathbf{4})_{j-1}$, $Ta(\mathbf{2})_{j-1}$, $Ta(\mathbf{1})_j$, and $Ta(\mathbf{3})_j$ increase by an average constant rate of increase from the average value $TaAV_{j-1}$ to average value $TaAV_j$, and the elapsed times AAV(4), AAV(2), AAV(1), and AAV(3) for the cylinders when considering an increase by an average constant rate of increase are found by the following equations:

$$AAV(4)=(TaAV_j-TaAV_{j-1})\cdot(1/8)+TaAV_{j-1}$$

$$AAV(2)=(TaAV_j-TaAV_{j-1})\cdot(3/8)+TaAV_{j-1}$$

$$AAV(1)=(TaAV_j-TaAV_{j-1})\cdot(5/8)+TaAV_{j-1}$$

$$AAV(3)=(TaAV_j-TaAV_{j-1})\cdot(7/8)+TaAV_{j-1}$$

Next, the ratios of deviation KAFC(4), KAFC(2), KAFC(1), and KAFC(3) for the actually measured elapsed times Ta(4)$_{j-1}$, Ta(2)$_{j-1}$, Ta(1)$_j$, and Ta(3)$_j$ for the elapsed times AAV(4), AAV(2), AAV(1), and AAV(3) for the cylinders are found based on the following equations:

$$KAFC(4)=(Ta(4)_{j-1}-AAV(4)\}/AAV(4)$$

$$KAFC(2)=(Ta(2)_{j-1}-AAV(2)\}/AAV(2)$$

$$KAFC(1)=(Ta(1)_j-AAV(1)\}/AAV(1)$$

$$KAFC(3)=(Ta(3)_j-AAV(3)\}/AAV(3)$$

Next, the basic correction coefficient KTaB(i) is found for each cylinder using the following equation:

$$KTaB(i)=KTa(i)_{j-1}-KAFC(i)/4$$

That is, the basic correction coefficient KTaB(i) is calculated by subtracting ¼ of the ratio of deviation KAFC(i) from the correction coefficient KTa(i)$_{j-1}$ up to then for each cylinder.

Next, the mean value tKTaM of the basic correction coefficient KTaB(i) is calculated based on the following equation:

$$tKTaM=\{KTaB(1)+KTaB(2)+KTaB(3)+KTaB(4)\}/4$$

Next, the correction coefficient KTa(i) for each cylinder is calculated by subtracting the average value tKTaM from the basic correction coefficient KTaB(i) as shown by the following equation:

$$KTa(i)=KTaB(i)-tKTaM$$

The correction coefficient KTa(i)$_{j-1}$ is not directly corrected based on the ratio of deviation KAFC(i). The basic correction coefficient KTaB(i) is found once in this way for the following reason. For example, assume that there is a ratio of deviation KAFC(1) for only the No. 1 cylinder #1 and that only the correction coefficient KTa(1) of the No. 1 cylinder #1 is corrected based on the ratio of deviation KAFC(1). In this case, the elapsed time Ta(1) of only the No. 1 cylinder #1 is increased or decreased. If the elapsed time Ta(1) of only the No. 1 cylinder #1 is increased or decreased, deviation will occur in the correction coefficients KTa(2), KTa(3), and KTa(4) of the remaining cylinders #2, #3, and #4.

To prevent this problem from occurring, the basic correction coefficient KTaB(i) is found once and the mean value tKTaM of the basic correction coefficient is subtracted from the basic correction coefficient KTaB(i) to find the final correction coefficient KTa(i). That is, for example, when the basic correction coefficient KTa(1) of the No. 1 cylinder #1 is increased, the mean value tKTaM of the basic correction coefficient is subtracted from the basic correction coefficients KTaB(i) of all of the cylinders #1, #2, #3, and #4. If tKTaM is subtracted from the basic correction coefficients KTaB(i) of all of the cylinders in this way, the correction coefficient KTa(1) of the No. 1 cylinder #1 will increase, but the correction coefficients KTa(2), KTa(3), and KTa(4) of the remaining cylinders #2, #3, and #4 will be decreased and the sum of KTa(1), KTa(2), KTa(3), and KTa(4) will be maintained constantly at zero. If the correction coefficient KTa(i) is corrected so that the sum of KTa(1), KTa(2), KTa(3), and KTa(4) is maintained constantly at zero, then no matter which correction coefficient KTa(i) is corrected, deviation will no longer occur in the other correction coefficients KTa(i).

In the embodiment shown in FIG. 12, when the elapsed time Ta(1)$_j$ of the No. 1 cylinder #1 for example is larger than the elapsed time AAV(1) when assuming an increase by an average constant rate of increase, the ratio of deviation KAFC(1) for the No. 1 cylinder #1 becomes a positive value. As a result, the correction coefficient KTa(1) is decreased until the ratio of deviation KAFC(1) becomes zero. If the ratio of deviation KAFC(1) becomes zero, the value of the correction coefficient KTAa(1) settles down to a constant value. At this time, the elapsed time Ta(1) matches with the elapsed time AVV(1). If the correction coefficients KTa(1) for all cylinders settle down to constant values, when the rotational speed of the rotor 14 is constant, the elapsed times Ta(i) of the cylinders corrected using the correction coefficients KTa(i) all become equal. Therefore, even if there is variation in the spaces of the outer teeth of the rotor 14, it is possible to accurately detect the torque fluctuation of the cylinders.

Figure 13:
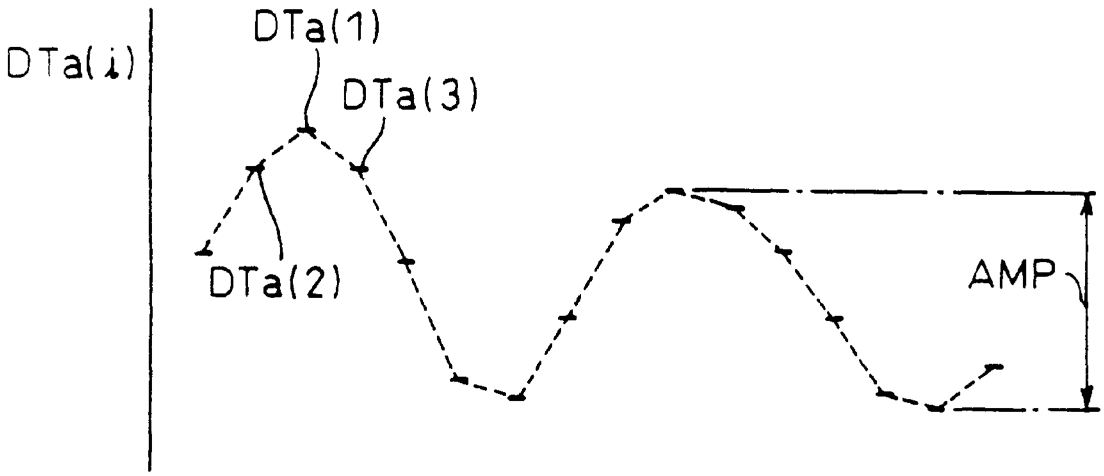
FIG. 13 is a time chart of the changes of the difference in the elapsed times Ta(i)

Returning the discussion to the calculation of torque fluctuation once again, when torsional vibration occurs in the engine drive system, the difference in elapsed times DTa(i) fluctuates as shown in FIG. 10. This difference in elapsed times DTa(i), however, fluctuates even when the vehicle is driving over a bumpy road. Further, at this time, the degree of fluctuation of the DTa(i) becomes extremely large in some cases. FIG. 13 shows the fluctuation in DTa(i) when the vehicle is riding over a bumpy road. The AMP of FIG. 13 shows the difference between the minimum DTa(i) and the maximum DTa(i), that is, the amplitude. When this amplitude AMP is small, it is possible to accurately detect the output fluctuation and torque fluctuation of the cylinders by the method described up to here.

When the amplitude AMP becomes large, however, it no longer becomes possible to accurately detect the output fluctuation or torque fluctuation of the cylinder giving the maximum or minimum DTa(i). That is, in FIG. 13, first, assuming that the cylinder giving the maximum DTa(i) is the No. 1 cylinder #1, the amount of decrease I due to the torsional vibration of the assumed difference of elapsed times Kb(1) of the No. 1 cylinder #1 is found from the slope of the broken line connecting DTa(1) and DTa(3) in FIG. 11. Near where DTa(1) becomes maximum, the amount of increase or amount of decrease of the elapsed time due to the torsional vibration changes by a smooth curve passing through DTa(2), DTa(1), and DTa(3). Therefore, if the Kb(1) of the No. 1 cylinder #1 is found from DTa(1) and DTa(3), the value of Kb(1) is calculated considerably smaller than the actual value. As a result, Kb(1) no longer shows the correct value and therefore the amount of output fluctuation and the amount of torque fluctuation can no longer be accurately detected. If the amplitude AMP becomes larger, the same thing happens in the cylinder giving the minimum DTa(i).

Further, the value of Kb(i) deviates from the actual value even in cylinders where the DTa(i) sharply changes from the DTa(i) of the cylinder where combustion was performed one time before, therefore it no longer becomes possible to accurately detect the output fluctuation and torque fluctuation. Therefore, in this embodiment according to the present invention, when the amplitude AMP is large, the amount of output fluctuation or amount of torque fluctuation is not sought for the cylinders giving the maximum or minimum DTa(i). Further, the amount of output fluctuation or the amount of torque fluctuation is not sought for cylinders where DTa(i) changes sharply from the DTa(i) of the cylinder where combustion was performed one time before.

Further, in this embodiment of the present invention, the amount of fluctuation of the rotational speed of the turbine runner 37 of the torque converter 32 is detected from the output pulse of the rotational speed sensor 41 showing the vehicle speed, it is judged if the vehicle is driving over a rough road based on the amount of fluctuation of the rotational speed of the turbine runner 37, and correction of the air-fuel ratio is prohibited when it is judged that the vehicle is driving over a rough road.

That is, when the vehicle is driving over a rough road, an external force acting on the front wheels is directly applied to the turbine runner 37 of the torque converter 32, therefore the rotational speed of the turbine runner 37 fluctuates greatly. The fluctuation in rotational speed of the turbine runner 37 is transmitted to the crankshaft through the pump impeller 35, therefore fluctuation occurs in the rotational speed of the crankshaft. On the other hand, even when the rotational speed of the crankshaft fluctuates due to fluctuation of the combustion pressure, the rotational speed of the turbine runner 37 fluctuates and therefore it is not known whether the fluctuation of the rotational speed of the crankshaft is due to driving over a rough road or due to fluctuation in the combustion pressure. The fluctuation in rotational speed of the turbine runner 37 caused due to the vehicle driving over a rough road has been confirmed to be larger than that due to the fluctuation of the combustion pressure. Therefore, in this embodiment of the present invention, when the average value of the amount of fluctuation of the rotational speed of the turbine runner 37 exceeds a predetermined first set value for more than a predetermined time, it is judged that the vehicle is driving over a rough road and the correction of the air-fuel ratio is prohibited.

There are various shapes of rough roads, however. In actuality, there are cases where even if a vehicle is actually driving over a rough road, this cannot be detected by the above-mentioned method. That is, rough roads include both rough roads with large depressions or bumps in the road surface and with gentle changes in the shape of the road surface (hereinafter referred to as "large depression/bump roads") and rough roads with small depressions or bumps in the road surface and with sharp changes in the shape of the road surface (hereinafter referred to as "small depression/bump roads"). The above method can detect large depression/bump roads. Even when the vehicle is driving over small depression/bump roads, however, the average value of the amount of fluctuation of the rotational speed of the turbine runner 37 will not change that much. Even if becoming large, this is only for an extremely short time. Therefore, with the above method, it is not possible to detect when the vehicle is driving over a small depression/bump road. When the vehicle is driving over a small depression/bump road, the rotational speed of the turbine runner 37 fluctuates with a short cycle. As opposed to this, when the combustion pressure fluctuates, the rotational speed of the turbine runner 37 fluctuates with a longer cycle. Therefore, in this embodiment of the present invention, when the rotational speed of the turbine runner 37 is larger than a predetermined second set value and the cycle of the fluctuation is smaller than a predetermined value, it is judged that the vehicle is driving over a rough road and correction of the air-fuel ratio is prohibited.

Further, in this embodiment of the present invention, the amounts of fluctuation of the rotational speed of the vehicle's front wheels 43 and the vehicle's rear wheels 45 are detected from the output pulses of the rotational speed sensors 47 and 48, it is judged that the vehicle is driving over a rough road based on the amounts of fluctuation and vehicle speeds of the front wheels 43 and rear wheels 45, and correction of the air-fuel ratio is prohibited when it is judged that the vehicle is driving over a rough road.

As explained above, it can be judged if the vehicle is driving over a large depression/bump road or a small depression/bump road based on the amount of fluctuation of the rotational speed of the turbine runner 37. With this method, however, it is possible to judge that the vehicle is driving over a rough road even if the depressions or bumps of the road surface continue over a certain distance or if there are single considerably large depressions or bumps of the road surface. In other words, when the vehicle is driving over a rough road with single considerably small depressions or bumps of the road surface (hereinafter referred to as "single depression/bump roads"), it is not possible to judge if the vehicle is driving over a rough road based on the amount of fluctuation of the rotational speed of the turbine runner 37. That is to say, even if the vehicle is driving over a single depression/bump road, the amount of fluctuation of the turbine runner 37 will not become that large and even if becoming large, the rotational speed of the turbine runner 37 will not change cyclically. On the other hand, if the vehicle is driving over a single depression/bump road, the amount of fluctuation of the rotational speed of the front wheels 43 and rear wheels 45 will become considerably small or large temporarily, that is, peak values will occur in the fluctuation of the rotational speed of the front wheels 43 and rear wheels 44. On the other hand, even when the combustion pressure fluctuates, the peak values of the rotational speeds of the front wheels 43 and rear wheels 44 can occur. When the vehicle is driving (forward) over a single depression/bump road, a peak value occurs in the fluctuation of the rotational speed of the rear wheels 45 after exactly a time determined by the vehicle speed elapses from the occurrence of the peak value of the fluctuation of the rotational speed of the front wheels 43. Therefore, in this embodiment of the present invention, the actual elapsed time from when the peak value of the fluctuation of the rotational speed of the front wheels 43 occurs to when the peak value of the rear wheels 45 occurs is detected, the assumed elapsed speed from when the peak value of the fluctuation of the rotational speed of the front wheels 43 when assuming the vehicle is driving over a single depression/bump road to when the peak value of the fluctuation of the rotational speed of the rear wheels 45 occurs is found based on the vehicle speed, it is judged that vehicle is driving over a rough road when the actual elapsed time and the assumed elapsed speed substantially coincide, and correction of the air-fuel ratio is prohibited.

Further, in this embodiment of the present invention, the amount of output fluctuation and amount of torque fluctuation when it is judged that the vehicle is driving over a rough road is stored and the correction of the air-fuel ratio is resumed based on the amount of output fluctuation or amount of torque fluctuation stored is resumed when the prohibition on the correction of the air-fuel ratio based on the amount of output fluctuation or the amount of torque fluctuation should be lifted due to judgement that the vehicle is driving over a rough road.

Figure 23:
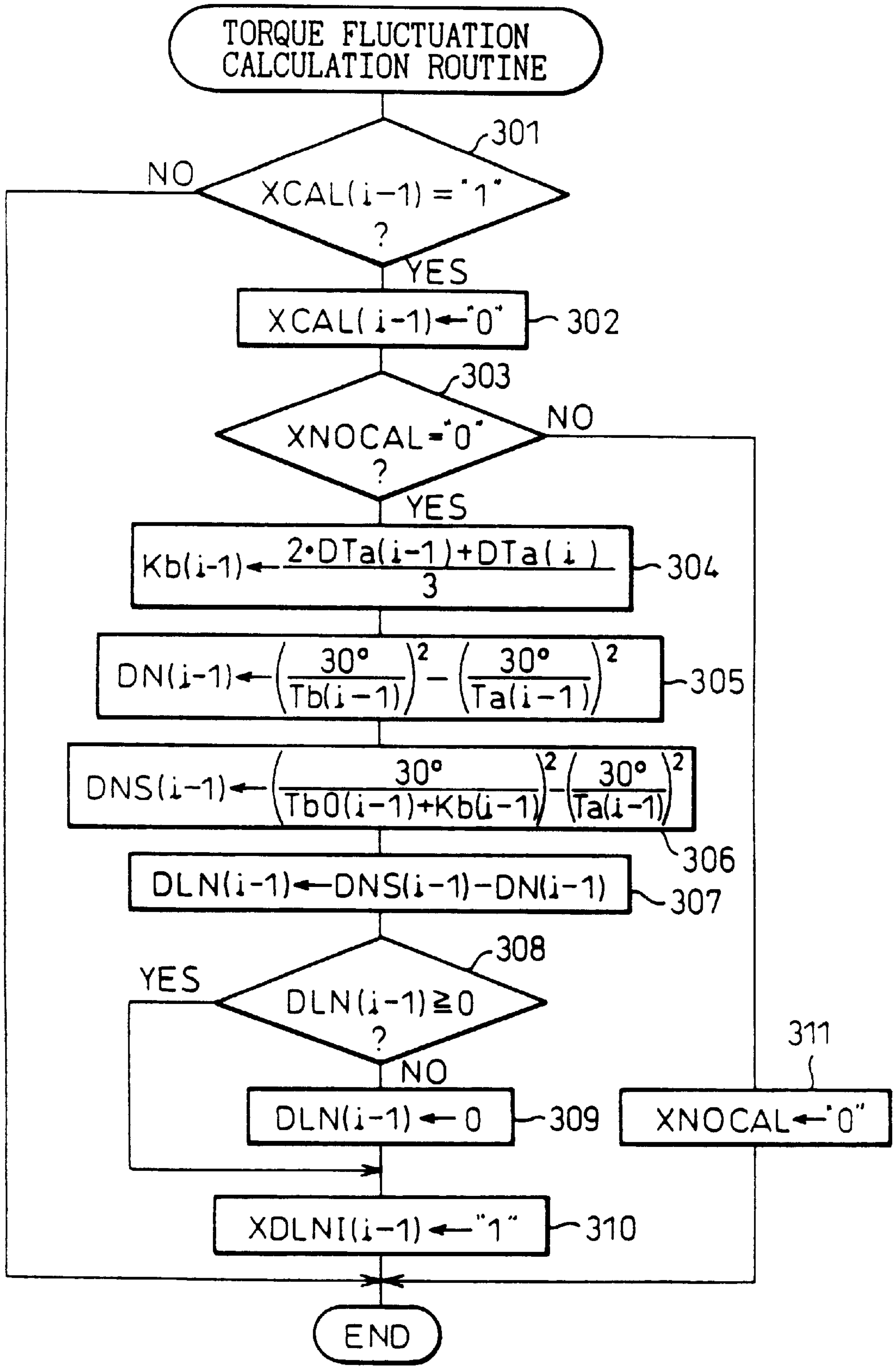
FIG. 23 is a flow chart for calculating the amount of torque fluctuation.
Figure 24:
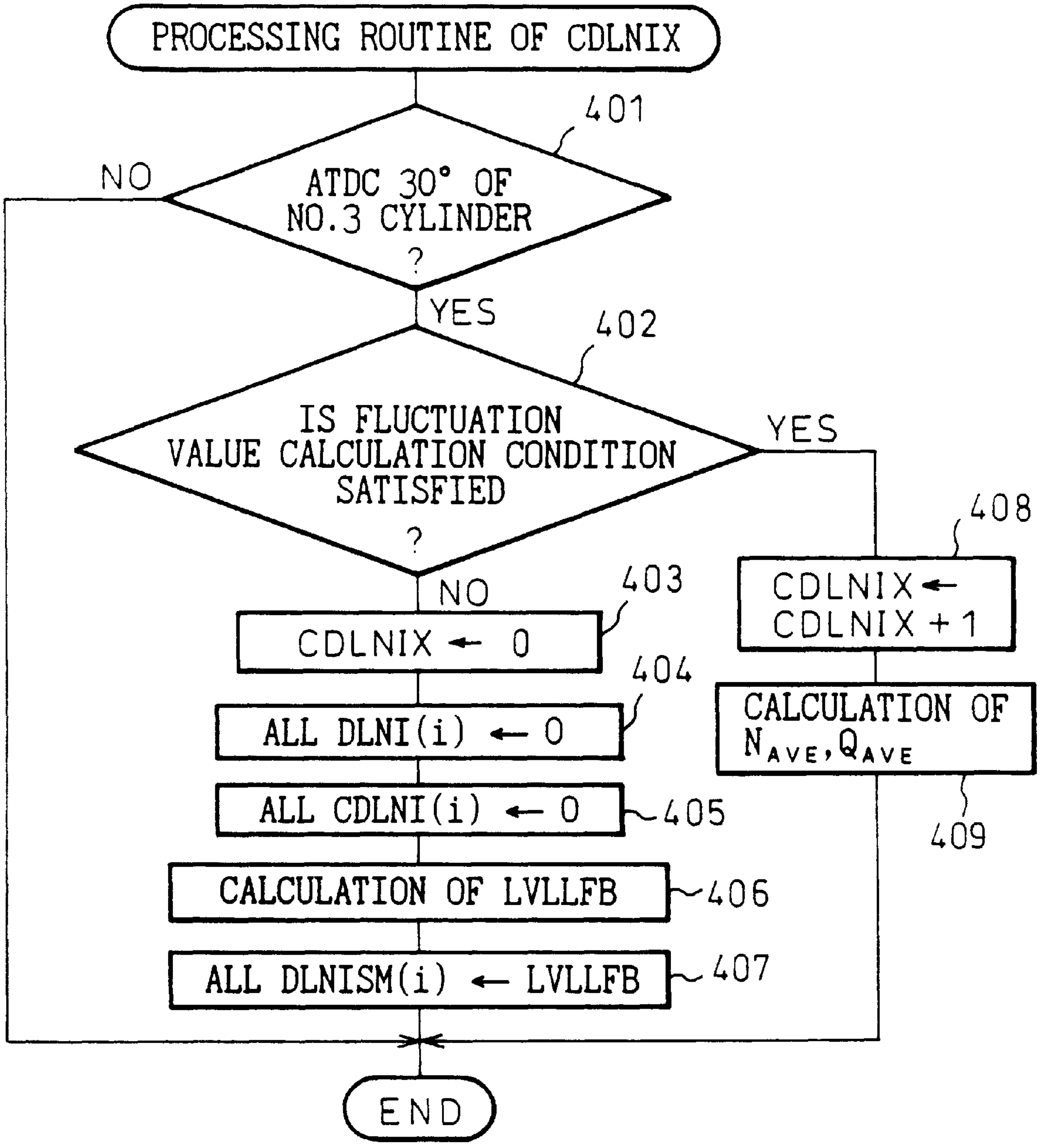
FIG. 24 is a flow chart of the processing of the counter CDLNIX.
Figure 25:
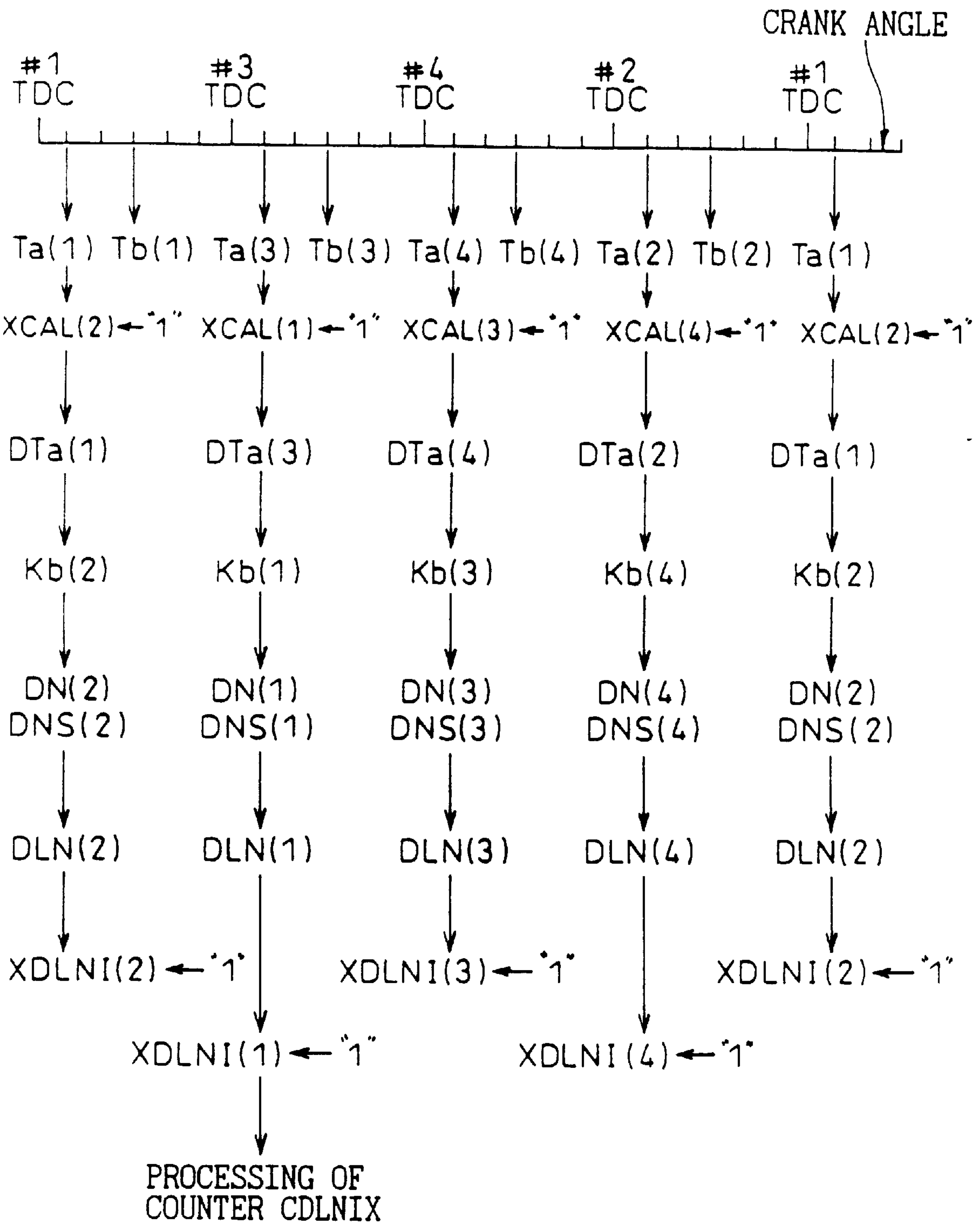
FIG. 25 is a view of the timings for calculation of various values.

Next, the routines for finding the amount of fluctuation of torque at each cylinder will be explained referring to FIG. 14 to FIG. 25. Note that, FIG. 25 shows the timing for calculation of the various values performed in each routine.

Figure 14:
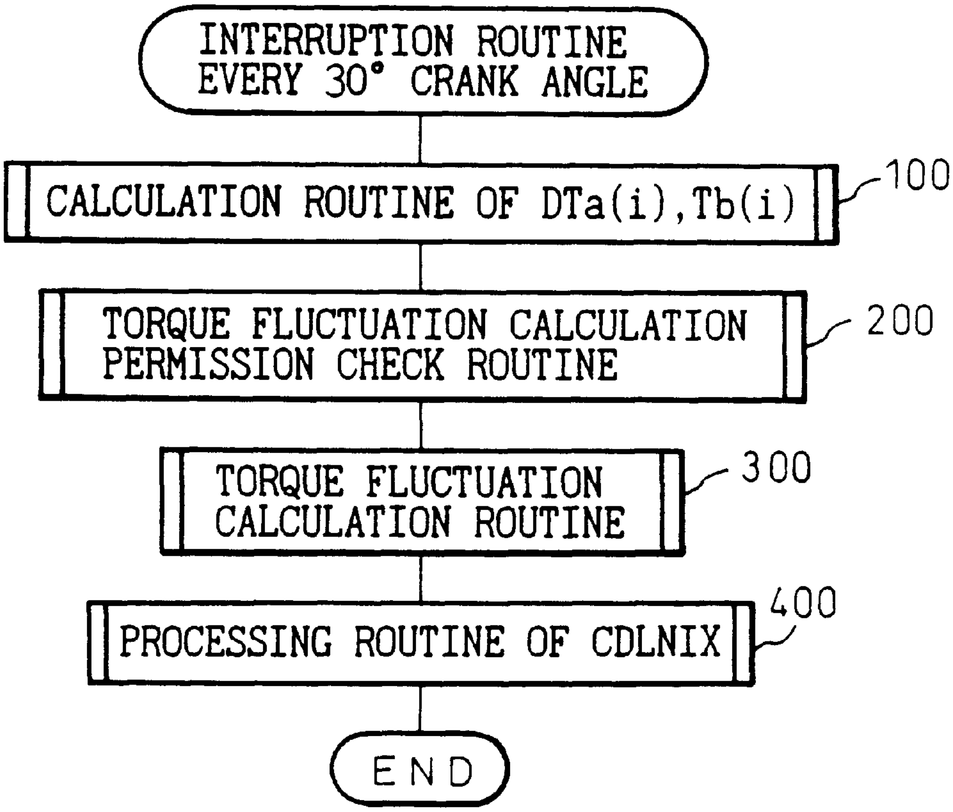
FIG. 14 is a flow chart of the interruption routine.
Figure 19:
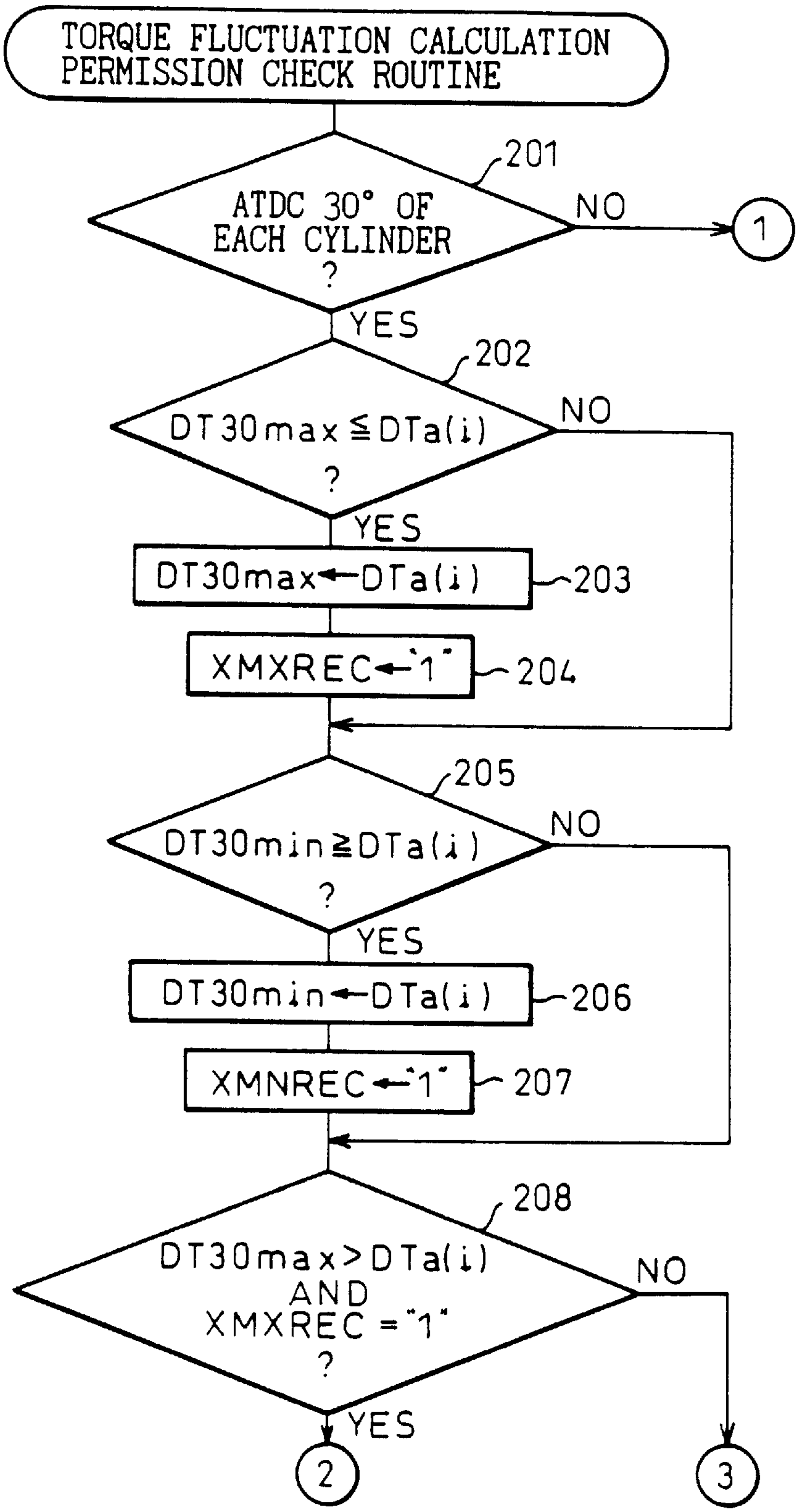
FIGS. 19 to 21 are flow charts for checking permission for calculation of the amount of torque fluctuation.
Figure 20:
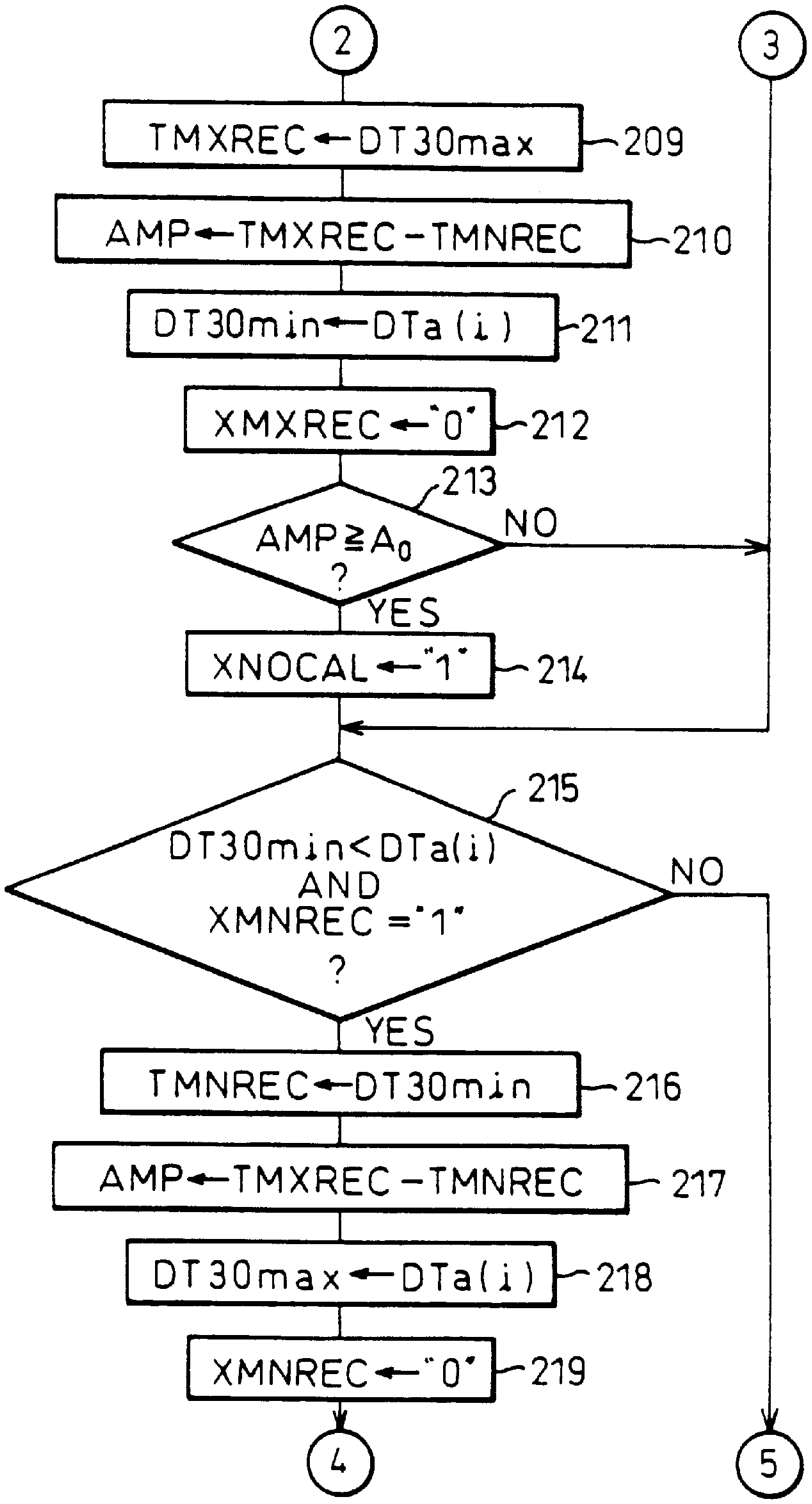
Figure 21:
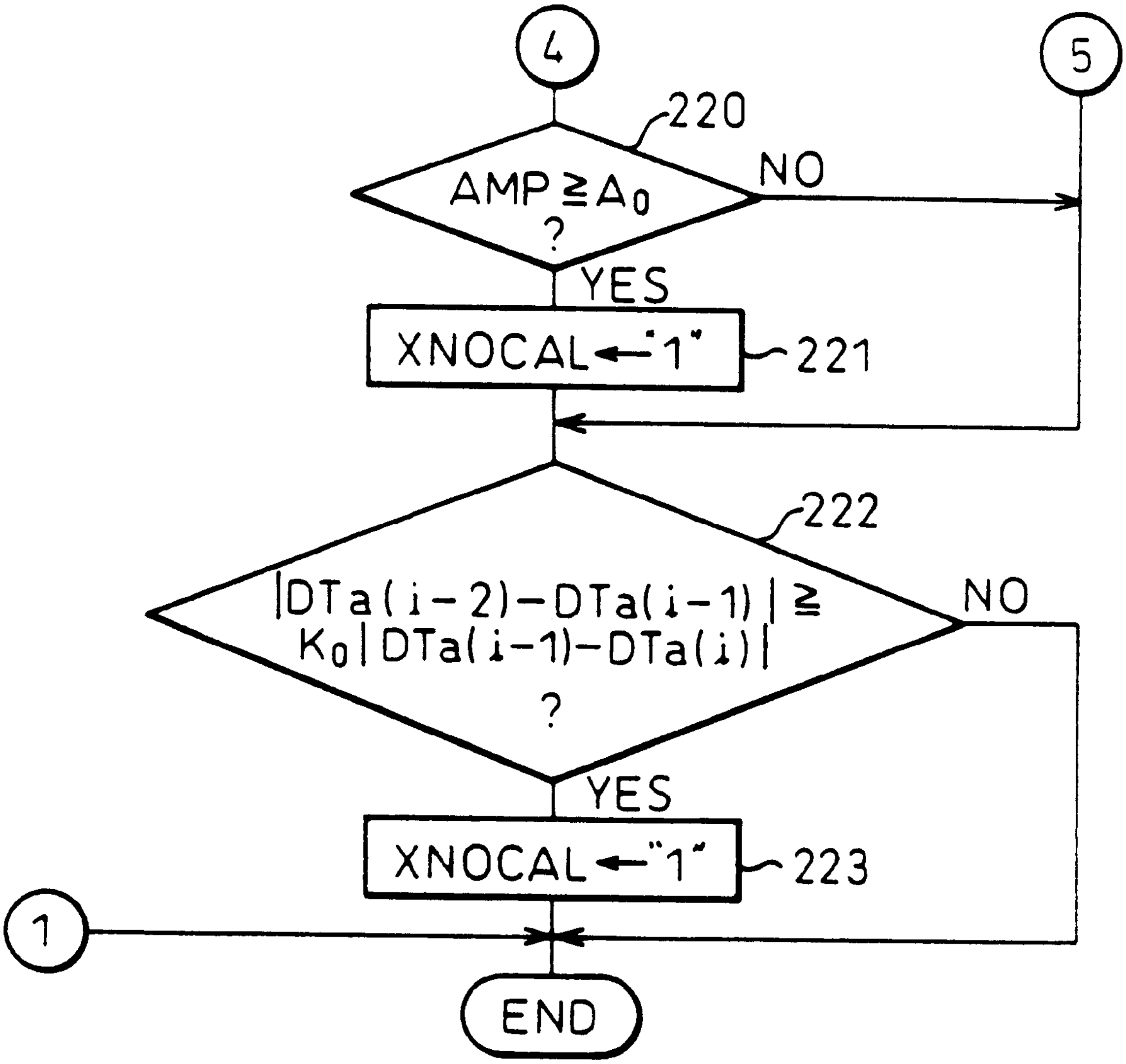

FIG. 14 shows an interruption routine performed at every 30° crank angle. Referring to FIG. 14, first the routine (step 100) for calculating the difference of elapsed times DTa(i) and the elapsed time Tb(i) is proceeded to. This routine is shown in FIG. 15 to FIG. 18. Next, the routine (step 200) for checking if calculation of the torque fluctuation is permitted or not is proceeded to. This routine is shown in FIG. 19 to FIG. 21. Next, the routine for calculating the torque fluctuation (step 300) is proceeded to. This routine is shown in FIG. 23. Next, the routine for processing of the counter CDLNIX used for calculating the torque fluctuation value is proceeded to. This routine is shown in FIG. 24.

Referring to FIG. 15 to FIG. 18 showing the routine for calculation of the difference of elapsed times DTa(i) and the elapsed time Tb(i), first, at step 101, the time TIME is made the TIME0. The electronic control unit 20 is provided with a free run counter showing the time. The time TIME is calculated from the count value of this free run counter. Next, at step 102, the current time TIME is fetched. Therefore, the TIME0 of step 101 expresses the time of 30° crank angle before.

Next, at step 103, whether the No. 1 cylinder is currently at ATDC 30° or not is judged. When the No. 1 cylinder is not currently at ATDC 30°, step 111 is jumped to, where it is judged whether the No. 1 cylinder is currently at ATDC 90° or not. When the No. 1 cylinder is not currently at ATDC 90°, the routine for calculation of the difference of elapsed times DTa(i) and the elapsed time Tb(i) is ended.

As opposed to this, when it is judged at step 103 that the No. 1 cylinder is currently at ATDC 30°, step 104 is proceeded to, where the elapsed time Ta(i) calculated 720° crank angle before is made TaO(i). Next, at step 105, the final elapsed time Ta(i) from TDC to ATDC 30° of the No. No. i cylinder is calculated based on the following equation:

$$Ta(i)=(TIME-TIME0)-(1+KTa(i))$$

That is, for example, when the No. 1 cylinder #1 is currently at ATDC 30°, the final elapsed time Ta(1) from TDC to ATDC 30° of the No. 1 cylinder #1 is calculated from (TIME−TIME0)−(1+KTa(i)). Here, (TIME−TIME0) expresses the elapsed time Ta(1) actually measured from the crank angle sensor 15 and KTa(1) is a correction coefficient for correction of the error due to the spaces of the outer teeth of the rotor 13, therefore the final elapsed time Ta(1) obtained by multiplying (TIME−TIME0) with (1+KTa(1)) comes to accurately express the elapsed time when the crankshaft rotates by 30° crank angle.

Next, at step 106, the elapsed time Ta(i) currently calculated is reduced by the elapsed time TaO(i) calculated 720° crank angle before so as to calculate the difference of elapsed times DTa(i) (=Ta(i)−TaO(i)). Next, at step 107, it is judged if No. 2 cylinder #2 is currently at ATDC 30°. When the No. 2 cylinder #2 is not at ATDC 30°, the routine jumps to step 110, where the flag XCAL(i−1) of the No. (i−1) cylinder where combustion had been performed one time before showing that the amount of torque fluctuation should be calculated is set (XCAL(i−1)←"1"). Next, the routine proceeds to step 111. In this embodiment according to the present invention, as explained above, since the ignition sequence is 1-3-4-2, when the No. 1 cylinder #1 is currently at ATDC 30°, the flag XCAL(2) of the No. 2 cylinder #2 where the combustion had been performed one time before showing that the amount of torque fluctuation should be calculated is set. In the same way, when the final elapsed time Ta(3) is calculated as shown in FIG. 25, the flag XCAL(1) is set, when the final elapsed time Ta(4) is calculated, the flag XCAL(3) is set, and when the final elapsed time Ta(2) is calculated, the flag XCAL(4) is set.

On the other hand, when it is judged at step 111 that the No. 1 cylinder is currently at ATDC 90°, step 112 is proceeded to, where the elapsed time Tb(i) calculated 720° crank angle before is made TbO(i). Next, at step 113, the final elapsed time Tb(i) from ATDC 60° to ATDC 90° of the No. i cylinder is calculated based on the following equation:

$$Tb(i)=(TIME-TIME0)-(1+KTb(i))$$

That is, for example, when the No. 1 cylinder #1 is currently at ATDC 90°, the final elapsed time Tb(1) from ATDC 60° to ATDC 90° of the No. 1 cylinder #1 is calculated from (TIME−TIME0)·(1+KTb(1)). In this case as well, since the value (1+KTb(1)) for correcting the error due to the spaces of the outer teeth of the rotor 13 is multiplied with (TIME−TIME0), the final elapsed time Tb(1) accurately expresses the elapsed time in the cycle when the crankshaft rotates by 30° crank angle. Next, at step 114, it is judged if the No. 2 cylinder #2 is currently at ATDC 90° or not. When the No. 2 cylinder #2 is not currently at ATDC 90°, the routine for calculation of the difference of elapsed times DTa(i) and the elapsed time Tb(i) is ended.

On the other hand, when it is judged at step 107 that the No. 2 cylinder #2 is currently at ATDC 30°, the routine proceeds to step 108, where the average value $TaAV_j$ of the elapsed times Ta(i) in the 720° crank angle range (j) is calculated based on the following equation:

$$TaAV_j=(Ta(1)+Ta(3)+Ta(4)+Ta(2))/4$$

Here, Ta(1), Ta(3), Ta(4), and Ta(2) correspond to $Ta(1)_j$, $Ta(3)_j$, $Ta(4)_j$, and $Ta(2)_j$ in FIG. 12. Next, the routine for calculation of the correction coefficient KTa(i) of step 109 is proceeded to. This routine is shown in FIG. 17.

Figure 17:
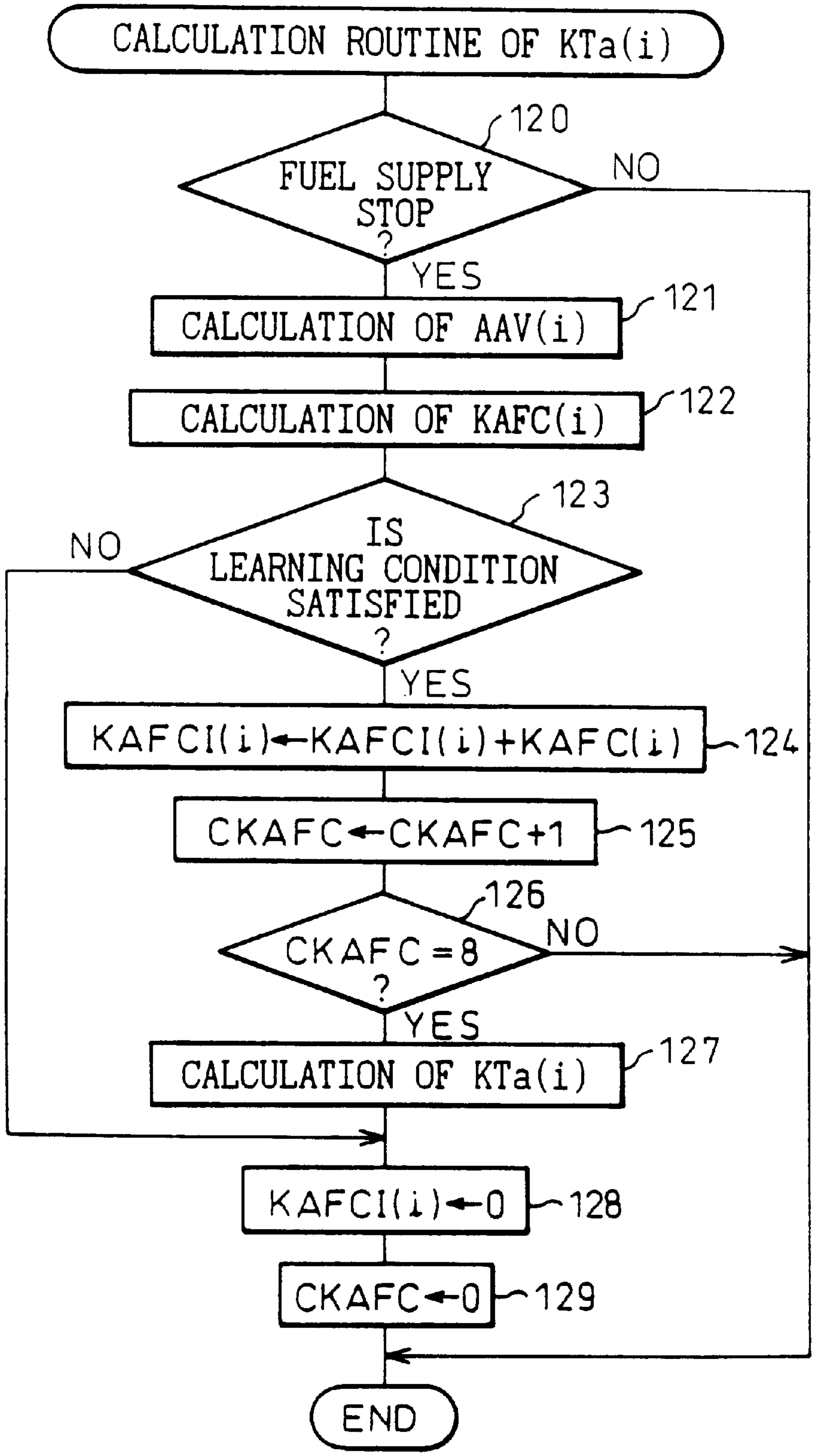
FIG. 17 is a flow chart for calculating KTa(i)

Referring to FIG. 17, first, at step 120, it is judged if the fuel supply is stopped during a deceleration operation or not. When the fuel supply is not stopped during a deceleration operation, the processing cycle ends, while when the fuel is stopped during the deceleration operation, step 121 is proceeded to. At step 121, the elapsed times AAV(4), AAV(2), AAV(1), and AAV(3) shown in FIG. 12 when assuming an increase by an average constant rate of increase are calculated as follows from the average value $TaAV_j$ of the elapsed times Ta(i) calculated at step 108 and the average value $TaAV_{j-1}$ of the elapsed time Ta(i) at the 720° crank angle range (j−1) of FIG. 12 calculated previously (=(Ta(1)+Ta(3)+Ta(4)+Ta(2))/4) (where Ta(1), Ta(3), Ta(4), and Ta(2) correspond to $Ta(1)_{j-1}$, $Ta(3)_{j-1}$, $Ta(4)_{j-1}$, and $Ta(2)_{j-1}$ shown in FIG. 12).

$$AAV(4)=(TaAV_j-TaAV_{j-1})\cdot(1/8)+TaAV_{j-1}$$

$$AAV(2)=(TaAV_j-TaAV_{j-1})\cdot(3/8)+TaAV_{j-1}$$

$$AAV(1)=(TaAV_j-TaAV_{j-1})\cdot(5/8)+TaAV_{j-1}$$

$$AAV(3)=(TaAV_j-TaAV_{j-1})\cdot(7/8)+TaAV_{j-1}$$

Next, at step 122, the ratios of deviation KAFC(4), KAFC(2), KAFC(1), and KAFC(3) for the actually detected elapsed times TaO(4), TaO(2), TaO(1), and TaO(3) for the elapsed times AAV(4), AAV(2), AAV(1), and AAV(3) are found based on the following equations: Here, TaO(4), TaO2), Ta(1), and Ta(3) correspond to the $Ta(4)_{j-1}$, $Ta(2)_{j-1}$, $Ta(1)_j$, and $Ta(3)_j$ shown in FIG. 12.

$$KAFC(4)=(TaO(4)-AAV(4)\}/AAV(4)$$

$$KAFC(2)=(TaO(2)-AAV(2)\}/AAV(2)$$

$$KAFC(1)=(TaO(1)-AAV(1)\}/AAV(1)$$

$$KAFC(3)=(TaO(3)-AAV(3)\}/AAV(3)$$

Next, at step 123, it is judged if the conditions for learning the correction coefficient KTa(i) are satisfied or not. For example, when a predetermined time has elapsed from when the fuel supply is stopped and the engine speed is in a predetermined range and the vehicle is driving over rough roads, for example, when the amplitude AMP of the difference of elapsed times DTa(i) shown in FIG. 13 exceeds a set value, it is judged that the learning conditions are satisfied. When the learning conditions are not satisfied, the routine proceeds to step 128, where the cumulative count KAFCI(i) of the amount of deviation KAFC(i) is made zero. Next, at step 129, the count CKAFC is cleared.

As opposed to this, when the learning conditions are satisfied, step 124 is proceeded to, where the amount of deviation KAFC(i) for the cylinders is added to the corresponding cumulative value KAFCI(i). Next, at step 125, the cumulative count CKAFC is incremented by exactly 1. Next, at step 126, it is judged if the cumulative count CKAFC has become "8". When the cumulative count CKAFC is not "8", the processing cycle ends, while when the cumulative count CKAFC becomes "8", step 127 is proceeded to, where the correction coefficient KTa(i) is calculated. That is, when the amount of deviation KAFC(i) is cumulatively added eight times for each cylinder, step 127 is proceeded to, where the correction coefficient KTa(i) is calculated.

At step 127, the correction coefficient KTa(i) is calculated in the following way. That is, first, the cumulative value KAFCI(i) is replaced by KAFCE(i). Next, the basic correction coefficient KTaB(i) is calculated based on the following equation:

$$KTaB(i)=KTa(i)-(KAFCI(i)/8)/4$$

That is, when deviation occurs from the elapsed time AAC(i) when assuming the actually detected elapsed time Ta(i) increases by an average constant rate of increase, the value of the current correction coefficient KTa(i) revised by exactly ¼ of the average value of the cumulative value KAFCI(i) is made the basic correction coefficient KTaB(i). Next, the mean value tKTaM of the basic correction coefficient KTaB(i) for all of the cylinders is calculated based on the following equation:

$$tKTaM=(KTaB(1)+KTaB(2)+KTaB(3)+KTaB(4))/4$$

Next, the basic correction coefficient KTaB(i) is revised by the average value tKTaM as shown by the following equation so as to update the correction coefficient KTa(i).

$$KTa(i)=KTaB(i)-tKTaM$$

The correction coefficients KTa(i) for all cylinders at the time the fuel injection is stopped during a deceleration operation are updated in this way.

Figure 16:
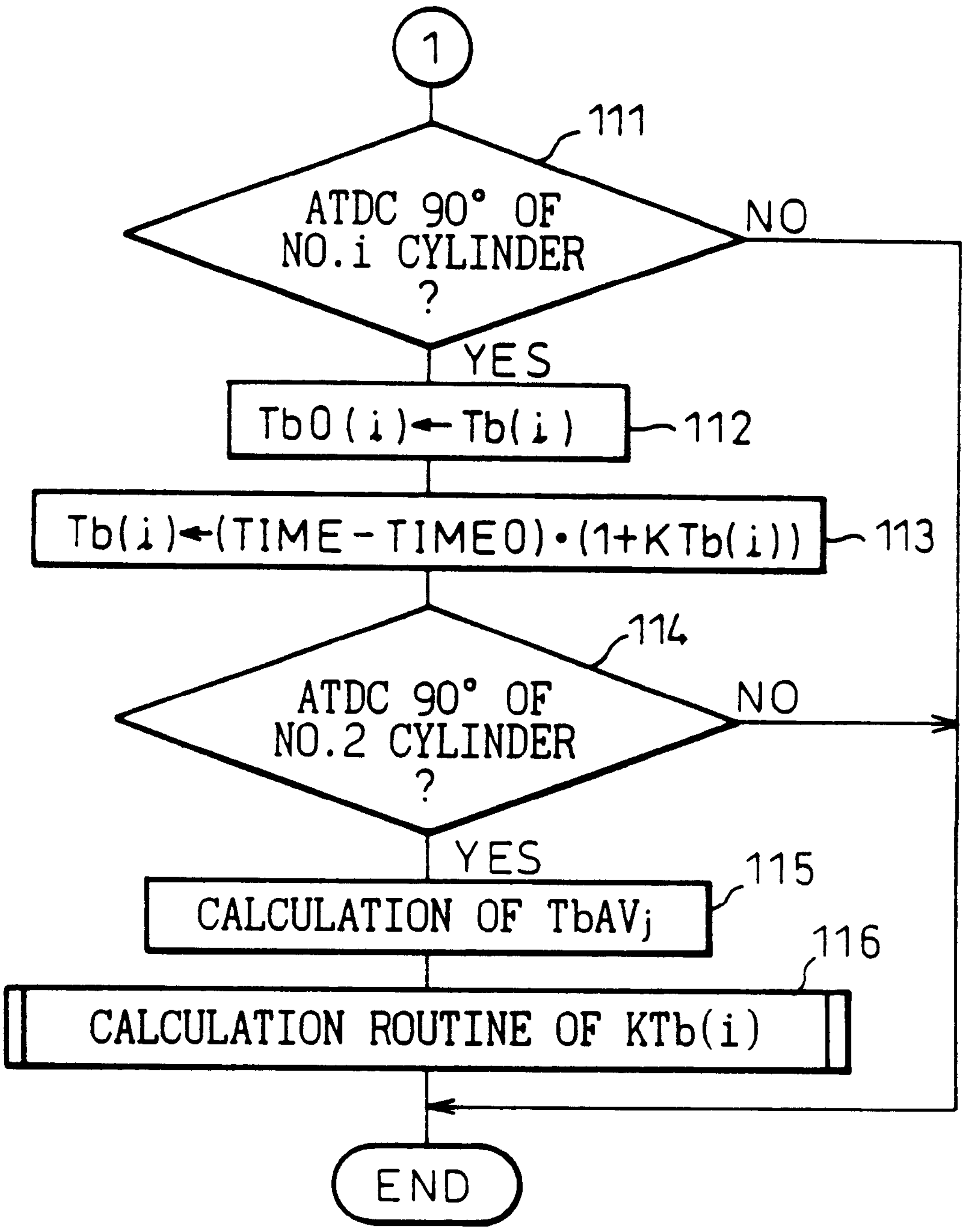

On the other hand, when it is judged at step 114 of FIG. 16 that the No. 2 cylinder #2 is currently at ATDC 90°, step 115 is proceeded to, where the same method as when finding $TaAV_j$ is used to calculate the average value $TbAV_j$ of the elapsed time Tb(i) in the 720° crank angle range based on the following equation:

$$TbAV_j=(Tb(1)+Tb(3)+Tb(4)+Tb(2))/4$$

Next, the routine for calculation of the correction coefficient KTb(i) of step 116 is proceeded to. This routine is shown in FIG. 18.

Figure 18:
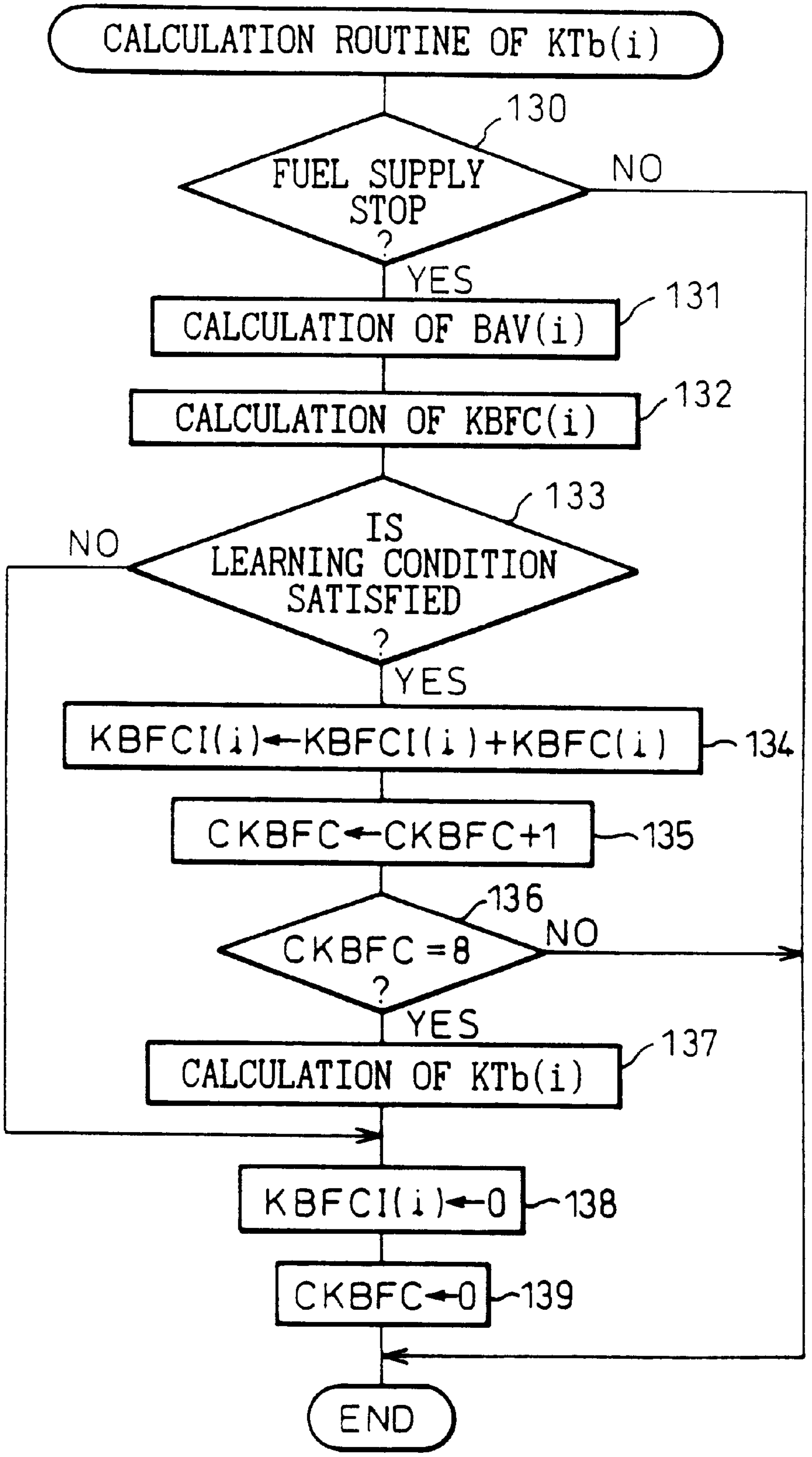
FIG. 18 is a flow chart for calculating KTa(i)

Referring to FIG. 18, first, at step 130, it is judged if the supply of fuel has been stopped during a deceleration operation. When the supply of fuel has not been stopped during a deceleration operation, the processing cycle is ended, while when the supply of fuel has been stopped during a deceleration operation, step 131 is proceeded to. At step 131, the elapsed times BAV(4), BAV(2), BAV(1), and BAV(3) when assuming an increase by an average constant rate of increase are calculated from the average value $TbAV_j$ of the elapsed time Tb(i) calculated at step 115 and the average value $TbAV_{j-1}$ of the elapsed time Tb(i) in the one previous 720° crank angle range (=(Tb(1)+Tb(3)+Tb(4)+Tb(2))/4).

$$BAV(4)=(TbAV_j-TbAV_{j-1})\cdot(1/8)+TbAV_{j-1}$$

$$BAV(2)=(TbAV_j-TbAV_{j-1})\cdot(3/8)+TbAV_{j-1}$$

$$BAV(1)=(TbAV_j-TbAV_{j-1})\cdot(5/8)+TbAV_{j-1}$$

$$BAV(3)=(TbAV_j-TbAV_{j-1})\cdot(7/8)+TbAV_{j-1}$$

Next, the ratios of deviation KBFC(4), KBFC(2), KBFC(1), and KBFC(3) for the actually detected elapsed times TbO(4), TbO(2), Tb(1), and Tb(3) for the elapsed times BAV(4), BAV(2), BAV(1), and BAV(3) are found based on the following equations:

$$KBFC(4)=(TbO(4)-BAV(4)\}/BAV(4)$$

$$KBFC(2)=(TbO(2)-BAV(2)\}/BAV(2)$$

$$KBFC(1)=(Tb(1)-BAV(1)\}/BAV(1)$$

$$KBFC(3)=(Tb(3)-BAV(3)\}/BAV(3)$$

Next, at step 133, it is judged if the conditions for learning the correction coefficient KTb(i) are satisfied or not. As explained above, when a predetermined time elapses from when the fuel supply is stopped, the engine speed is within a predetermined range, and the vehicle is not driving over rough roads, for example, when the amplitude AMP of the difference of elapsed times DTa(i) shown in FIG. 13 is not over the set value, it is judged that the learning conditions are satisfied. When the learning conditions are not satisfied, step 138 is proceeded to, where the cumulative value KBFCI (i) of the amount of deviation KFBC(i) is made zero. Next, at step 139, the cumulative count CKBFC is cleared.

As opposed to this, when the learning conditions are satisfied, step 134 is proceeded to, where the amount of deviation KBFC(i) with respect to the cylinders is added to the corresponding cumulative value KBFCI(i), then the cumulative count CKBFC is incremented by exactly 1 at step 135. Next, at step 136, it is judged if the cumulative count CKBFC has become "8" or not. When the cumulative count CKBFC is not "8", the processing cycle is ended. When the cumulative count CKBFC has become "8", step 137 is proceeded to, where the correction coefficient KTb(i) is calculated. That is, if the amount of deviation KBFC(i) is cumulatively added eight times for each cylinder, step 137 is proceeded to, where the correction coefficient KTb(i) is calculated.

At step 137, the correction coefficient KTb(i) is calculated in the following way. That is, first, the cumulative value KBFCI(i) is replaced by KBFCE(i). Next, the basic correction coefficient KTbB(i) is calculated based on the following equation:

$$KTbB(i)=KTb(i)-(KBFCE(i)/8)/4$$

That is, when a deviation occurs from the elapsed time BAV(i) when assuming the actually detected elapsed time Tb(i) increases by an average constant rate of increase, the value of the current correction coefficient KTb(i) revised by exactly ¼ of the average value of the cumulative value KBFCE(i) is made the basic correction coefficient KTbB(i). Next, the average value tKTbM of the basic correction coefficients KTbB(i) for all of the cylinders is calculated based on the following equation:

$$tKTbM=(KTbB(1)+KTbB(2)+KTbB(3)+KTbB(4))/4$$

Next, as shown by the following equation, the basic correction coefficient KTbB(i) is revised by the average value tKTbM to update the correction coefficient KTb(i):

$$KTb(i)=KTbB(i)-tKTbM$$

The correction coefficients KTb(i) for all cylinders at the time the fuel injection is stopped during a deceleration operation are updated in this way.

Next, the routine for checking permission for calculation of the torque fluctuation shown in FIG. 19 to FIG. 21 will be explained referring to FIG. 22. This routine is set so as to prohibit the calculation of the amount of torque fluctuation for a specific cylinder when the amplitude AMP of the fluctuation of difference of elapsed times DTa(i) (FIG. 13) becomes large due to the vehicle traveling over a bumpy road.

That is, referring to FIG. 19 to FIG. 21, first, at step 201, whether one of the cylinders is currently at ATDC 30° or not is judged. When none of the cylinders is currently at ATDC 30°, the processing cycle is ended, while when one of the cylinders is at ATDC 30°, step 202 is proceeded to.

At step 202 to step 204, the maximum difference of elapsed times DT30max when the difference of elapsed times DTa(i) increases and then decreases is calculated. That is, at step 202, whether the DTa(i) calculated at step 106 is larger than the maximum difference of elapsed times DT30max or not is judged. When DT30max>DTa(i), step 205 is jumped to, while when DT30max≦DTa(i), step 203 is proceeded to, where DTa(i) is made DT30max. Next, at step 204, the increase flag XMXREC showing that DTa(i) is increasing is set (XMXREC–“1”), then step 205 is proceeded to.

Figure 15:
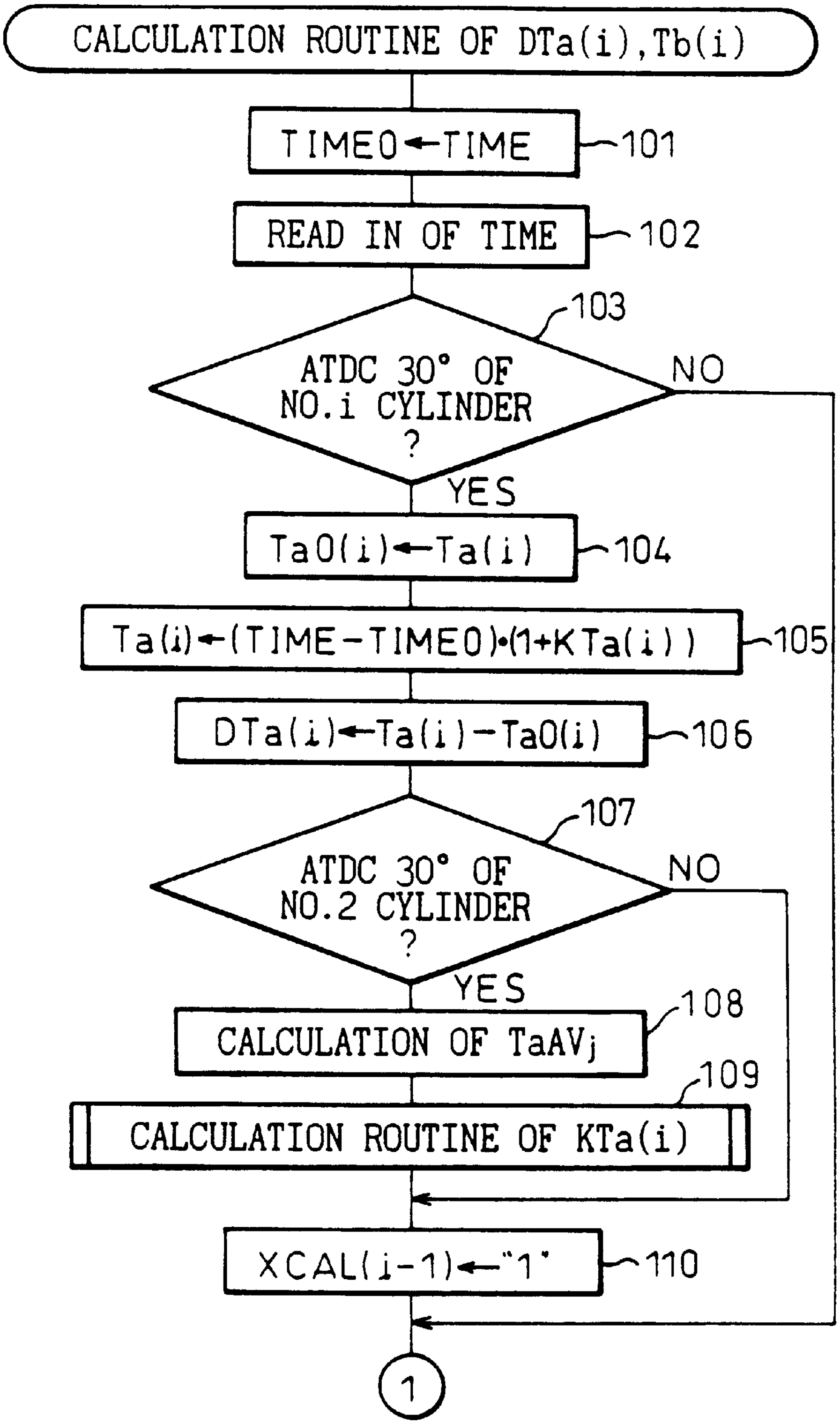
FIGS. 15 and 16 are flow charts for calculating the difference of elapsed times DTa(i) and elapsed time Tb(i)

At step 205 to step 207, the minimum difference of elapsed times DT30min when the difference of elapsed time DTa(i) decreases and then increases is calculated. That is, at step 205, it is judged whether the DTa(i) calculated at step 106 of FIG. 15 is smaller than the minimum difference of elapsed times DT30min or not. When DT30min<DTa(i), step 208 is jumped to, while when DT30min≧DTa(i), step 206 is proceeded to, where DTa(i) is made DT30min. Next, at step 207, the decrease flag XMNREC showing that DTa(i) has decreased is set (XMNREC–“1”), then step 208 is proceeded to.

At step 208 to step 214, when the amplitude AMP of the fluctuation of DTa(i) (FIG. 13) has exceeded the set value $A_0$, the prohibit flag prohibiting the calculation of the amount of torque fluctuation for the cylinder giving the maximum DTa(i) is set. That is, at step 208, it is judged whether DT30max>DTa(i) and XMXREC=“1” or not. When DT30max≦DTa(i) or the increase flag XMXREC is reset (XMXREC=“0”), step 215 is jumped to, while when DT30max>DTa(i) and XMXREC=“1”, step 209 is proceeded to.

Figure 22:
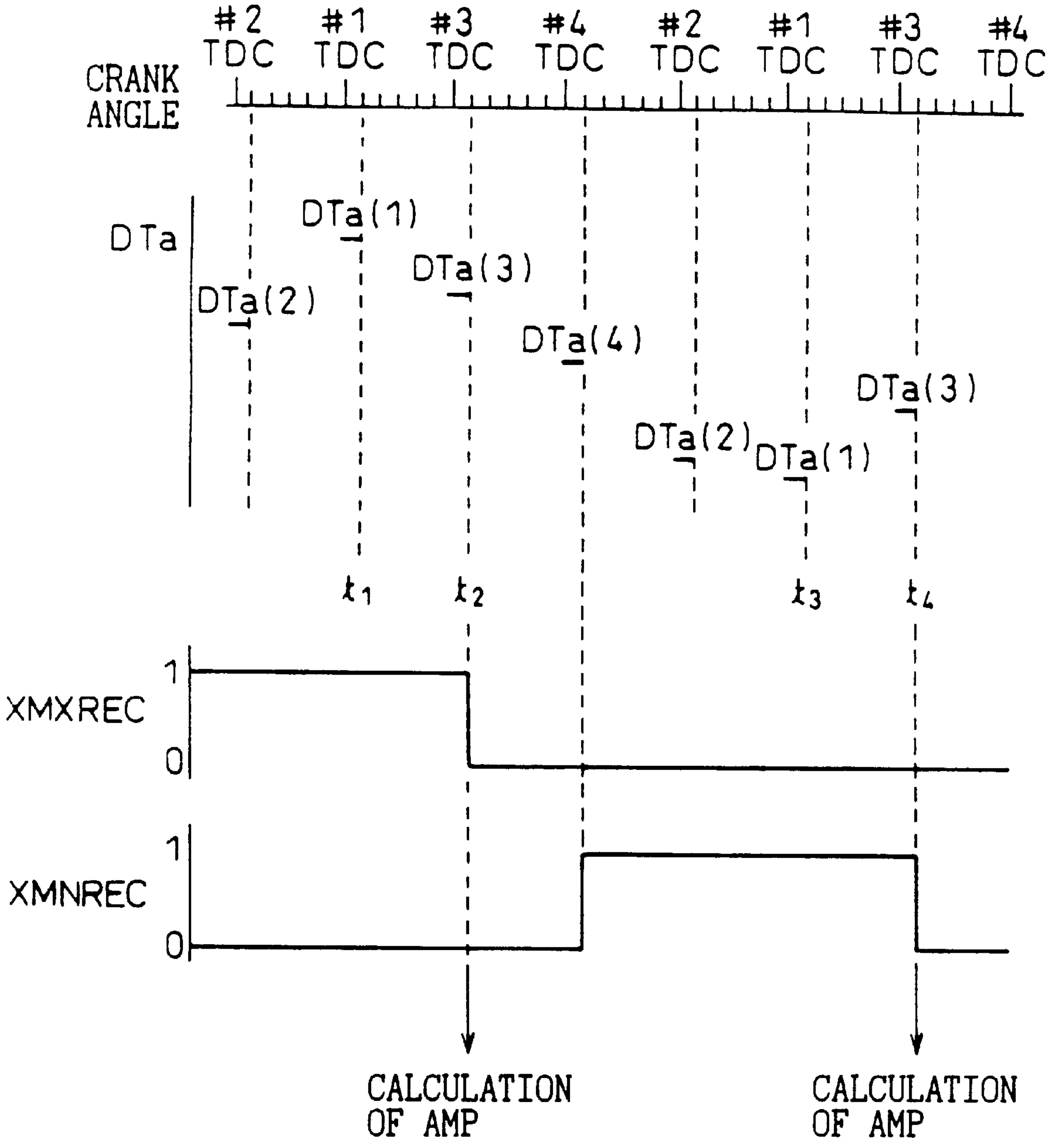
FIG. 22 is a time chart of the changes in the difference of elapsed times DTa(i) and the changes in the flags XMXREC and XMNREC.

That is, as shown in FIG. 22, assume that at the time $t_1$, the difference of the elapsed times DTa(1) of the No. 1 cylinder #1 has become maximum. In this case, in the interruption routine performed at the time $t_1$, step 202 to step 203 is proceeded to, where the DTa(1) is made DT30max, then, at step 204, the maximum flag XMXREC is set. On the other hand, in the interruption routine performed at the time $t_2$ of FIG. 22, step 202 to step 205 is jumped to. At this time, since it is judged at step 208 that DT30max>DTa(3) and XMXREC=“1”, step 209 is proceeded to. That is, step 209 is proceeded to at the time $t_2$ when the elapsed time DTa(i) starts to decrease.

At step 209, the maximum difference of elapsed times DT30max is made TMXREC. Next, at step 210, the minimum difference of elapsed times TMNREC (found at the later explained step 216) is subtracted from the maximum difference of elapsed times TMXREC so as to calculate the amplitude AMP of the fluctuation of DTa(i). Next, at step 211, the initial value of the minimum difference of elapsed times DT30min is made DTa(i). Next, at step 212, the increase flag XMXREC is reset (XMXREC←“0”). Next, at step 213, whether the amplitude AMP is larger than the set value $A_0$ or not is judged. When AMP<$A_0$, step 215 is jumped to. As opposed to this, when AMP≧$A_0$, step 214 is proceeded to, where the torque fluctuation calculation prohibition flag XNOCAL is set (XNOCAL←“1”). That is, in the interruption routine performed at the time $t_2$ of FIG. 22, as explained above, the amount of torque fluctuation of the No. 1 cylinder #1 is calculated. Therefore, in this interruption routine, when AMP≧$A_0$ and the torque fluctuation calculation prohibition flag XNOCAL is set, the calculation of the amount of torque fluctuation of the No. 1 cylinder #1, that is, the calculation of the amount of torque fluctuation of the cylinder giving the maximum DTa(i), is prohibited.

At step 215 to step 221, when the amplitude AMP of the fluctuation of DTa(i) has exceeded the set value $A_0$, the prohibition flag prohibiting the calculation of the amount of torque fluctuation of the cylinder giving the minimum DTa(i) is set. That is, at step 215, it is judged whether DT30min<DTa(i) and XMNREC=“1” or not. When DT30min≧DTa(i) or the decrease flag XMNREC is reset (XMNREC=“0”), step 222 is jumped to, while when DT30min<DTa(i) and XMNREC=“1”, step 216 is proceeded to.

That is, as shown in FIG. 22, at the time $t_3$, the difference of elapsed times DTa(1) of the No. 1 cylinder #1 is considered to have become the minimum. In this case, at the interruption routine performed at the time $t_3$, step 205 to step 206 are proceeded to, where the DTa(1) is made DT30min, then at step 207, the decrease flag XMNREC is set. On the other hand, the interruption routine performed at the time $t_4$ of FIG. 22 jumps from step 205 to step 208. At this time, since it is judged at step 215 that DT30min<DTa(3) and XMNREC=“1”, step 216 is proceeded to. That is, step 216 is proceeded to at the time $t_4$ where the difference of elapsed times DTa(i) starts to be increased.

At step 216, the minimum difference of elapsed times DT30min is made TMNREC. Next, at step 217, the minimum difference of elapsed times TMNREC is subtracted from the maximum difference of elapsed times TMXREC whereby the amplitude AMP of the fluctuation of DTa(i) is calculated. Next, at step 218, the initial value of the maximum difference of elapsed times DT30max is made DTa(i). Next, at step 219, the decrease flag XMNREC is reset (XMNREC←“0”). Next, at step 220, it is judged whether the amplitude AMP is larger than the set value $A_0$ or not. When AMP<$A_0$, step 222 is jumped to. As opposed to this, when AMP≧$A_0$, step 221 is proceeded to, where the torque fluctuation calculation prohibition flag XNOCAL is set (XNOCAL←“1”). That is, in the interruption routine performed at the time $t_4$ of FIG. 22, the amount of torque fluctuation of the No. 1 cylinder #1 is calculated. Therefore, in this interruption routine, when AMP≧$A_0$ and the torque calculation prohibition flag XNOCAL is set, the calculation of the amount of torque fluctuation of the No. 1 cylinder #1, that is, the calculation of the amount of torque fluctuation of the cylinder where DTa(i) becomes smallest, is prohibited.

At step 222 and step 223, the calculation of the amount of torque fluctuation of a cylinder where the elapsed time DTa(i) changes sharply is prohibited. That is, at step 222, whether |DTa(i−2)−DTa(i−1)1 is larger than $K_0$·|DTa(i−1)−DTa(i)| or not is judged. Here, the constant $K_0$ is a value of about 3.0 to 4.0. When it is judged at step 222 that |DTa(i−2)−DTa(i−1)|<$K_0$·|DTa(i−1)|DTa(i)|, the processing routine is ended, while when it is judged that |DTa(i−2)−DTa(i−1)|≧$K_0$·|DTa(i−1)|DTa(i)|, step 223 is proceeded to, where the torque fluctuation calculation prohibition flag XNOCAL is set.

That is, when the interruption routine is at the time $t_3$ of FIG. 22, whether at this time |DTa(4)−DTa(2)|≧$K_0$·|DTa(2)|DTa(1)| or not is judged. As shown in FIG. 22, when DTa(2) changes rapidly from DTa(4), |DTa(4)−DTa(2)| becomes larger than $K_0$·|DTa(2)−DTa(1)|. At this time, the torque fluctuation calculation prohibition flag is set and the calculation of the amount of torque fluctuation of the No. 2 cylinder #2 where the elapsed time DTa(i) has changed sharply is prohibited.

Next, the torque fluctuation calculation routine shown in FIG. 23 will be explained. Referring to FIG. 23, first, at step 301, whether the flag XCAL(i−1) showing that the amount of torque fluctuation of the No. (i−1) cylinder where combustion had been performed one time before should be calculated is set or not is judged. When the flag XCAL(i−1)="0", that is, when the flag XCAL(i−1) is not set, the processing cycle is ended. As opposed to this, when the flag XCAL(i−1)="1", that is, the flag XCAL(i−1) is set, step 302 is proceeded to, where the flag XCAL(i−1) is reset, then step 303 is proceeded to.

At step 303, whether the prohibition flag XNOCAL prohibiting the calculation of the amount of torque fluctuation for the cylinder at which the combustion was performed one time before is reset (XNOCAL="0") or not is judged. When this prohibition flag is set (XNOCAL="1"), step 311 is proceeded to, where the prohibition flag XNOCAL is reset. As opposed to this, when the prohibition flag is reset, step 304 is proceeded to. That is, only when the flag XCAL is set and the prohibition flag XNOCAL is reset, step 304 is proceeded to.

At step 304, the assumed difference of elapsed times Kb(i−1) of the No. (i−1) cylinder where the combustion was performed one time before (see FIG. 10 and FIG. 11) is calculated based on the following equation:

$$Kb(i-1)=\{2\cdot DTa(i-1)+DTa(i)\}/3$$

Next, at step 305, the actual output torque DN(i−1) of the No. (i−1) cylinder where combustion was performed one time before is calculated based on the following equation:

$$DN(i-1)=\{30°/Tb(i-1)\}^2-\{30°/Ta(i-1)\}^2$$

Next, at step 306, the assumed output torque DNS(i−1) of the No. (i−1) cylinder where combustion had been performed one time before is calculated based on the following equation:

$$DNS(i-1)=\{30°/(TbO(i-1)+Kb(i-1))\}^2-\{30°/Ta(i-1)\}^2$$

Next, at step 307, as shown in the following equation, the actual output torque DN(i−1) is subtracted from the assumed output torque DNS(i−1) to calculate the amount of torque fluctuation DLN(i−1) of the No. (i−1) cylinder where combustion had been performed one time before.

$$DLN(i-1)=DNS(i-1)-DN(i-1)$$

That is, for example, when the No. 3 cylinder #3 is at ATDC 30° and the flag XCAL(1) is set, the difference of elapsed times Kb(1) for the No. 1 cylinder #1 is calculated at step 304, then the actual output torque DN(1) of the No. 1 cylinder #1 is calculated at step 305, the assumed output torque DNS(1) of the No. 1 cylinder #1 is calculated at step 306, then the amount of torque fluctuation DLN(1) of the No. 1 cylinder #1 is calculated at step 307.

Note that when finding the amount of torque fluctuation GLN(i−1) of the cylinders, the following calculation may be performed from step 305 to step 307.

That is, at step 305, instead of finding the actual amount of torque fluctuation DN(i−1), the actual amount of output fluctuation GN(i−1) is calculated based on the following equation:

$$GN(i-1)=\{30°/Tb(i-1)\}-\{30°/Ta(i-1)\}$$

Next, at step 306, instead of finding the assumed amount of torque fluctuation DNS(i−1), the assumed amount of output fluctuation GNS(i−1) is calculated based on the following equation:

$$GNS(i-1)=\{30°/(TbO(i-1)+Kb(i-1))\}-\{30°/Ta(i-1)\}$$

Next, at step 307, instead of finding the amount of torque fluctuation DLN(i−1), the amount of output fluctuation GLN(i−1) is calculated based on the following equation:

$$GLN(i-1)=GNS(i-1)-GN(i-1)$$

Next, when the amount of torque fluctuation DLN(i−1) is calculated at step 307, step 308 is proceeded to, where it is judged whether the amount of torque fluctuation DLN(i−1) is positive or not. When DLN(i−1)≧0, step 310 is jumped to, where the cumulative addition request flag XCDLN(i−1) showing that the amount of torque fluctuation DLN(i−1) of the cylinder at which the combustion was performed one time before should be cumulatively added is set (XCDLN(i−1)←1). As opposed to this, when DLN(i−1)<0, step 309 is proceeded to, where DLN(i−1) is made zero, then step 310 is proceeded to. Note that, the torque of each cylinder repeatedly rises and falls, so in this case to find the amount of torque fluctuation, it is sufficient to cumulatively add either the amount of increase of the torque or the amount of decrease of the torque. In the routine shown in FIG. 23, just the amount of decrease of the torque is cumulatively added, therefore, as explained above, when DLN(i−1)<0, DLN(i−1) is made zero.

Next, the processing of the counter CDLNIX will be explained referring to FIG. 24. The count value of the counter CDLNIX is used for the later explained calculation of the torque fluctuation value of the engine.

Referring to FIG. 24, first, at step 401, whether the No. 3 cylinder #3 is currently at ATDC 30° or not is judged. When the No. 3 cylinder #3 is currently not at ATDC 30°, the processing cycle is ended, while when the No. 3 cylinder #3 is currently at ATDC 30°, step 402 is proceeded to. At step 402, whether the conditions for calculating the torque fluctuation value are satisfied or not is judged. For example, when the conditions for making the air-fuel ratio lean are not satisfied or the amount of change per unit time APM of the engine load Q/N is more than the set value or the amount of change per unit time AN of the engine speed is more than a set value, it is judged that the conditions for calculating the torque fluctuation value are not satisfied, while at other times it is judged that the conditions for calculating the torque fluctuation value are satisfied.

When it is judged at step 402 that the conditions for calculating the torque fluctuation value are satisfied, step 408 is proceeded to, where the count value CDLNIX is incremented by exactly 1. The increment action of this count value CDLNIX is performed every time the No. 3 cylinder #3 reaches ATDC 30°, that is, every 720° crank angle. Next, at step 409, the average value of the engine speed $N_{AVE}$ and the average value $PM_{AVE}$ of the amount of intake air Q in the cycle from when the increment action of the count value CDLNIX is started to when the count value CDLNIX is cleared are calculated.

On the other hand, when it is judged at step 402 that the conditions for calculating the torque fluctuation value are not satisfied, step 403 is proceeded to, where the count value CDLNIX is cleared. Next, at step 404, the cumulative value DLNI(i) of the torque fluctuation value DLN(i) for each cylinder (this cumulative value is calculated by the later explained routine) is cleared. Next, at step 405, the cumulative count value CDLNI(i) for each cylinder (this cumulative count value is calculated by the later explained routine) is cleared.

Figure 26A:
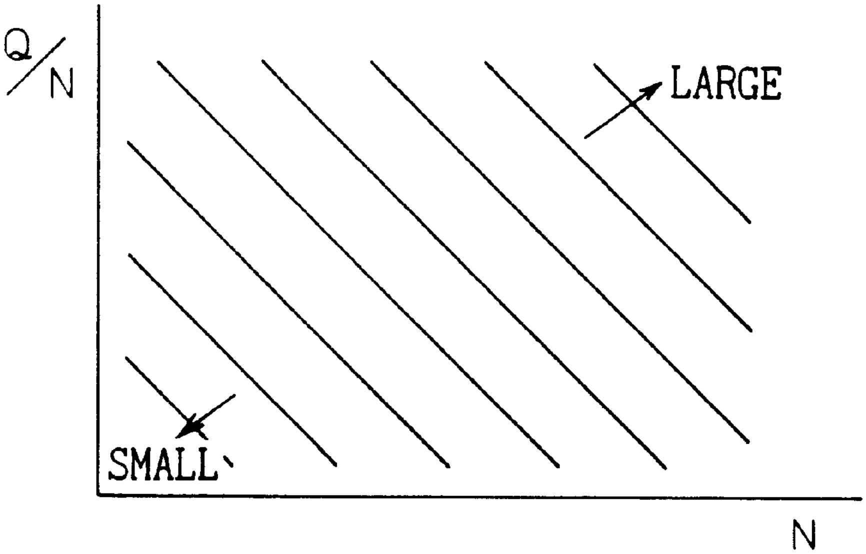
FIGS. 26A and 26B are views of a target torque fluctuation value.

Next, at step 406, the target torque fluctuation value LVLLFB is calculated. In this embodiment according to the present invention, as explained later, the air-fuel ratio is feedback controlled so that the calculated torque fluctuation value becomes this target torque fluctuation value LVLLFB. This target torque fluctuation value LVLLFB, as shown by FIG. 26A showing the equivalent fluctuation value by the solid line, becomes larger the higher the engine load Q/N and become larger the higher the engine speed N. This target torque fluctuation value LVLLFB is stored in the ROM 22 in advance in the form of a map shown in FIG. 26B as a function of the engine load Q/N and the engine speed N. Next, at step 407, the torque fluctuation value DLNISM(i) of each cylinder (this torque fluctuation value is calculated by the later explained routine) is made the target torque fluctuation value LVLLFB calculated from the map of FIG. 26B.

As explained above, however, in this embodiment of the present invention, it is judged whether to prohibit the correction of the air-fuel ratio based on the fluctuation of the rotational speed of the turbine runner 37 of the torque converter 32. Next, this will be explained with reference to FIG. 27 to FIG. 37.

That is, in this embodiment of the present invention, for example, 16 projections are formed at equiangular distances on the input shaft 36 of the automatic transmission 30. The rotational speed sensor 41 is arranged so as to be able face these projections. The rotational speed sensor 41 generates a pulse each time it faces these projections. Therefore, the rotational speed sensor 41 generates a pulse each time the input shaft 36, that is, the turbine runner 37, rotates by 22.5 degrees.

Figure 27:
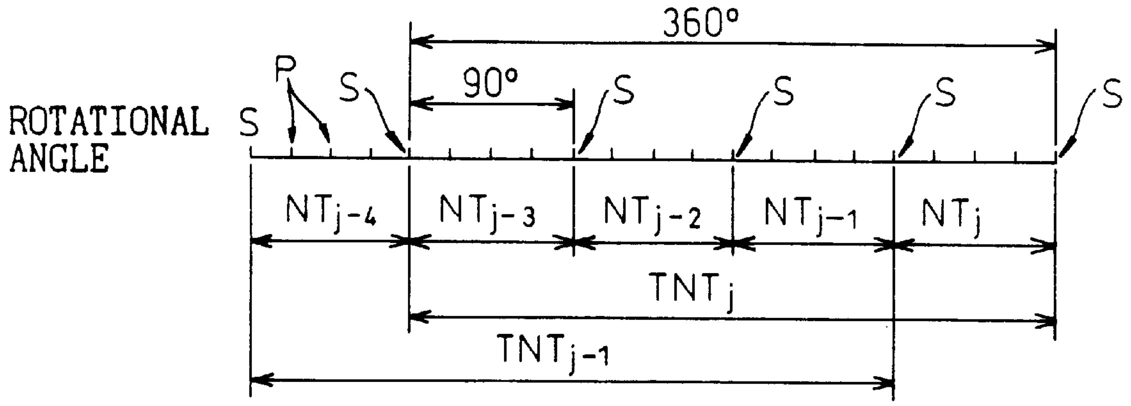
FIG. 27 is view for explaining the method of detection of the turbine speed.

In FIG. 27, P shows the timing of generation of the output pulse of the rotational speed sensor 41, while S shows the sampling timing for calculation of the speed of the output pulse. As shown in FIG. 27, the output pulse is sampled for calculation of the vehicle speed every time output pulses are generated. With each sampling, the elapsed times $NT_{j-4}$, $NT_{j-3}$, $NT_{j-2}$, $NT_{j-1}$, and $NT_j$ from when the previous sampling was performed to when the present sampling is performed are calculated.

Next, the elapsed time $TNT_j$ $(=NT_j+NT_{j-1}+N+T_{j-2}+NT_{j-3})$. required for the turbine runner 37 to rotate by 360 degrees is calculated from these elapsed times. The difference of elapsed times $DTNT_j$ $(=TNT_j-TNT_{j-1})$ is calculated from the elapsed time $TNT_j$ and the previously calculated $TNT_{j-1}$.

Figure 28:
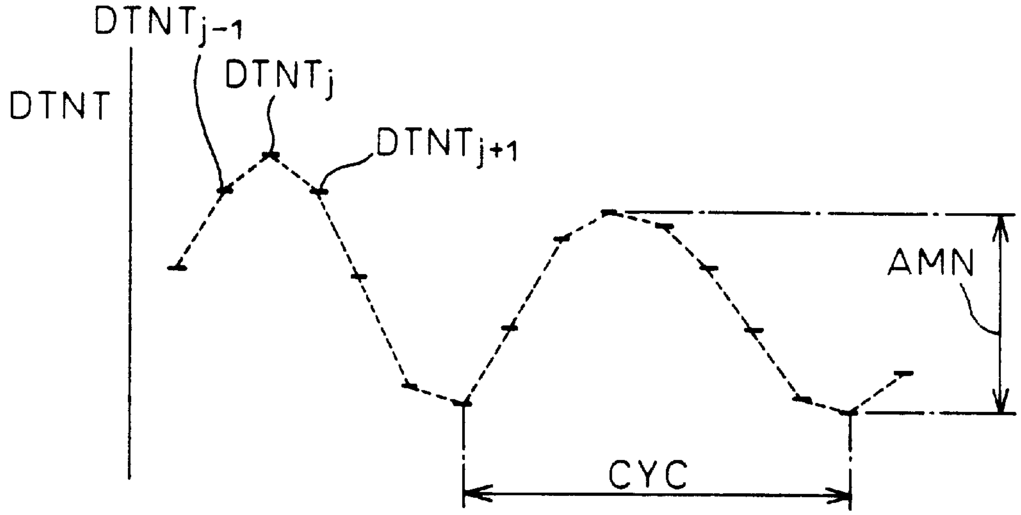
FIG. 28 is a time chart of the changes of the difference of elapsed times DTNT.
Figure 29:
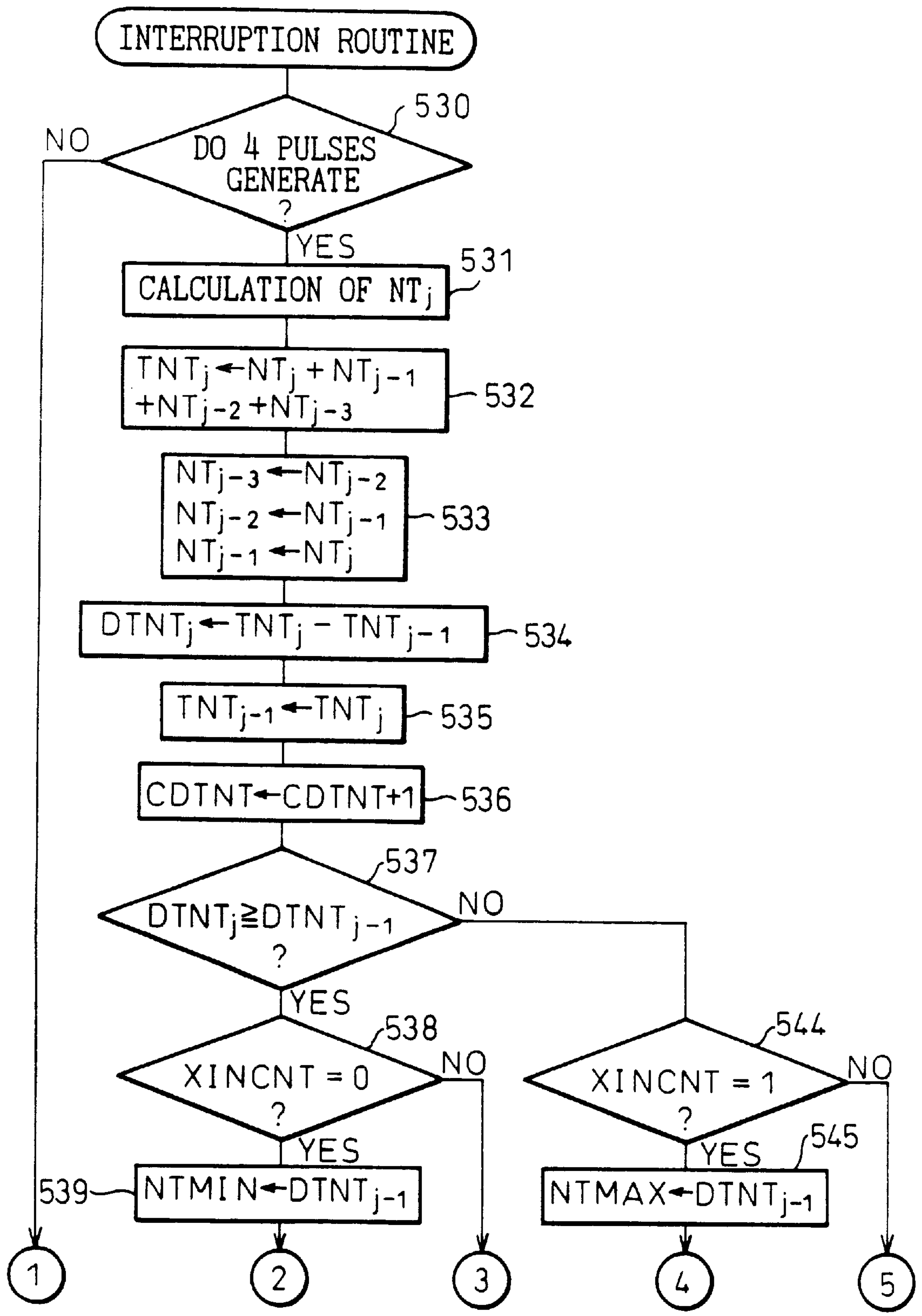
FIGS. 29 and 30 are flow charts of a main routine.

On the other hand, when the vehicle is driving over a rough road, the difference in elapsed times $DTNT_j$ fluctuates. FIG. 28 shows the fluctuation in the DTNT when the vehicle is driving over a rough road. AMN of FIG. 28 shows the difference between the minimum DTNT and the maximum DTNT, that is, the amplitude. CYC shows the time from when DTNT becomes for example the minimum to when it once again becomes the minimum, that is, the cycle. When the vehicle is driving over a large depression/bump road, the amplitude AMN becomes large. Therefore, in this embodiment of the present invention, the average value SINPAV of the amplitude AMN is found and it is judged that the vehicle is driving over a rough road when SINPAV is larger than a first set value for more than a predetermined time.

On the other hand, if the vehicle is driving over a small depression/bump road, the amplitude AMN does not become as large as in the previous case, but the cycle CYC becomes shorter. Therefore, in this embodiment of the present invention, when AMN is larger than a second set value and CYC is smaller than a predetermined value for more than a predetermined time, it is judged that the vehicle is driving over a rough road.

Next, an explanation will be made of an interruption routine shown from FIG. 29 to FIG. 34. Note that this interruption routine is executed every time the rotational speed sensor 41 generates an output pulse.

Referring to FIG. 29 to FIG. 34, first, at step 530, it is judged if four output pulses of the rotational speed sensor 41 have been generated or not. When four output pulses have not been generated, the interruption routine is ended, while when four output pulses have been generated, step 531 is proceeded to.

At step 531, the elapsed time $NT_j$ from when the output pulse four pulses before was generated to when the current output pulse is generated is calculated. Next, at step 532, the time $TNT_j$ $(=NT_j-NT_{j-2}+NT_{j-2}+MT_{j-3})$ required for the turbine runner 37 to rotate by 360 degrees up to then is calculated. Next, at step 533, $NT_{j-2}$ is made $NT_{j-3}$, $NT_{j-1}$ is made $NT_{j-2}$, and $NT_j$ is made $NT_{j-1}$. Next, at step 534, the previously calculated elapsed time $TNT_{j-1}$ is subtracted from the currently calculated elapsed time $TNT_j$ to calculate the difference of elapsed times DTNT. Note that the relationship between $TNT_{j-1}$ and $TNT_j$ is shown in FIG. 27. By calculating DTNT in this way, it is possible to cancel out the error in the intervals between output pulses. Next, at step 535, $TNT_j$ is made $TNT_{j-1}$, then step 536 is proceeded to, where the count CDTNT showing the cycle CYC is incremented by exactly "1".

Next, at step 537, it is judged if the currently detected $DTNT_j$ is greater than the previously calculated $DTNT_{j-1}$ or not. When $DTNT_j \geqq DTNT_{j-1}$, step 538 is proceeded to, where it is judged if an increase flag XINCNT showing that $DTNT_j$ is increasing has been reset (XINCNT="0") or not. When XINCNT has been reset, step 539 is proceeded to, where $DTNT_{j-1}$ is made the minimum value NTMIN when DTNT decreases and then increases. That is, in the previous interruption routine, XINCNT is reset, that is, DTNT decreases. On the other hand, in the current interruption routine, $DTNT_j \geqq DTNT_{j-1}$, that is, DTNT increases. Therefore, step 539 is proceeded to when DTNT changes from a decrease to an increase. On the other hand, in the previous interruption routine, since $DTNT_{j-2} > DTNT_{j-1}$, and in the current interruption routine, since $DTNT_j \geqq DTNT_{j-1}$, the minimum value NTMIN becomes the previously calculated $DTNT_{j-1}$.

Next, the first rough road judgement routine of step 540 and the second rough road judgement routine of step 541 are proceeded to (explained later). Next, step 542 is proceeded to, where the count value CDTNT is cleared. Next, step 543 is proceeded to, where the increase flag XINCNT is set (XINCNT="1"). Next, step 550 is proceeded to. On the other hand, when the increase flag XINCNT has already been set at step 538, step 543 is jumped to.

As opposed to this, when $DTNT_j<DTNT_{j-1}$ at step 537, step 544 is proceeded to, where it is judged if the increase flag XINCNT has been set or not. When the increase flag XINCNT has been set, step 545 is proceeded to, where $DTNT_{j-1}$, is made the maximum value NTMAX when DTNT increases and then decreases. That is, in the previous interruption routine, XINCNT is set, that is, DTNT increases, while in the current interruption routine, $DTNT_j<DTNT_{j-1}$, that is, DTNT decreases. Therefore, step 545 is proceeded to when DTNT changes from an increase to decrease. On the other hand, in the current interruption routine, $DTNT_{j-1} \geqq DTNT_{j-2}$, while in the current interruption routine, $DTNT_{j-1}>DTNT_j$, so the maximum NTMAX is made the previously calculated $DTNT_{j-1}$.

Next, the first rough road judgement routine of step 546 and the second rough road judgement routine of step 547 are proceeded to (explained later). Next, step 548 is proceeded to, where the count value CDTNT is cleared. Next, step 549 is proceeded to, where the increase flag XINCNT is reset. Next, step 550 is proceeded to. On the other hand, when the increase flag XINCNT has already been reset at step 544, step 549 is jumped to. At step 550, $DTNT_j$ is made $DTNT_{j-1}$.

Figure 36:
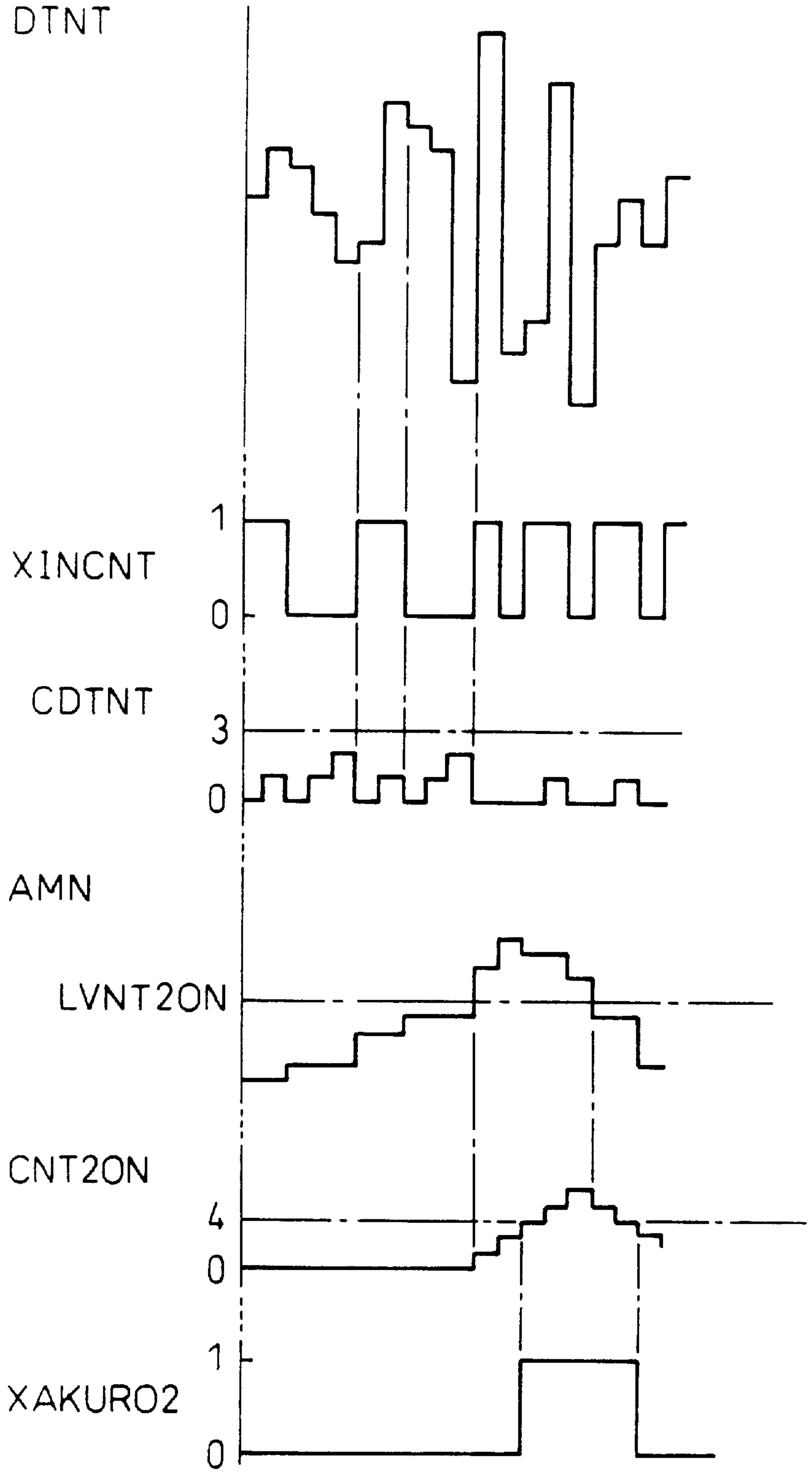
FIG. 36 is a time chart for explaining a second judgement of a rough road.

That is, if the difference of elapsed times DTNT increases as shown in FIG. 36, the increase flag XINCNT is set. The set state is held so long as DTNT continues increasing. Further, if DTNT decreases, the increase flag XINCNT has been reset. Further, this reset state is held so long as DTNT continues decreasing. On the other hand, the count value CDTNT is cleared when the increase flag XINCNT is reset from the set state or is set from the reset state. It is incremented while the increase flag XINCNT is held in the set state or reset state.

Figure 30:
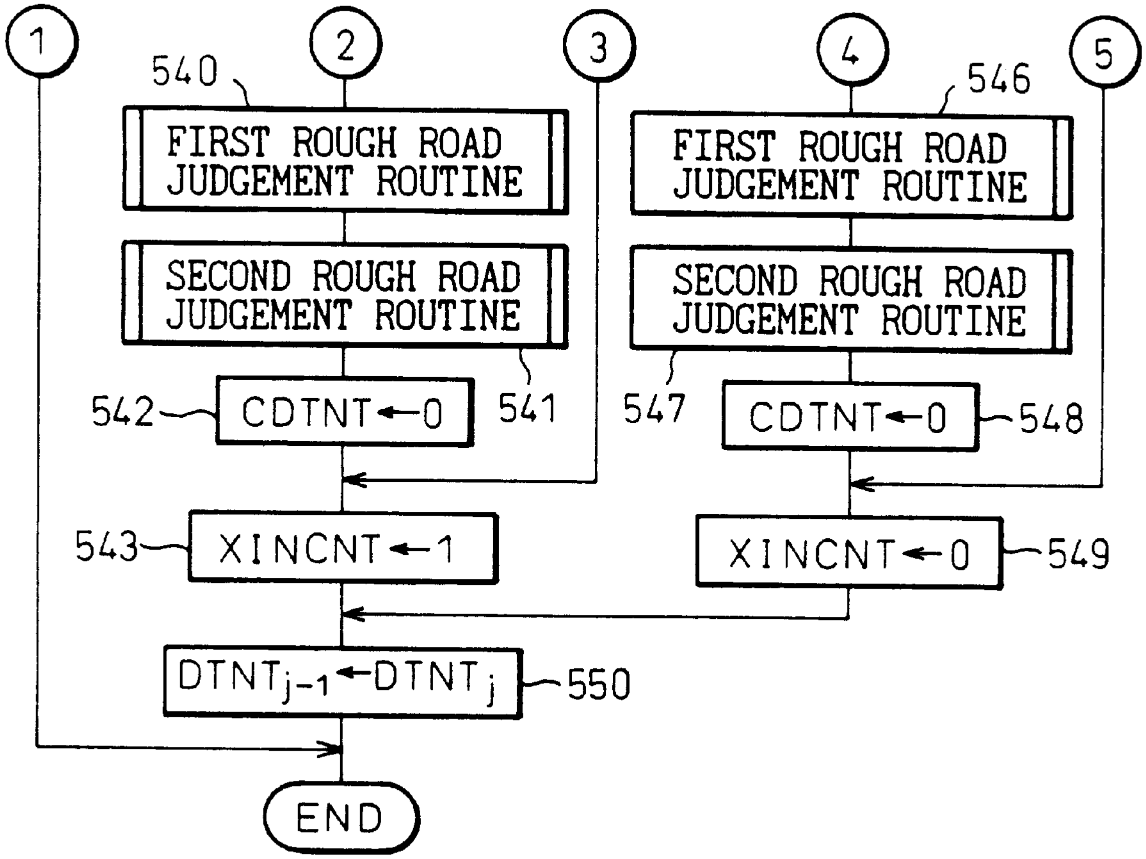
Figure 31:
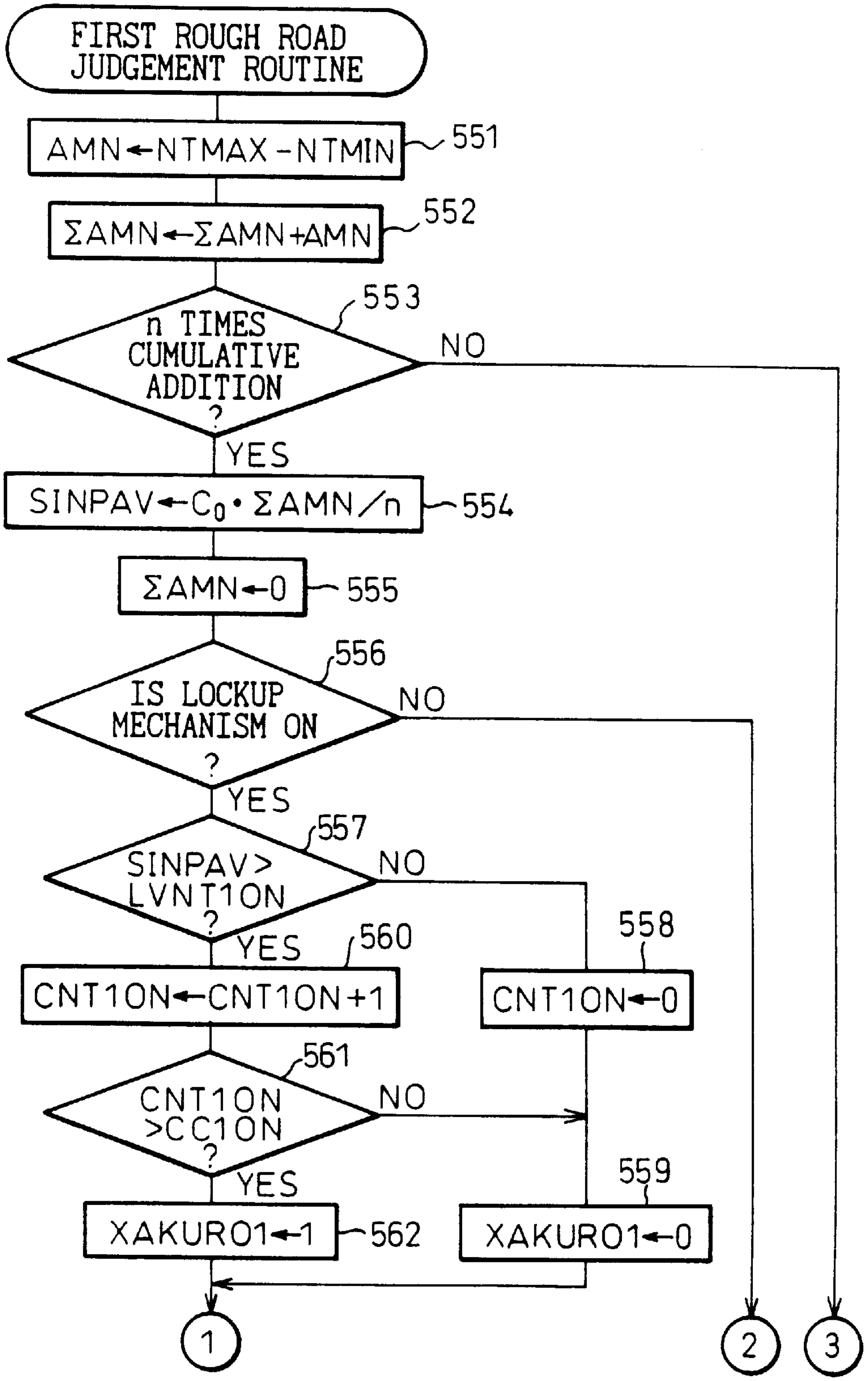
FIGS. 31 and 32 are flow charts for executing a first judgement of a rough road.
Figure 32:
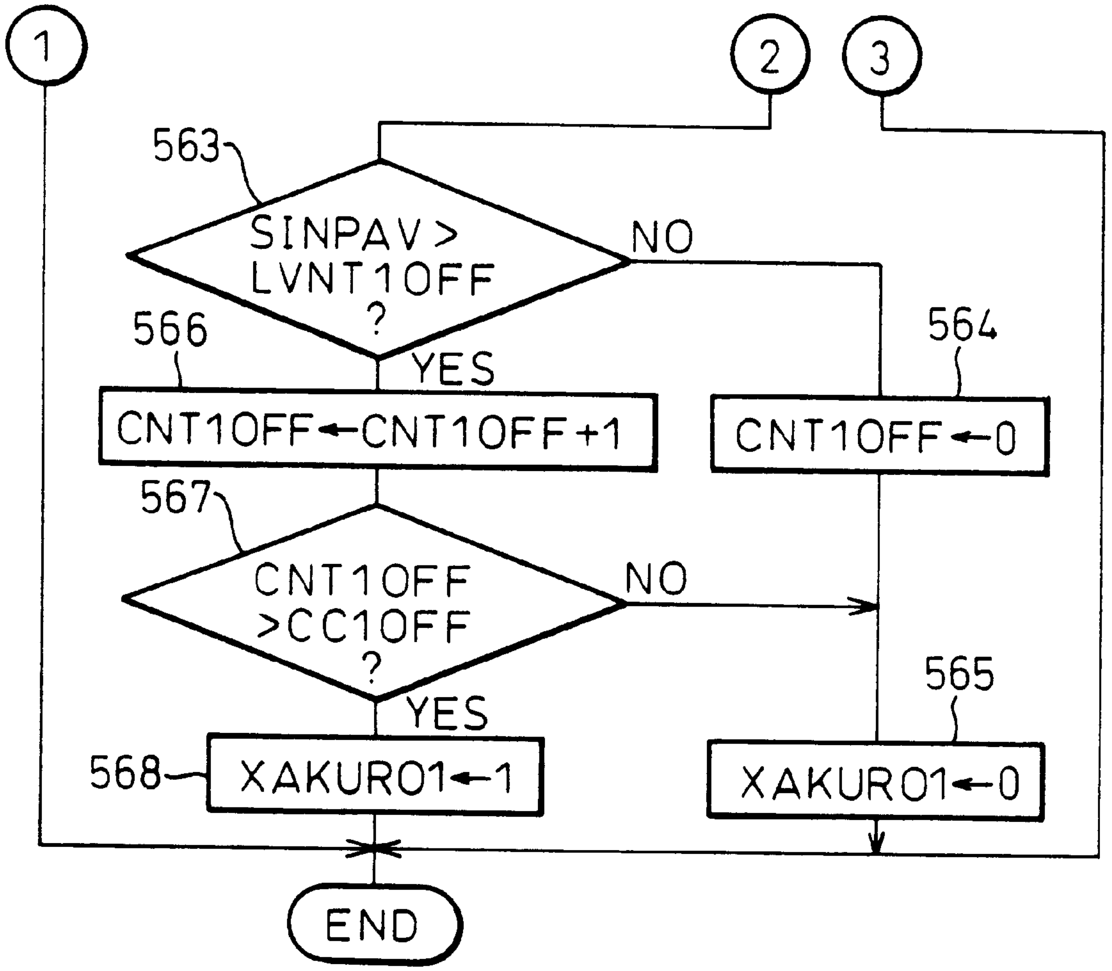

FIG. 31 and FIG. 32 shows the first rough road judgement routine of step 540 and step 546 of FIG. 30. This first rough road judgement routine is executed for judging if the vehicle is driving over a large depression/bump road.

Referring to FIG. 31 and FIG. 32, first, at step 551, the minimum value NTMIN is subtracted from the maximum value NTMAX to calculate the amplitude AMN of DTNT. Therefore, every time the first rough road judgement routine is proceeded to, that is, every time NTMIN or NTMAX is updated, AMN is calculated. Next, at step 552, the amplitude AMN is added to the cumulative value ΣAMN of the amplitude. Next, at step 553, it is judged if the amplitude AMN has been cumulatively added n number of times. When cumulatively added n number of times, step 554 is proceeded to, where the average value SINPAV ($=C_0 \cdot \Sigma EAMN/n$) is calculated. Here, $C_0$ is a constant. Next, at step 555, the cumulative value ΣAMN of amplitude is cleared.

Next, at step 556, it is judged if the lockup mechanism is on or not. When the lockup mechanism is on, step 557 is proceeded to, where it is judged if the average value SINPAV of the amplitude is larger than a reference value LVNT1ON for when the lockup mechanism is on or not. When SINPAV≦LVNT1ON, step 558 is proceeded to, where the count value CNT1ON showing the time during which the average value SINPAV of the amplitude is larger than the reference value LVNT1ON is cleared. Next, at step 559, the rough road judgement flag XAKURO1 which is set when it is judged that the vehicle is driving over a large depression/bump road is reset (XAKURO1←"0").

As opposed to this, when SINPAV>LVNT1ON at step 557, step 560 is proceeded to, where the count value CNT1ON is incremented by "1". Next, at step 561, it is judged if the count value CNT1ON is larger than the reference value CC1ON or not, that is, if a predetermined time has elapsed from when SINPAV became greater than LVNT1ON. When CNT1ON≦CC1ON, step 559 is proceeded to. On the other hand, when CNT1ON>CC1ON, step 562 is proceeded to, where the rough road judgement flag XAKURO1 is set (XAKURO←"1").

Figure 35:
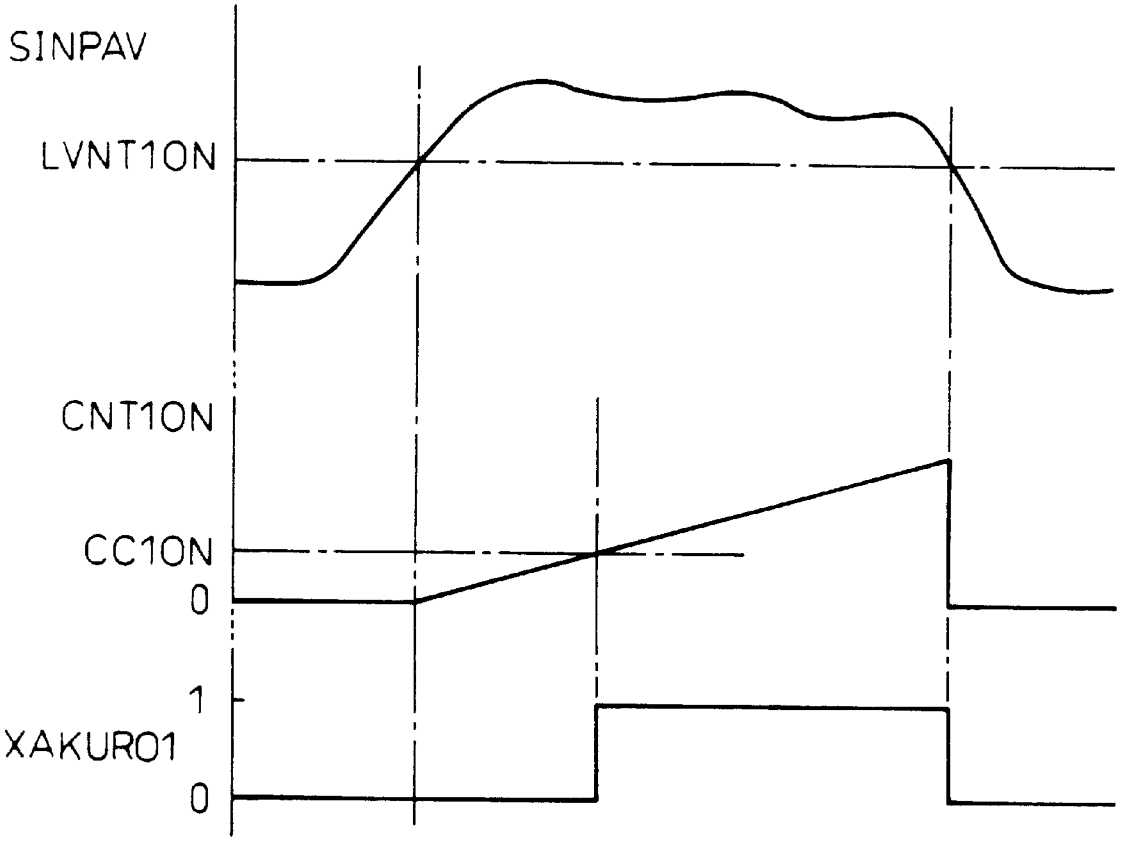
FIG. 35 is a time chart for explaining a first judgement of a rough road.

That is, as shown in FIG. 35, when the average value SINPAV of the amplitude is smaller than the reference value LVNT1ON, where the count value CNT1ON is maintained at zero. At this time, the rough road judgement flag XAKURO1 is also held in the reset state. When the average value SINPAV of the amplitude increases over the standard value LVNT1ON, the count value CNT1ON starts to be incremented. While the count value CNT1ON is smaller than the reference value CC1ON, the rough judgement flag XAKURO1 is maintained in the reset state. Next, when CNT1ON>CC1ON, that is, when a predetermined time has elapsed from the start of the incrementing of the count value CNT1ON, the rough road judgement flag XAKURO1 is set. Next, when SINPAV<LVNT1ON, the rough road judgement flag is reset. At this time, the count value CNT1ON is also cleared.

On the other hand, when the lockup mechanism is off at step 556, step 563 is proceeded to. From step 563 to step 568, the same processing is performed as from step 557 to step 562. That is, at step 563, it is judged if the average value SINPAV of the amplitude is larger than the reference value LVNT1OFF for when the lockup mechanism is off. When SINPAV≦LVNT1OFF, step 564 is proceeded to, where the count value CNT1OFF showing the time during which the average value SINPAV of the amplitude has become larger than the reference value LVNT1OFF is cleared. Next, at step 565, the rough road judgement flag XAKURO1 is reset.

As opposed to this, when SINPAV>LVNT1OFF at step 563, step 566 is proceeded to, where the count value CNT1OFF is incremented by exactly "1". Next, at step 567, it is judged if the count value CNT1OFF is larger than the reference value CC1OFF or not, that is, if a predetermined time has elapsed from when SINPAV became greater than LVNT1OFF. When CNT1OFF<CC1OFF, step 565 is proceeded to, while when CNT1OFF>CCLOFF, step 568 is proceeded to, where the rough road judgement flag XAKURO1 is set.

Note that in this embodiment of the present invention, the reference value LVNT1ON for when the lockup mechanism is on is set smaller than the reference value LVNT1OFF for when the lockup mechanism is off. As explained above, when the lockup mechanism is on, the crankshaft and the input shaft of the torque converter 32 are directly connected, so even when SINPAV is small, the fluctuation of the rotational speed of the crankshaft can become large. When the lockup mechanism is off, even when SINPAV becomes large, the fluctuation of the rotational speed of the crankshaft does not become that large. Therefore, LVNT1ON becomes smaller than LVNT1OFF. Further, in this embodiment of the present invention, these LVNT1ON and LVNT1OFF are made constant values, but they may be made to change in accordance with the engine operating state, for example, the engine rotational speed, as well.

Figure 33:
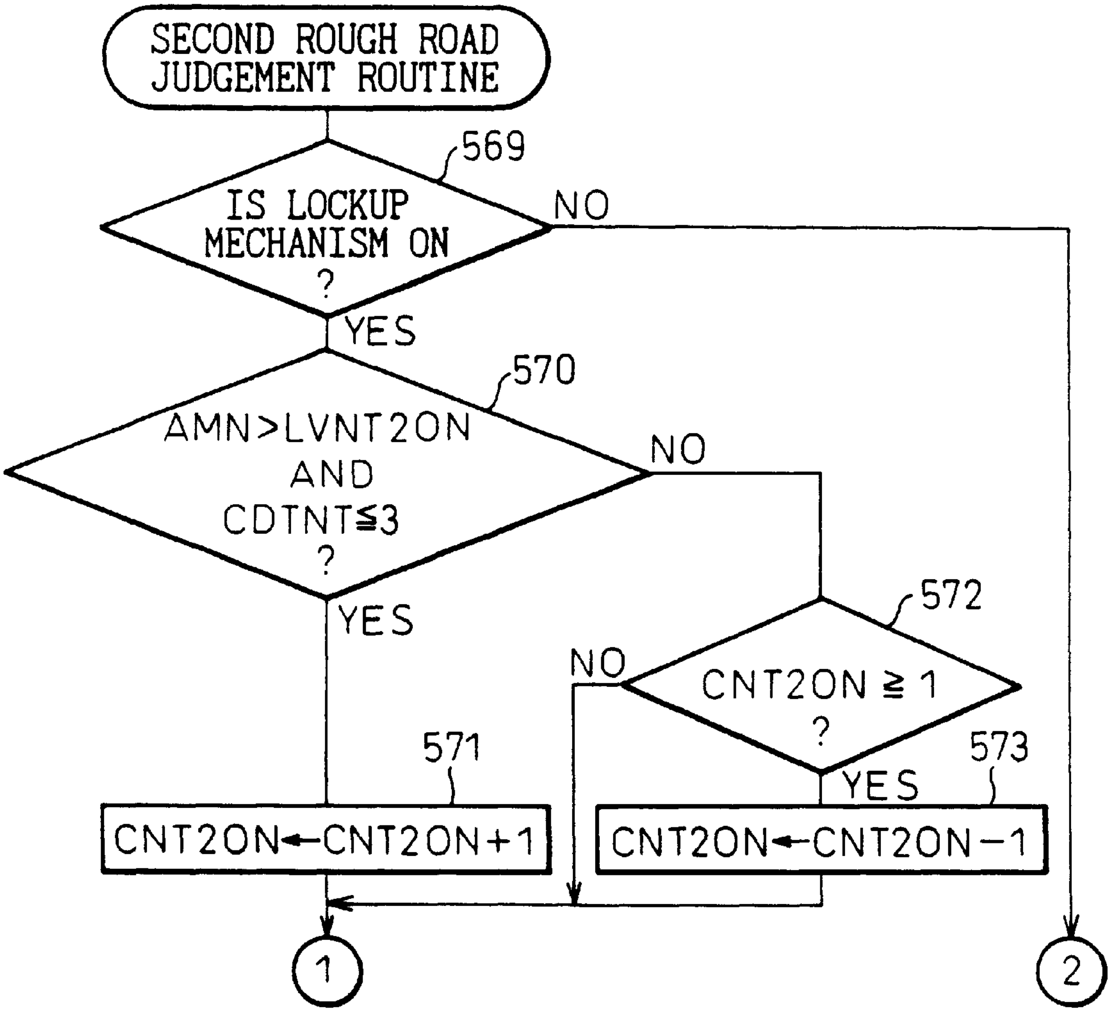
FIGS. 33 and 34 are flow charts for executing a second judgement of a rough road.
Figure 34:
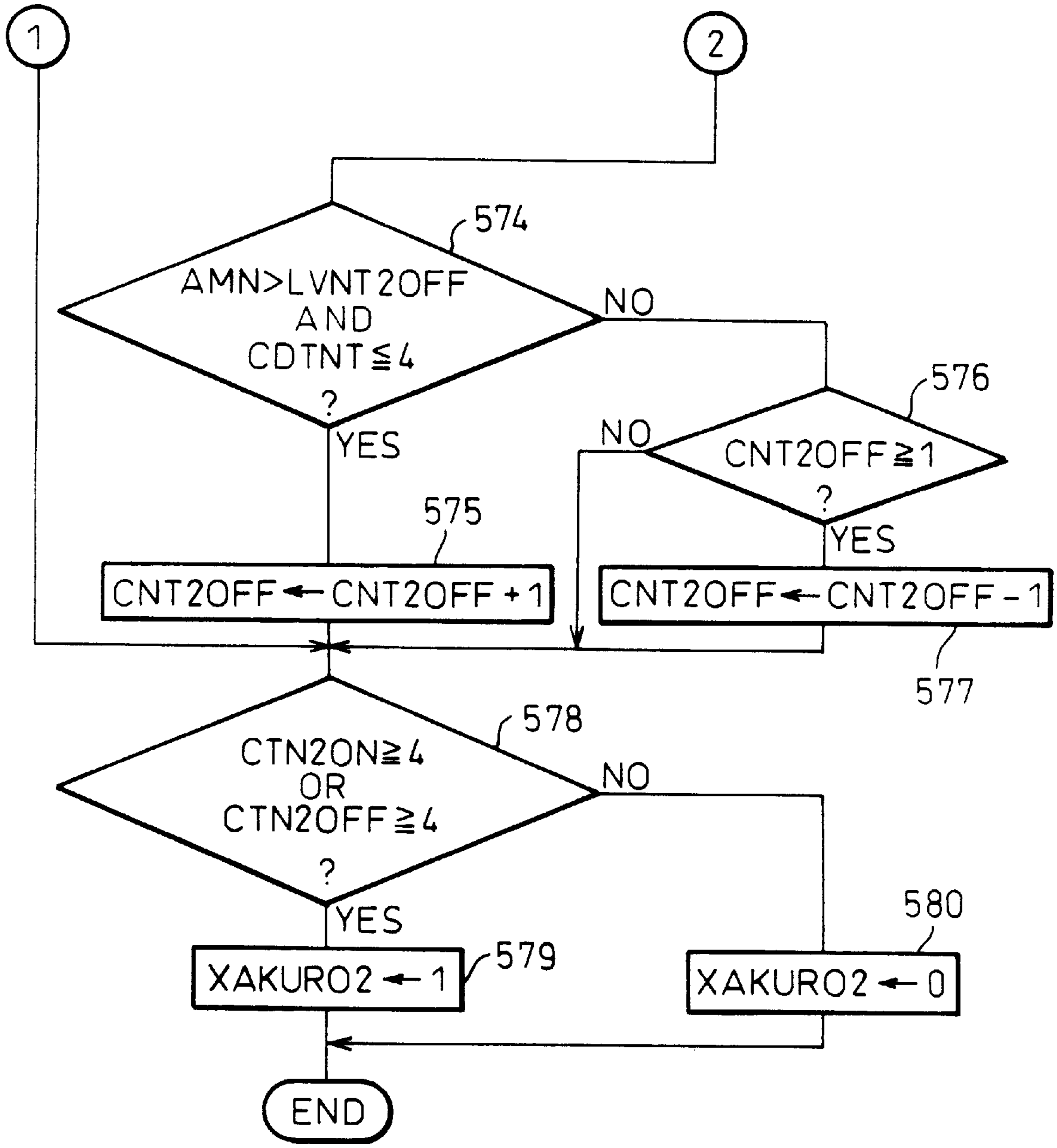

FIG. 33 and FIG. 34 show a second rough road judgement routine of step 541 and step 547 of FIG. 30. First, at step 569, it is judged if the lockup mechanism is on or not. When the lockup mechanism is on, step 570 is proceeded to. At step 570, it is judged if the amplitude AMN is larger than the reference value LVNT2ON for when the lockup mechanism is on and if the count value CDTNT showing the cycle CYC is not more than the reference value, for example, 3. When AMN>LVNT2ON and CDTNT≦3, step 571 is proceeded to, where the count value CNT2ON for when the lockup mechanism is on is incremented by exactly "1". On the other hand, when AMN≦LVNT2ON or CDTNT>3, step 572 is proceeded to, where it is judged if the count value CNT2ON is more than 1. When CNT2ON<1, step 578 is jumped to, while when CNT2ON>1, step 573 is proceeded to, where the count value CNT2ON is decremented by exactly "1", then step 578 is proceeded to.

On the other hand, when the lockup mechanism is off at step 569, step 574 is proceeded to. At step 574, it is judged if the amplitude AMN is larger than the reference value LVNT2OFF for when the lockup mechanism is off and if the count value CDTNT is less than a reference value, for example, 4. When AMN>LVNT2OFF and CDTNT≦4, step 575 is proceeded to, where the count value CNT2OFF for when the lockup mechanism is off is incremented by exactly "1". On the other hand, when AMN<LVNT2OFF or CDTNT>4, step 576 is proceeded to, where it is judged if the count value CNT2OFF is more than 1 or not. When CNT2OFF<1, step 578 is jumped to, while when CNT2OFF≧1, step 577 is proceeded to, where the count value CNT2OFF is decremented by exactly "1", then step 578 is proceeded to.

At step 578, it is judged if the count value CNT2ON or CNT2OFF is more than a constant value, for example, 4. When CTNTON≧4 or CTNTOFF>4, step 579 is proceeded to, where the rough road judgement flag XAKURO2 which is set when it is judged that the vehicle is driving over a small depression/bump road is set (XAKURO2←"1"). As opposed to this, when CTNT2ON<4 and CTNT2OFF<4, step 580 is proceeded to, where the rough road judgement flag XAKURO2 is reset (XAKURO←"0").

That is, as shown in FIG. 36, for example, when AMN>LVNT2ON and CDTNT≦3, the incrementing of the count value CNT2ON is started. Next, when CNT2ON≧4, the rough road judgement flag XAKURO2 is set. When AMN≦LVNT2ON or CDTNT>3, the count value CNT2ON is decremented, while when CNT2ON<4, the rough road judgement flag XAKURO2 is reset.

In this way, in this embodiment of the present invention, so long as the amplitude AMN is larger than LVNT2ON, the count value CNT2ON is incremented, so when AMN>LVNT2ON, the count value CNT2ON shows the time when AMN>LVNT2ON and CDTNT≦3. When AMN has become less than LVNT2ON, the count value CNT2ON is not immediately cleared, but is decremented "1" at a time, so in this case, CNT2ON does not show the time when AMAN>LVNT2ON and CDTNT<3. In this case, for a while after AMN≦LVNT2ON, CNT2ON is maintained at least at 4, so for a while after AMN≦LVNT2ON, the rough road judgement flag XAKURO2 continues to be set. In this way the time where the rough road judgement flag XAKURO2 continues to be set from when AMN≦LVNT2ON, that is, the time from when AMN≦LVNT2ON to when CNT2ON becomes smaller than 4, becomes longer the larger the AMN becomes. Therefore, the time when the correction of the air-fuel ratio is prohibited becomes longer the larger the AMN.

Figure 37:
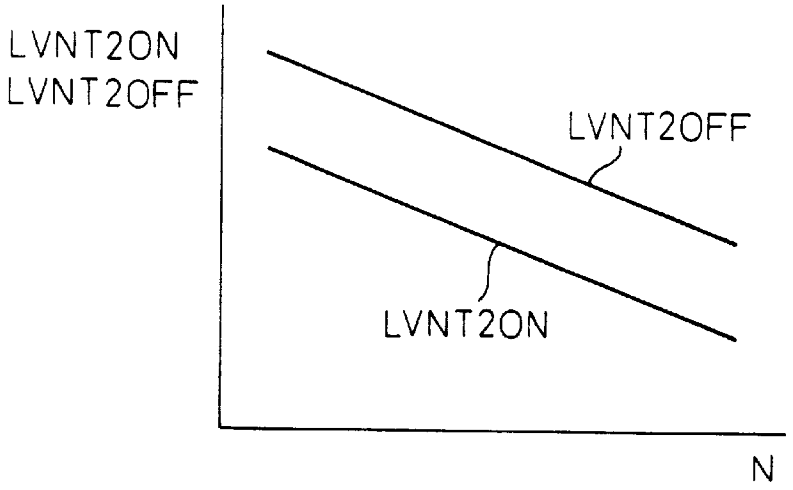
FIG. 37 is a graph of the reference values LVNT2ON and LVNT2OFF.

Note that in the embodiment according to the present invention, the reference values LVNT2ON and LVNT2OFF, as shown in FIG. 37, are determined so that they become smaller the higher the engine speed N. These reference values LVNT2ON and LVNT2OFF are stored in advance in the ROM 22 as a function of the engine speed N in the form of the map shown in FIG. 37.

As explained before, in this embodiment of the present invention, it is judged if the vehicle is driving over a rough road, that is, if the correction of the air-fuel ratio should be prohibited, based on the fluctuation of the rotational speed of the front wheels 43 and rear wheels 45 of the vehicle. Next, an explanation will be made of the a third rough road judgement with reference to FIG. 38 to FIG. 45.

That is, in this embodiment of the present invention, for example, 16 projections are formed at equiangular distances on the front shaft 44 and the rear shaft 46. The rotational speed sensors 47 and 48 are arranged so as to be able face these projections. The rotational speed sensors 47 and 48 generate pulses each time it faces the corresponding projections. Therefore, the rotational speed sensor 47 generates a pulse each time the front shaft 44, that is, the front wheels 43, rotates by 22.5 degrees, while the rotational speed sensor 48 generates a pulse each time the rear shaft 46, that is, the rear wheels 45, rotates by 22.5 degrees.

First, an explanation will be made of the method of calculation of the fluctuation of the rotational speed of the front wheels 43. In the same way as the method of calculation of the fluctuation of the rotational speed of the turbine runner 37, an output pulse is sampled for calculation of the speed each time four output pulses of the rotational speed sensor 47 are generated. With each sampling, the elapsed times $NFR_{j-4}$, $NFR_{j-3}$, $NFR_{j-2}$, $NFR_{j-1}$, and $NFR_j$ from when the previous sampling was performed to when the next sampling is performed are calculated.

Next, the elapsed time $TNFR_j$ ($=NFR_j+NFR_{j-1}+NFR_{j-2}+NFR_{j-3}$) required for the front wheels to rotate by 360 degrees is calculated from the elapsed time. The difference in elapsed times $DTNFR_j$ ($=TNFR_j-TNFR_{j-1}$) is calculated from the elapsed time $TNFR_j$ and the previously calculated $TNFR_{j-1}$.

Similarly, an output pulse is sampled for calculation of the speed each time four output pulses of the rotational speed sensor 48 are generated. The elapsed times $NRR_{j-4}$, $NRR_{j-3}$, $NRR_{j-2}$, $NRR_{j-1}$, and $NRR_j$ from when the previous sampling was performed to when the next sampling is performed are calculated with each sampling.

Next, the elapsed time $TNRR_j$ ($=NRR_j+NRR_{j-1}+NRR_{j-2}+NRR_{j-3}$) required for the rear wheels 45 to rotate by 360 degrees up to then is calculated from these elapsed times. The difference of elapsed times $DTNRR_j$ ($=TNRR_j-TNRR_{j-1}$) is calculated from the elapsed time $TNRR_j$ and the previously calculated $TNRR_{j-1}$.

Figure 38:
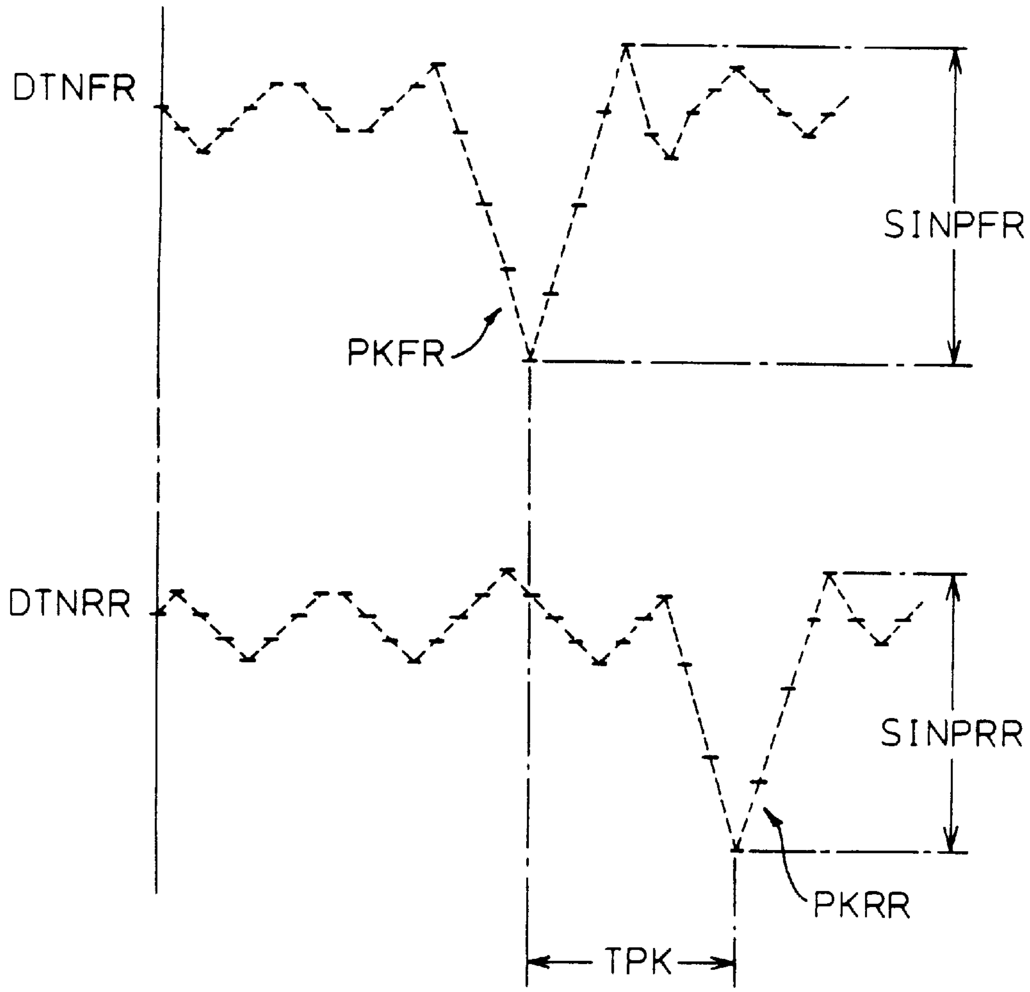
FIG. 38 is a time chart of changes in the differences of elapsed times DTNFR and DTNRR.

On the other hand, when the vehicle is driving over a rough road, the differences of elapsed times $DTNFR_j$ and $DTNRR_j$ fluctuate. FIG. 38 shows the fluctuations of the DTNFR and DTNRR when the vehicle is traveling over a single small bump on a road surface, that is, when traveling over a single depression/bump road. Further, SINPFR of FIG. 38 shows the difference between the minimum DTNFR and the maximum DTNFR, that is, the amplitude of the DTNFR. SINPRR shows the difference between the minimum DTNRR and the maximum DTNRR, that is, the amplitude of DTNRR, while TPK shows the elapsed time from when the peak value PKFR of DTNFR occurred to when the peak value PKRR of DTNRR occurred. When the vehicle is driving over a single small bump, as shown in FIG. 38, first, DTNFR becomes very small temporarily and SINPFR becomes very large temporarily, that is, a peak value PKFR of the DTNFR occurs. Next, when TPK elapses, DTNRR becomes very small temporarily and SINPRR becomes very large temporarily, that is, a peak value PKRR of DTNRR occurs. Further, when the vehicle is driving over a single small depression in the road surface, DTNFR becomes very large temporarily and a peak value PKFR of DTNFR occurs, while DTNRR temporarily becomes very large and a peak value PKRR of DTNRR occurs. On the other hand, when it is assumed that the vehicle is driving over a single depression/bump road, the assumed elapsed time TSPK from when the peak value PKFR of DTNFR occurs to when the peak value PKRR of DTNRR occurs is calculated as follows based on the vehicle speed SPD:

$$TSPK=K_0 \cdot WB/SPD$$

Here, WB shows the wheel base of the vehicle, while $K_0$ shows the constant. That is, TSPK shows the time for the vehicle to drive exactly a distance corresponding to the wheel base WB. Therefore, in this embodiment of the present invention, the actual elapsed time TPK from when the peak value PKFR of DTNFR occurs to when the peak value of DTNRR occurs is detected and it is judged that the vehicle is driving over a rough road when the actual elapsed time TPK substantially coincides with the assumed elapsed time TSPK.

If this is done, then it is possible to detect almost all rough roads. Therefore, it is possible to reliably prevent erroneous correction of the air-fuel ratio.

Next, an explanation will be made of the interruption routine shown from FIG. 39 to FIG. 41. Note that this interruption routine is executed every time the rotational speed sensor 47 generates an output pulse.

Figure 39:
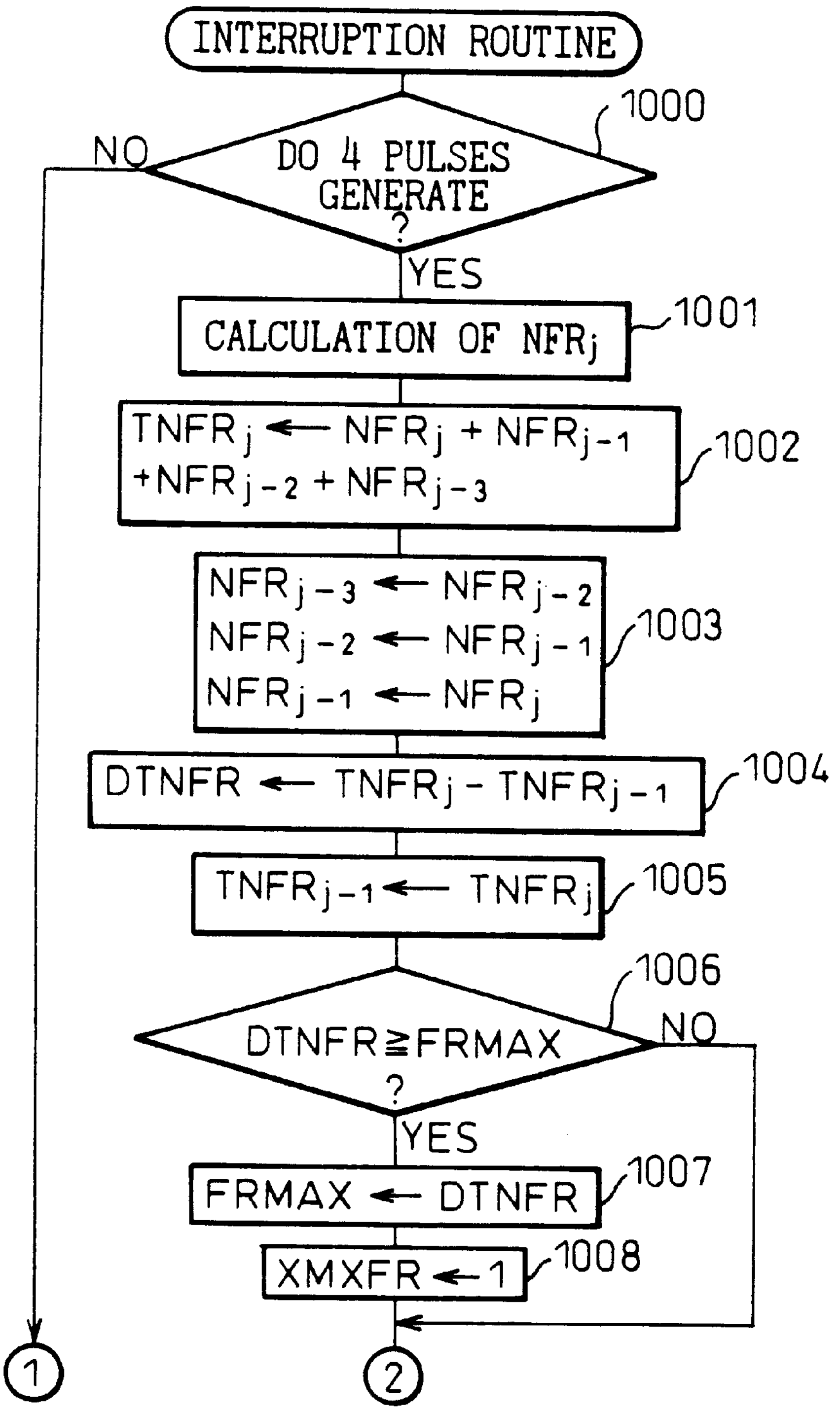
FIGS. 39 to 41 are flow charts of an interruption routine.
Figure 40:
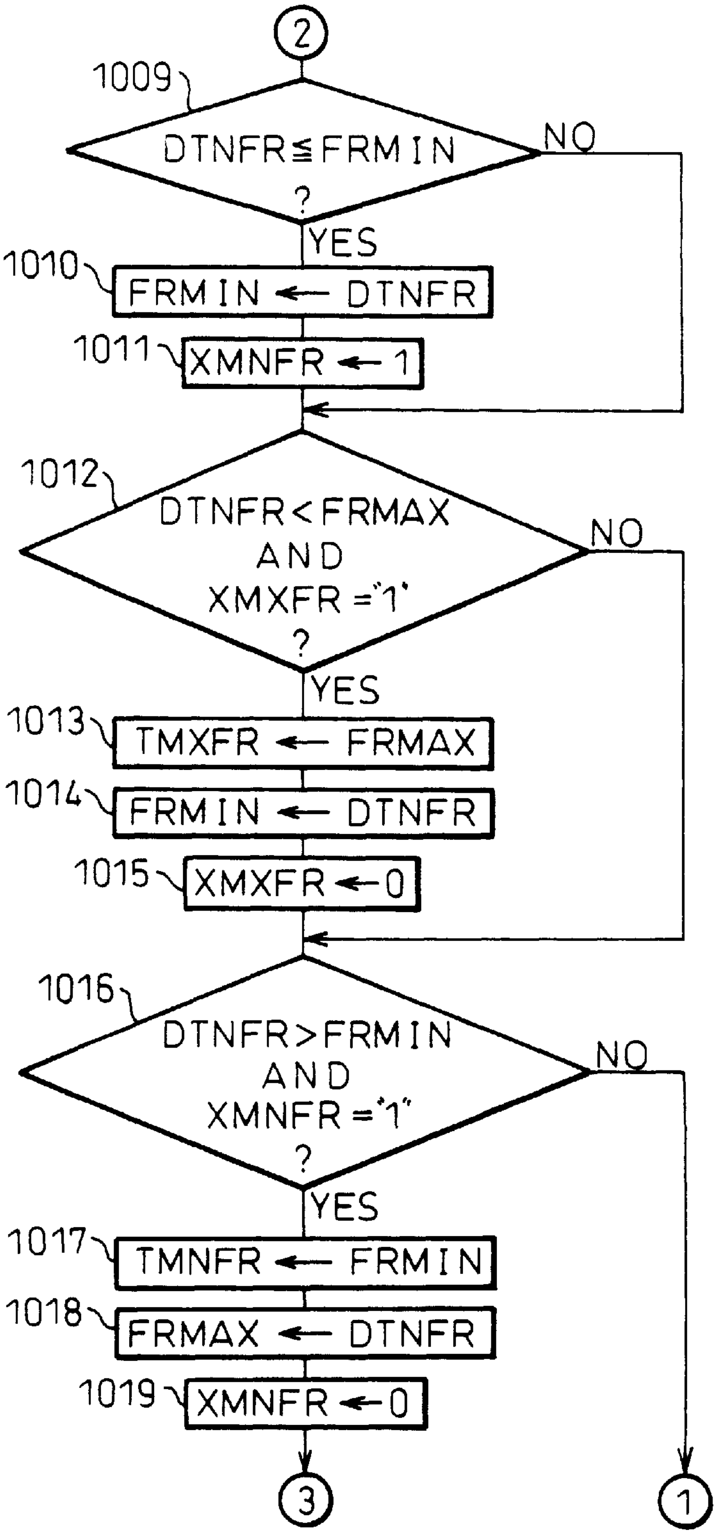
Figure 41:
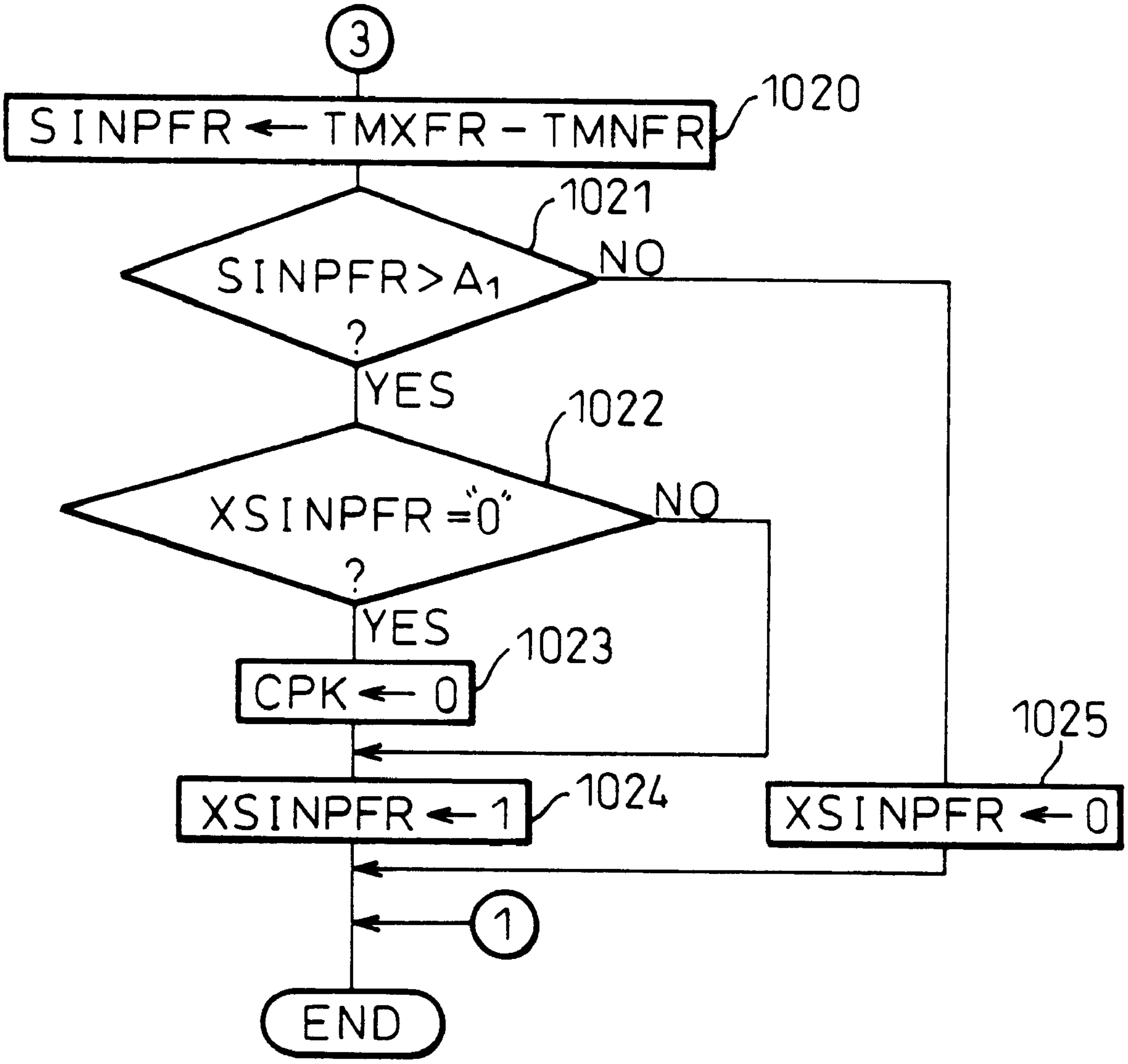

Referring to FIG. 39 to FIG. 41, first, at step 1000, it is judged if four output pulses of the rotational speed sensor 47 have been generated or not. When four output pulses have not been generated, the interruption routine is ended, while when four output pulses have been generated, step 1001 is proceeded to.

At step 1001, the elapsed time $NFR_j$ from when the output pulse four pulses before was generated to when the current output pulse is generated is calculated. Next, at step 1002, the time $TNFR_j$ ($=NFR_j+NFR_{j-1}+NFR_{j-2}+NFR_{j-3}$) required for the front wheels 43 to rotate by 360 degrees up to now is calculated. Next, at step 1003, $NFR_{j-2}$ is made $NFR_{j-3}$, $NFR_{j-1}$ is made $NFR_{j-2}$, and $NFR_j$ is made $NFR_{j-1}$. Next, at step 1004, the previously calculated elapsed time $TNFR_{j-1}$ is subtracted from the currently calculated $TNFR_j$ to calculate the difference of elapsed times DTNFR. Next, at step 1005, $TNFR_j$ is made $TNFR_{j-1}$.

Next, at step 1006, it is judged if the currently calculated DTNFR is larger than FRMAX or not. When DTNFR>FRMAX, step 1009 is jumped to, while when DTNFR≧FRMAX, step 1007 is proceeded to, where the currently calculated DTNFR is made FRMAX. Next, at step 1008, the increase flag XMXFR showing that DTNFR is increasing is set (XMXFR="1"). Next step 1009 is proceeded to. At step 1009, it is judged if the currently calculated DTNFR is less than FRMIN or not. When DTNFR>FRMIN, step 1012 is jumped to, while when DTNFR≦FRMIN, step 1010 is proceeded to, where the currently calculated DTNFR is made FRMIN. Next, at step 1011, a decrease flag XMNFR showing that DTNFR is decreasing is set (XMNFR="1"). Next, step 1012 is proceeded to.

At step 1012, it is judged if the currently calculated DTNFR is smaller than FRMAX and the increase flag XMXFR is set. When DTNFR≧FRMAX or the increase flag XMXFR is reset (XMXFR="0"), step 1016 is jumped to, while when DTNFR<FRMAX and XMXFR is set, step 1013 is proceeded to, where FRMAX is made the maximum value FRMAX where the DTNFR increases and then decreases. That is, in the previous interruption routine, XMXFR is set, that is, DTNFR is increasing. On the other hand, in the current interruption routine, DTNFR<FRMAX, that is, DTNFR is decreasing. Therefore, step 1013 is proceeded to when DTNFR changes from an increase to decrease. Next, at step 1014, the initial value of FRMIN is made the currently calculated DTNFR. Next, at step 1015, the increase flag XMXFR is reset. Next, step 1016 is proceeded to.

At step 1016, it is judged if the currently calculated DTNFR is larger than FRMIN and the decrease flag XMNFR is set or not. When DTNFR>FRMIN or the decrease flag XMNFR is reset (XMNFR="0"), the interruption routine is ended. When DTNFR>FRMIN and XMNFR is set, step 1017 is proceeded to, where FRMIN is made the minimum value FRMIN when DTNFR decreases and then increases. That is, in the previous interruption routine, XMNFR is reset, that is, DTNFR is decreasing, while in the current interruption routine, DTNFR>FRMIN, that is, DTNFR is increasing. Therefore, step 1017 is proceeded to when DTNFR changes from a decrease to an increase. Next, at step 1018, the initial value of FRMAX is made the currently calculated DTNFR. Next, at step 1019, the decrease flag XMNFR is reset.

Next, at step 1020, the minimum value TMNFR is subtracted from the maximum value TMXFR to calculate the amplitude SINPFR of DTNFR. Therefore, SINPFR is calculated each time the maximum value TMXFR and the minimum value TMNFR are updated. Next, at step 1021, it is judged if SINPFR is larger than the set value $A_1$ or not. When SINPFR>$A_1$, step 1022 is proceeded to, where the peak flag XSINPFR which is set when SINPFR is larger than $A_1$ (XSINPFR="1") is reset (XSINPFR="0"). When the peak flag XSINPFR is reset, step 1023 is proceeded to, where the count value CPK of a free run counter is cleared (CPK="0"), then at step 1024, XSINPFR is set. As opposed to this, when XSINPFR is set at step 1022, step 1024 is jumped to. That is, when step 1023 is proceeded to, in the previous interruption routine, XSINPFR is reset, that is, SINPFR≦$A_1$, while in the current interruption routine, SINPFR>$A_1$. That is, the count value CPK is cleared every time a peak value of DTNFR is generated, therefore CPK shows the elapsed time from when a peak value of DTNFR is generated.

On the other hand, at step 1021, when SINPFR≦$A_1$, step 1025 is proceeded to, where XSINPFR is reset.

Next, an explanation will be given of an interruption routine shown from FIG. 42 to FIG. 44. Note that this interruption routine is executed each time the rotational speed sensor 48 generates an output pulse.

Figure 42:
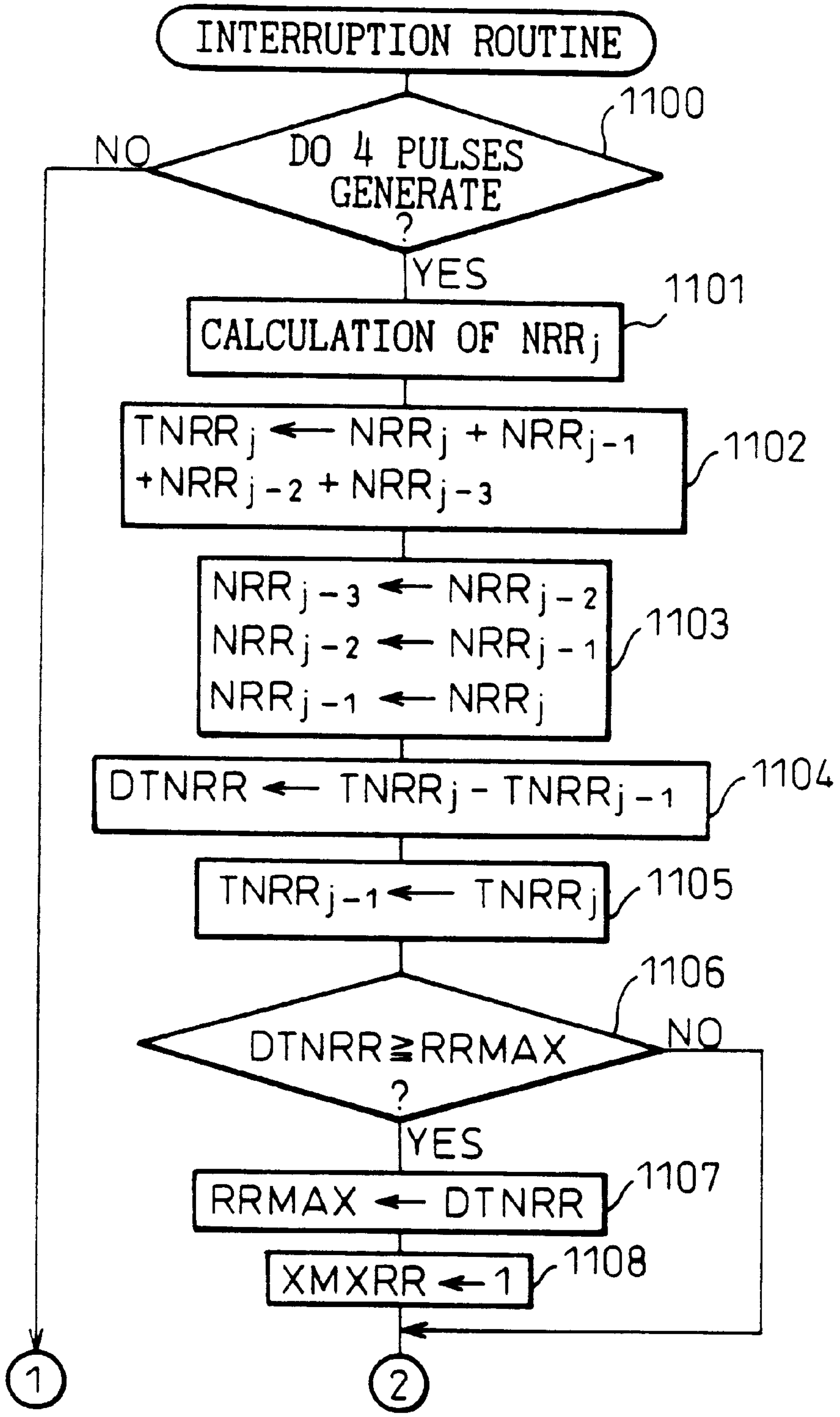
FIGS. 42 to 44 are flow charts of an interruption routine.
Figure 43:
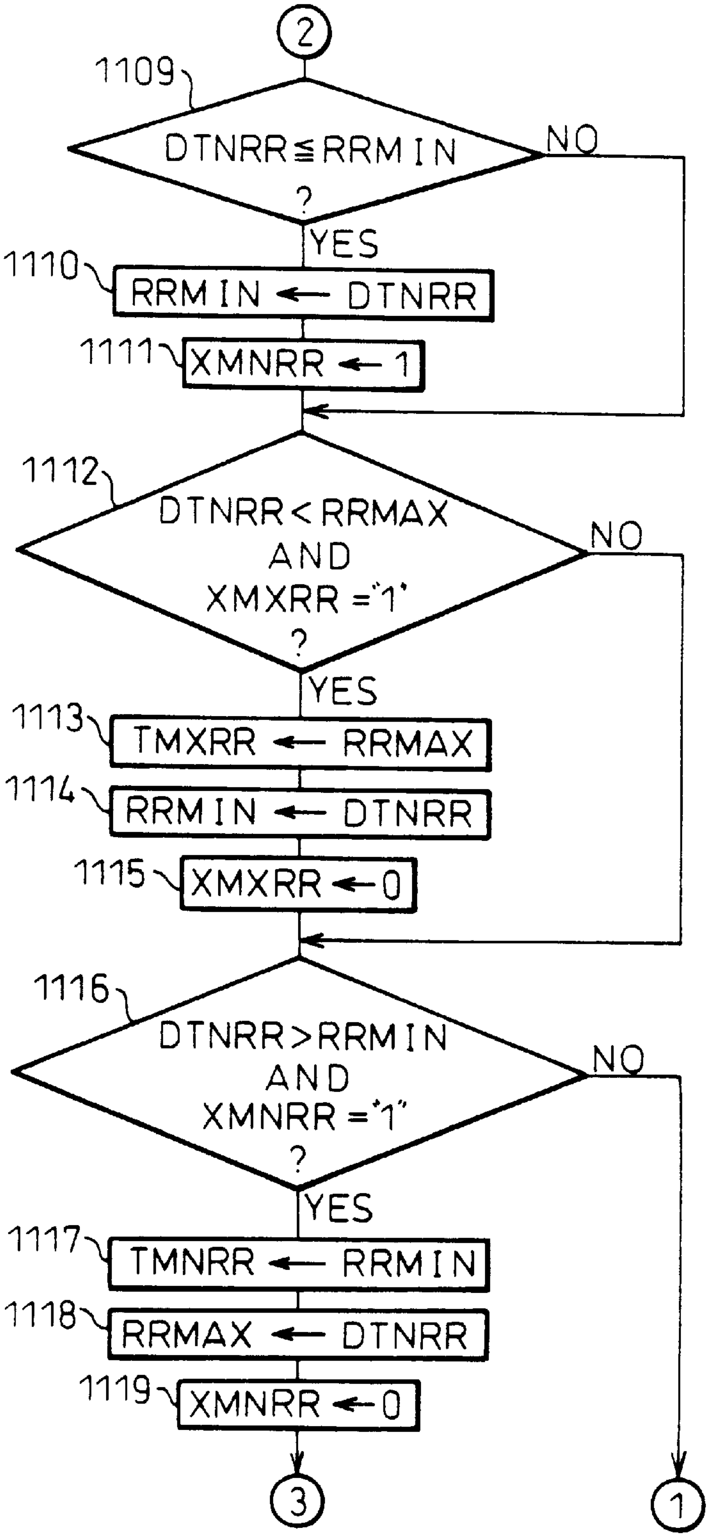
Figure 44:
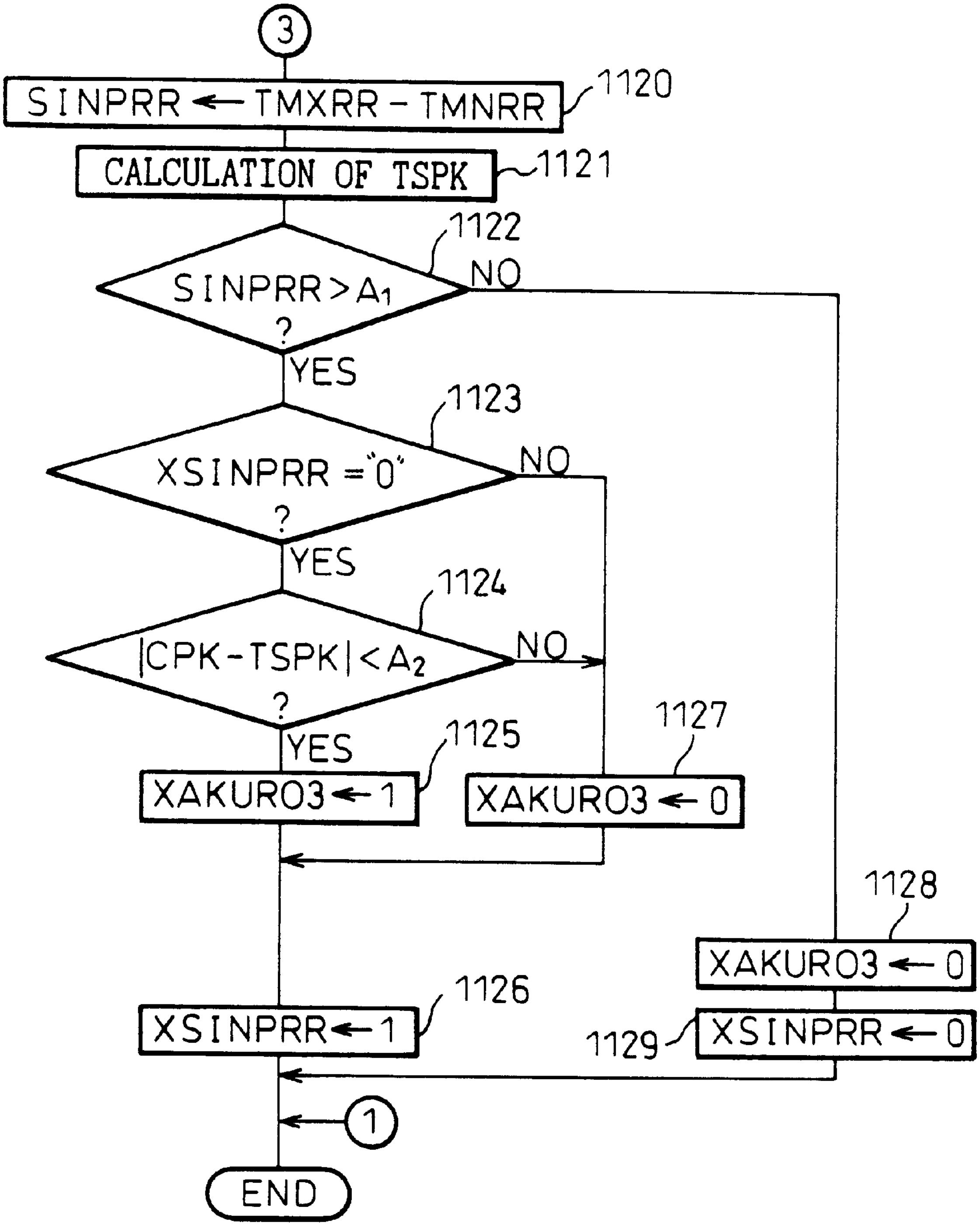

Referring to FIG. 42 to FIG. 44, first, at step 1100, it is judged if four output pulses of the rotational speed sensor 48 have been generated or not. When four output pulses have not been generated, the interruption routine is ended, while when four output pulses have been generated, step 1101 is proceeded to.

At step 1101, the elapsed time NRRJ from when the output pulse four pulses before was generated to when the current output pulse is generated is calculated. Next, at step 1102, the time $TNRR_j$ ($NRR_j+NRR_{j-1}+NRR_{j-2}+NRR_{j-3}$) required for the rear wheels 45 to rotate by 360 degrees up to then is calculated. Next, at step 1103, $NRR_{j-2}$ is made $NRR_{j-3}$, $NRR_{j-1}$ to $NRR_{j-2}$, and $NRR_j$ to $NRR_{j-1}$. Next, at step 1104, the previously calculated elapsed time $TNRR_{j-1}$ is subtracted from the currently calculated elapsed time $TNRR_j$ to calculate the difference of elapsed times DTNRR. Next, at step 1105, $TNRR_j$ is made $TNRR_{j-1}$.

Next, at step 1106, it is judged if the currently calculated DTNRR is more than RRMAX or not. When DTNRR<RRMAX, step 1109 is jumped to, while when DTNRR≧RRMAX, step 1107 is proceeded to, where the currently calculated DTNRR is made RRMAX. Next, at step 1108, the increase flag XMXRR showing that DTNRR is increasing is set (XMXRR="1"). Next, step 1109 is proceeded to. At step 1109, it is judged if the currently calculated DTNRR is less than RRMIN or not. When DTNRR>RRMIN, step 1112 is jumped to, while when DTNRR<RRMIN, step 1110 is proceeded to, where the currently calculated DTNRR is made RRMIN. Next, at step 1111, the decrease flag XMNRR showing that DTNRR is decreasing is set (XMNRR="1"). Next, step 1112 is proceeded to.

At step 1112, it is judged if the currently calculated DTNRR is smaller than RRMAX and if the increase flag XMXRR is set or not. When DTNRR≧RRMAX or the increase flag XMXRR is reset (XMXRR="0"), step 1116 is jumped to, while when DTNRR<RRMAX and XMXRR is set, step 1113 is proceeded to, where RRMAX is made the maximum RRMAX when DTNRR increases and then decreases. That is, in the previous interruption routine, the XMXRR is set, that is, DTNRR is increasing, while in the current interruption routine, DTNRR<RRMAX, that is, DTNRR is decreasing. Accordingly, step 1113 is proceeded to when DTNRR changes from an increase to a decrease. Next, at step 1114, the initial value of RRMIN is made the currently calculated DTNRR. Next, at step 1115, the increase flag XMXRR is reset. Next, step 1116 is proceeded to.

At step 1116, it is judged if the currently calculated DTNRR is larger than RRMIN and the decrease flag XMNRR is set. When DTNRR>RRMIN or the decrease flag XMNRR is reset (XMNRR="0"), the interruption routine is ended. When DTNRR>RRMIN and XMNRR is set, step 1117 is proceeded to, where RRMIN is made the minimum value RRMIN when DTNRR decreases and then increases. That is, in the previous interruption routine, XMNRR is reset, that is, DTNRR is decreasing, while in the current interruption routine, DTNRR>RRMIN, that is, DTNRR is increasing. Therefore, step 1117 is proceeded to when DTNRR changes from a decrease to an increase. Next, at step 1118, the initial value of RRMAX is made the currently calculated DTNRR. Next, at step 1119, the decrease flag XMNRR is reset.

Next, at step 1120, the minimum value TMNRR is subtracted from the maximum value TMXRR to calculate the amplitude SINPRR of DTNRR. Next, at step 1121, the assumed elapsed time TSPK is calculated from the following equation:

$$TSPK=K_0 \cdot WB/SPD$$

Next, at step 1122, it is judged if SINPRR is larger than the set value $A_1$. When SINPRR>$A_1$, step 1123 is proceeded to, where it is judged if the peak flag XSINPRR which is set when SINPRR is larger than $A_1$ is set (XSINPRR="1") is reset (XSINPRR="0"). When the peak flag XSINPRR is reset, step 1124 is proceeded to, where it is judged if the absolute value (|CPK−TSPK|) of the difference between the current count value CPK showing the actual elapsed time and the assumed elapsed time TSPK is smaller than the small set value $A_2$. When |CPK−TSPK|<$A_2$, that is, when CPK and TSPK are substantially equal, step 1125 is proceeded to, where the rough road judgement flag XAKURO3 which is set when it is judged that the vehicle is driving over a single depression or bump (XAKURO3 "1") is set. Next, step 1126 is proceeded to, where XSINPRR is set. As opposed to this, when |CPK−TSPK|≧$A_2$ at step 1124, step 1127 is proceeded to, where XAKURO3 is reset (XAKURO3="0"), then step 1126 is proceeded to.

That is, when step 1124 is proceeded to, in the previous interruption routine, XSINPRR is reset, that is XSINPRR≦$A_1$, while in the current interruption routine, SINPRR>$A_1$. That is, each time the peak value of DTNRR occurs, it is judged if the vehicle is driving over a single depression or bump.

On the other hand, when SINPRR≦$A_1$, at step 1122, step 1128 is proceeded to, where XAKURO3 is reset, then step 1129 is proceeded to, where XSINPRR is reset.

Figure 45:
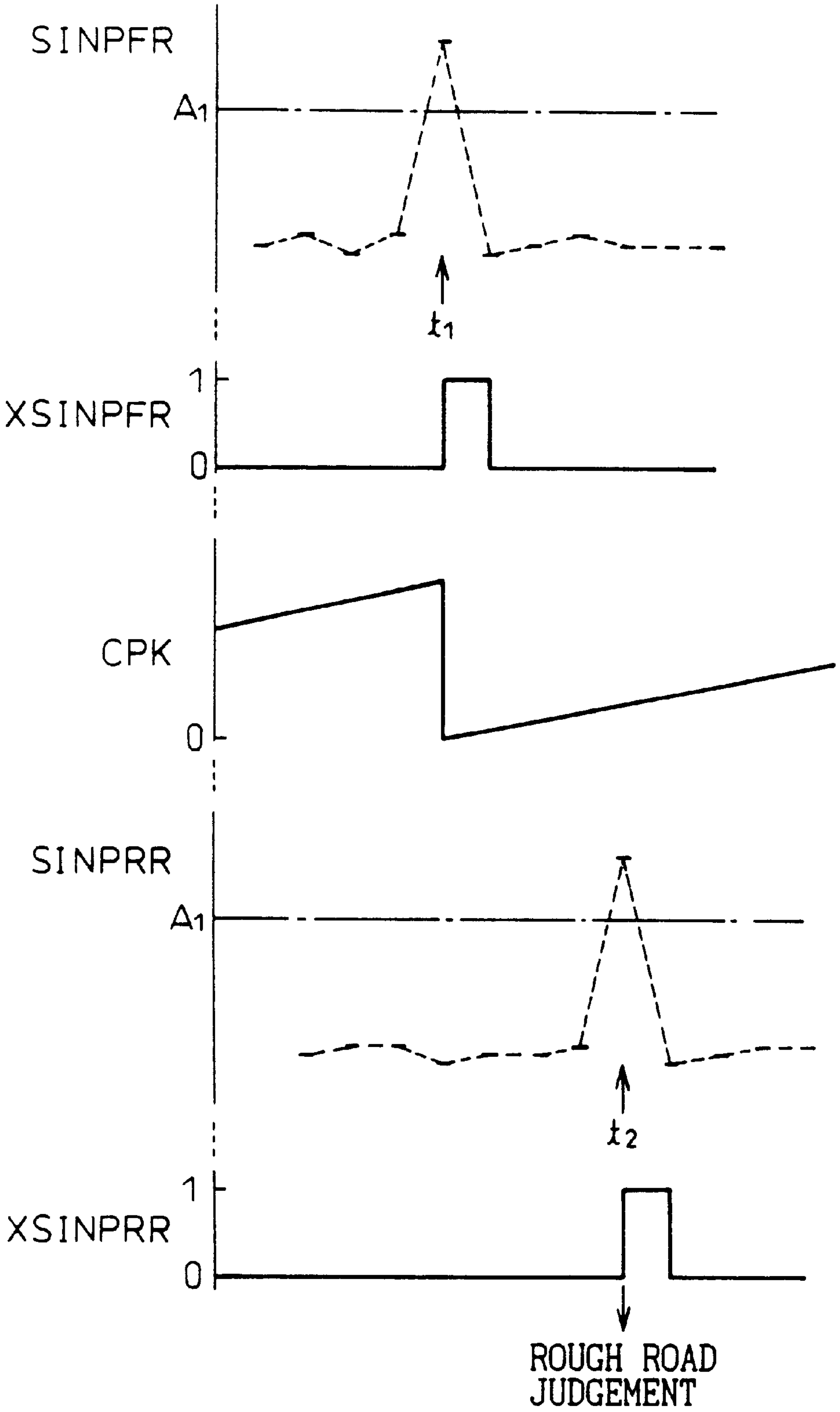
FIG. 45 is a time chart for explaining a third judgement of a rough road.

That is, as shown in FIG. 45, in the interruption routine performed at the time $t_1$, when SINPFR becomes larger than $A_1$, XSINPFR is set, CPK is cleared, and the incrementing is started from zero. Next, in the interruption routine performed at the time $t_2$, if SINPRR becomes larger than $A_1$, XSINPRR is set. At this time, a rough road judgement is made.

Figure 46:
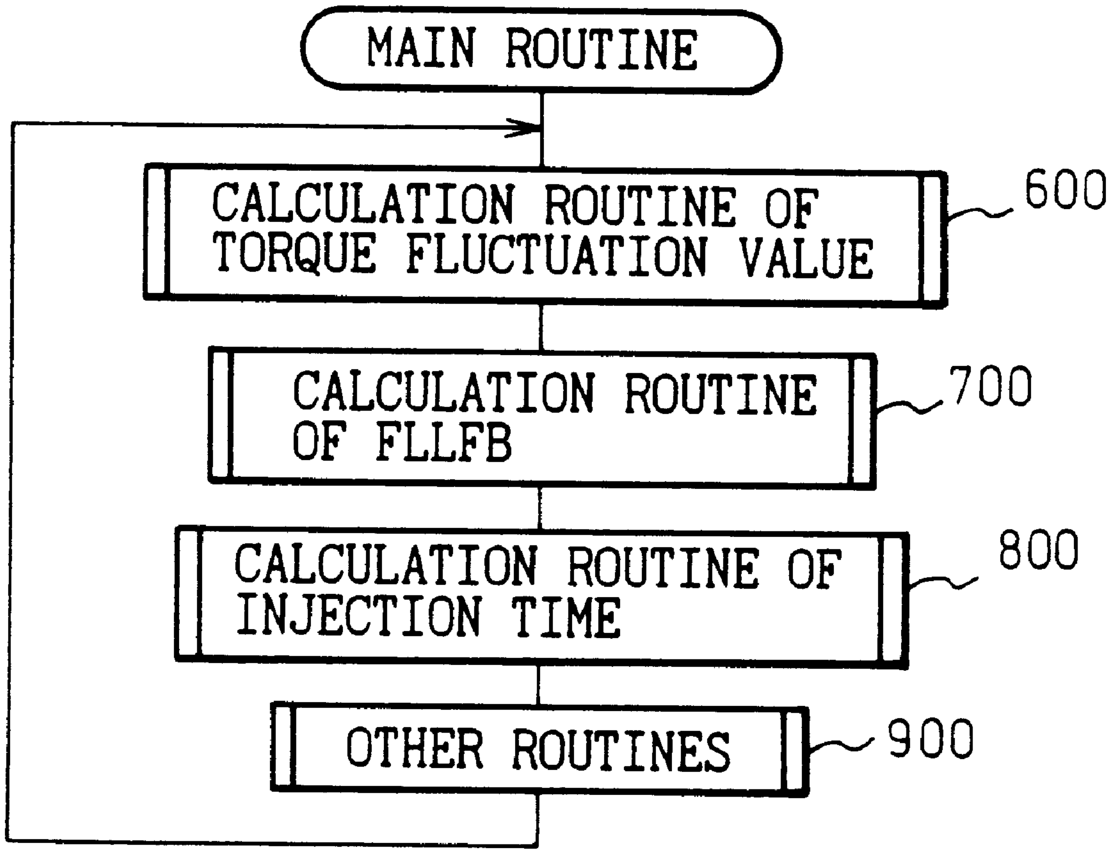
FIG. 46 is a flow chart of a main routine.
Figure 47:
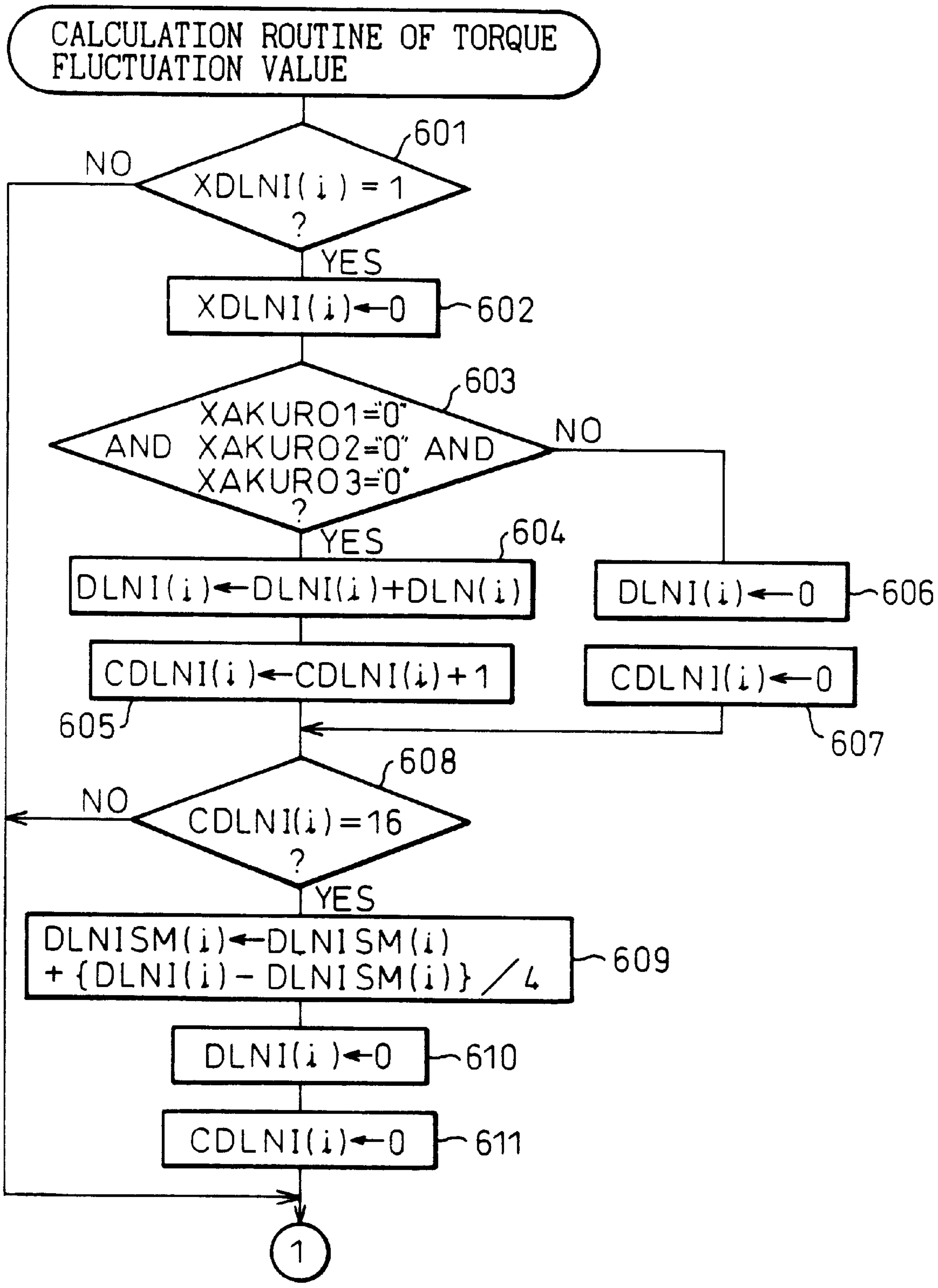
FIGS. 47 and 48 are flow charts of the calculation of the torque fluctuation value.
Figure 48:
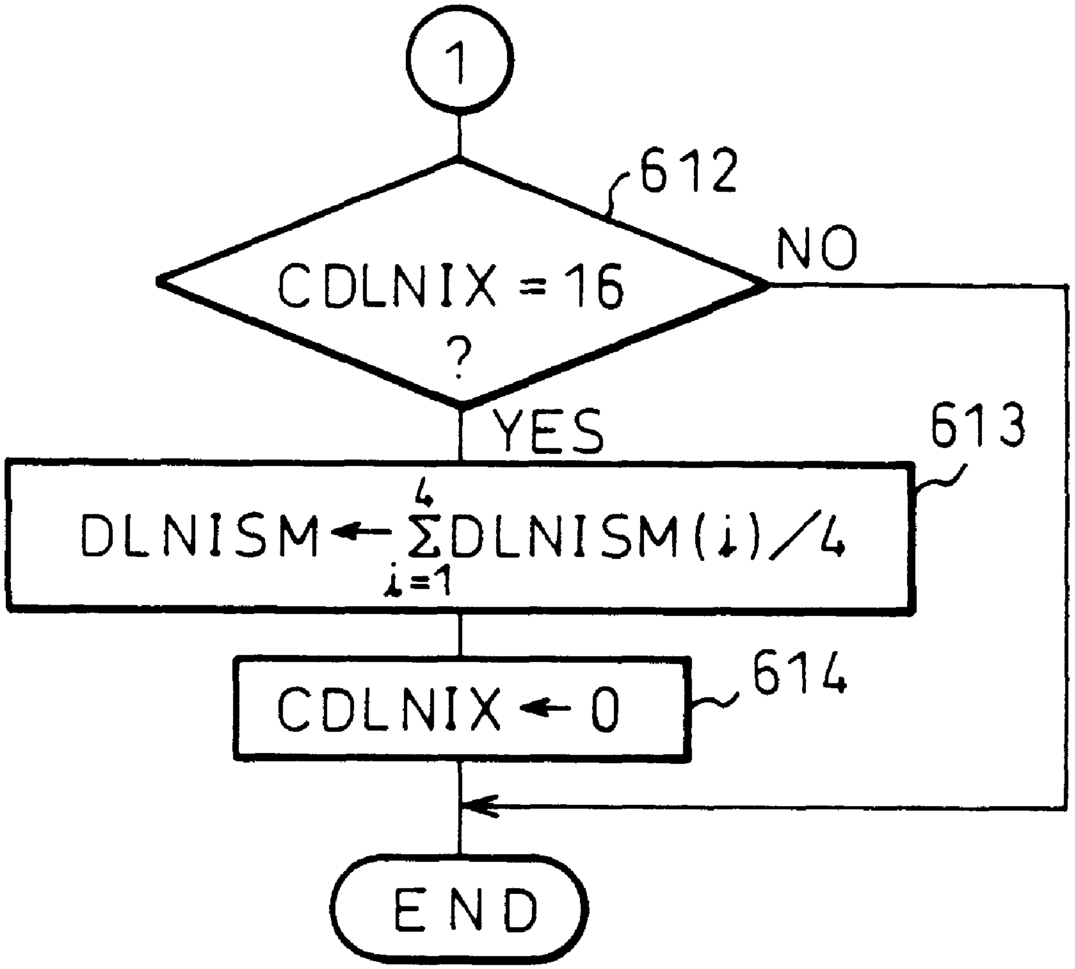
Figure 49:
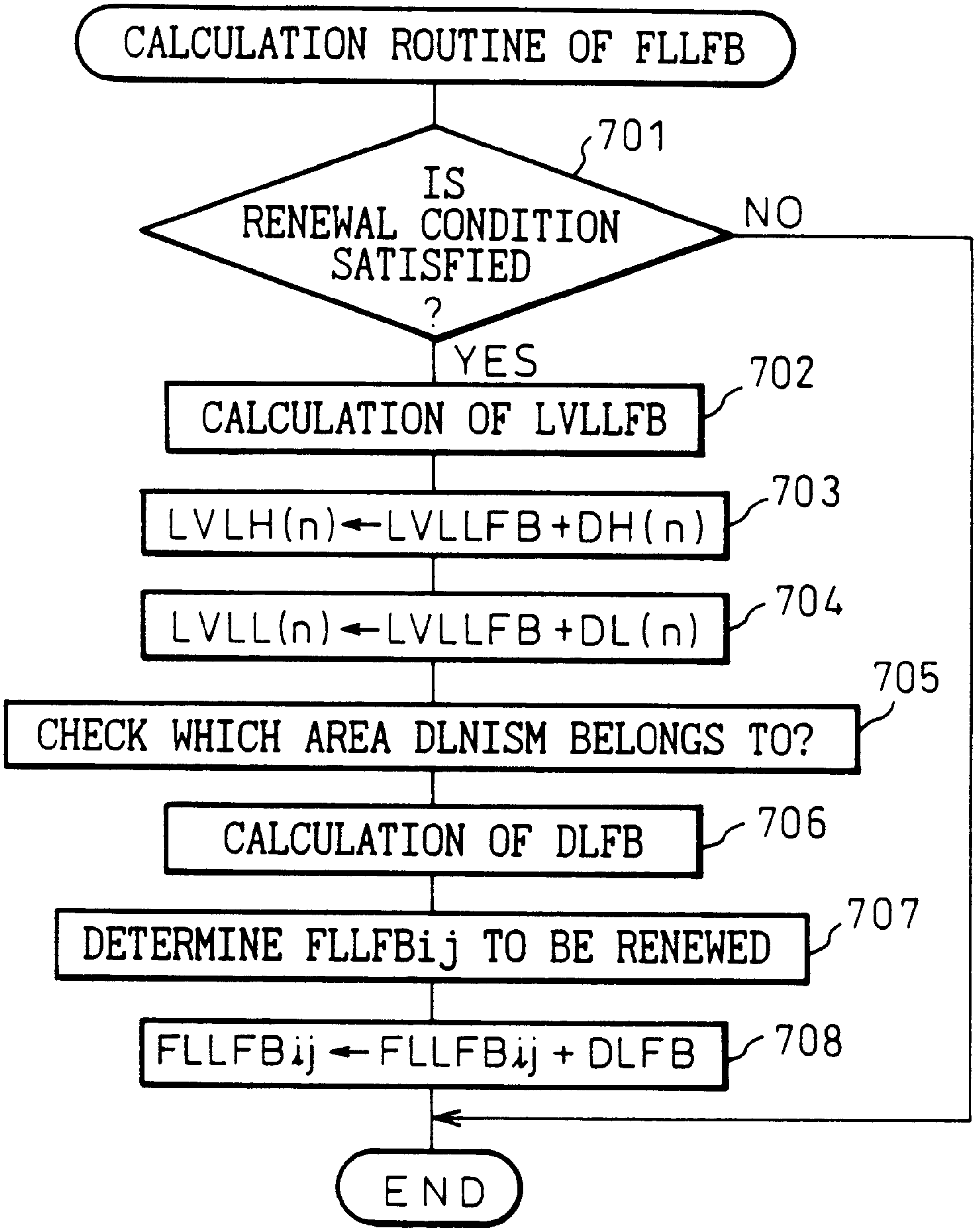
FIG. 49 is a flow chart of the calculation of a lean limit feedback correction coefficient.
Figure 51:
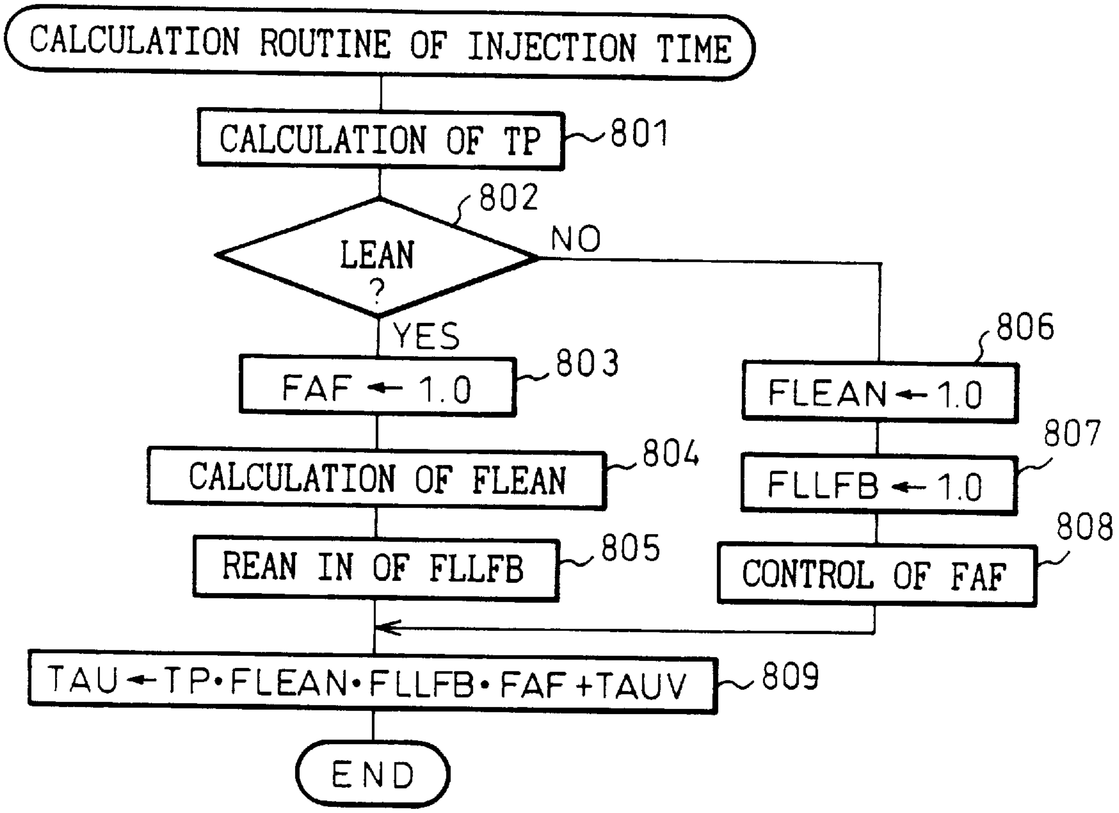
FIG. 51 is a flow chart of the calculation of the fuel injection time.

FIG. 46 shows the repeatedly executed main routine. In this main routine, first the routine for calculation of the torque fluctuation value (step 600) is executed. This routine is shown in FIG. 47 and FIG. 48. Next, the routine for calculation of the lean limit feedback correction coefficient FLLFB (step 700) is executed. This routine is shown in FIG. 49. Next, when the predetermined crank angle is reached, the routine for calculation of the fuel injection time (step 800) is executed. This routine is shown in FIG. 51. Next, the other routines (step 900) are executed.

Next, the routine for calculation of the torque fluctuation value shown in FIG. 47 and FIG. 48 will be explained.

Referring to FIG. 47 and FIG. 48, first, at step 601, whether the cumulative addition request flag XDLN(i) showing that the amount of torque fluctuation DLN(i) should be cumulatively added is set (XDLN(i)="1") or not is judged. When the cumulative addition request flag XDLN (i) is not set, step 612 is jumped to, while when the cumulative addition request flag XDLN(i) is set, step 602 is proceeded to. At step 602, the cumulative addition request flag XDLN(i) is reset. Next, at step 603, it is judged if the three rough road judgement flags XAKURO1, XAKURO2, and XAKURO3 have all been reset. When the rough road judgement flags XAKURO1, XAKURO2, and XAKURO3 have all been reset, that is, when it is judged that the vehicle is driving over a rough road, step 604 is proceeded to. Next, at step 604, the amount of torque fluctuation DLN(i) is added to the cumulative value DLNI(i) of the amount of torque fluctuation. Next, at step 605, the cumulative count value CDLNI(i) is incremented by exactly 1. Next, step 608 is proceeded to. As opposed to this, when one of the rough road judgement flags XAKURO1, XAKURO2, and XAKURO3 is set, that is, when it is judged that the vehicle is driving over a rough road, step 606 is proceeded to, where the cumulative value DLNI(i) of the torque fluctuation is cleared, then step 607 is proceeded to, where the cumulative count value CDLNI(i) is cleared. Next, step 608 is proceeded to.

That is, for example, at step 601, if the cumulative addition request flag CDLN(L) is set for the No. 1 cylinder, this flag XDLN(1) is reset at step 602. At this time, when the rough road judgement flags XAKURO1, XAKURO2, and XAKURO3 have all been reset, the cumulative value DLNI (1) or the amount of torque fluctuation is calculated at step 604, and the cumulative count value CDLNI(1) is incremented by exactly 1 at step 605. When one of the rough road judgement flags is set, DLNI(1) is cleared at step 606 and CDLNI(1) is cleared at step 607.

Next, at step 608, whether the cumulative count value CDLNI(i) has become "16" or not is judged. When CDLNI (i) is not "16", step 612 is jumped to, while when CDLNI(i) becomes "16", step 609 is proceeded to, where the torque fluctuation value DLNISM(i) of the cylinders is calculated from the following equation:

$$DLNISM(i)=DLNISM(i)+\{DLNI(i)-DLNISM(i)\}/4$$

Next, at step 610, the cumulative value DLNI(i) of the amount of torque fluctuation for the cylinders is cleared. Next, at step 611, the cumulative count value CDLNI(i) is reset.

That is, when there is a difference between the calculated cumulative value DLNI(i) of the amount of torque fluctuation and the previously used amount of torque fluctuation DLNISM(i), the value of the difference {DLNI(i)−DLNISM (i)} multiplied by ¼ is added to the amount of torque fluctuation DLNISM(i). Therefore, for example, when the cumulative count value CDLNI(1) for the No. 1 cylinder #1 becomes "16", at step 609, the torque fluctuation value DLNISM(1) is calculated.

Next, at step 612, whether the count value CDLNIX calculated at the routine shown in FIG. 24 has become "16" or not is judged. When CDLNIX is not "16", the processing cycle is ended, while when CDLNIX becomes "16", step 613 is proceeded to, where the mean value DLNISM (={DLNISM(1)+DLNISM(2)+DLNISM(3)+DLNISM(4)}/4) of the mean torque fluctuation values DLNISM (i) of the cylinders is calculated. Next, at step 614, the count value CDLNIX is cleared. In this way, the value DLNISM expressing the amount of torque fluctuation of the engine is calculated.

Note that when the cumulative count value CDLNI(i) is cleared at step 607, the routine jumps from step 608 to step 612, that is, step 609 is not proceeded to. In other words, when one of the rough road judgement flags XAKURO1, XAKURO2, and XAKURO3 is set, the torque fluctuation value DLNISM(i) of the cylinders is not updated. Therefore, in this case, the torque fluctuation value DLNISM(i) is held at the torque fluctuation value DLNISM(i) used up to now. As a result, when the rough road judgement flags are once again all reset, at step 609, the updating of the torque fluctuation value DLNISM(i) is resumed based on the torque fluctuation value held up to now, that is, the torque fluctuation value DLNISM(i) just before one of the rough road judgement flags was set. If this is done, then it is possible to accurately calculate the torque fluctuation value DLNISM(i) calculated when the updating of the torque fluctuation value DLNISM(i) is resumed. Therefore, at this time, it is possible to accurately calculate the average torque fluctuation value DLNISM.

Further, as explained above, the count value CDLNIX is incremented by exactly 1 with each 720° crank angle.

Unless the calculation of the torque is prohibited for one of the cylinders, when the count value CDLNIX has become "16", the cumulative count values CDLNI(1), CDLNI(2), CDLNI(3), and CDLNI(4) for all of the cylinders have already become "16". Therefore, in this case, the torque fluctuation value DLNISM(i) for all of the cylinders is calculated. On the other hand, for example, if the calculation of the amount of torque fluctuation for the No. 1 cylinder #1 is prohibited, when the count value CDLNIX has become "16", just the cumulative count value CDLNI(1) of the No. 1 cylinder #1 does not become "16", so the new cumulative value DLNI(1) of the amount of torque fluctuation for the No. 1 cylinder #1 is not calculated. Therefore, in this case, when finding the mean torque fluctuation value DLNISM at step 610, the previously calculated torque fluctuation value DLNISM(1) is used just for the No. 1 cylinder #1.

Next, the routine for calculation of FLLFB will be explained referring to FIG. 49.

Referring to FIG. 49, first, at step 701, whether the conditions for updating the lean limit feedback correction coefficient FLLFB are satisfied or not is judged. For example, at the time of engine warmup or when the operating state of the engine is not in the learning region enclosed by the broken lines in FIG. 5, it is judged that the conditions for updating are not satisfied, while at other times it is judged that the conditions for updating are satisfied. When the conditions for updating are not satisfied, the processing cycle is ended, while when the conditions for updating are satisfied, step 702 is proceeded to.

Figure 26B:
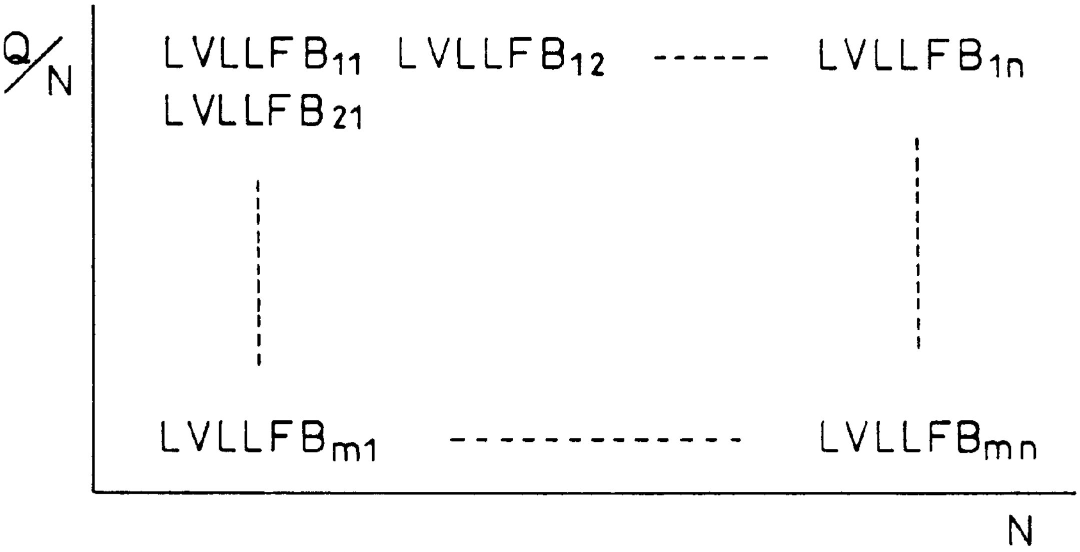

At step 702, the target torque fluctuation value LVLLFB is calculated from the engine load Q/N and the engine speed N based on the map shown in FIG. 26B. Next, at step 703 and step 704, the levels of torque fluctuation LVLH(n) and LVLL(n) shown in the following equations are calculated based on the fluctuation amount judgement values DH(n) and DL(n) in accordance with the target torque fluctuation value LVLLFB:

$$LVLH(n)=LVLLFB+DH(n)$$

$$LVLL(n)=LVLLFB+DL(n)$$

Figure 50A:
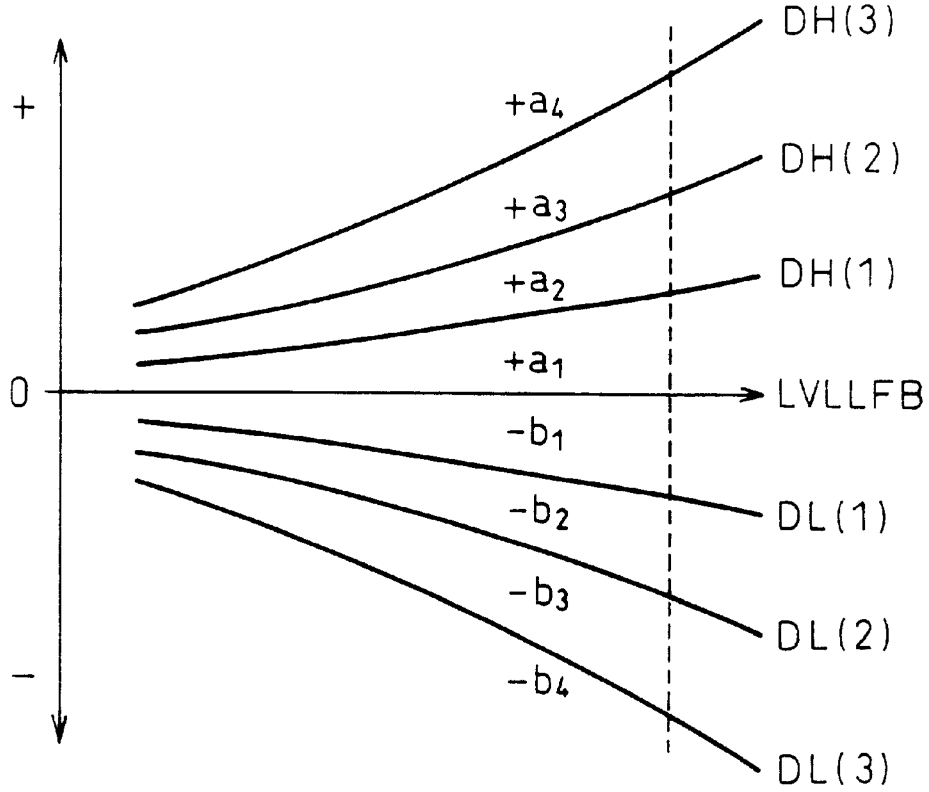
FIGS. 50A and 50B are views of the fluctuation amount judgement, values DH(n) and DL(n) and the levels of torque fluctuation LVLH(n) and LVLL(n)

Here, the fluctuation amount judgement values DH(n) and DL(n) are determined in advance as shown in FIG. 50A. That is, as will be understood from FIG. 50A, three positive values are set for DH(n) which are in the relationship of DH(3)>DH(2)>DH(1). Further, these DH(1), DH(2), and DH(3) gradually increase as the target torque fluctuation value LVLLFB becomes larger. On the other hand, three negative values are set for DL(n) which are in the relationship of DL(1)>DL(2)>DL(3). Further, the absolute values of these DL(1), DL(2), and DL(3) gradually increase as the target torque fluctuation value LVLLFB becomes larger.

Assume however that the target torque fluctuation value LVLLFB calculated at step 702 is the value shown by the broken line. In this case, at step 703, the values of DH(1), DH(2), and DH(3) on the broken line plus the target torque fluctuation value LVLLFB are made the levels of torque fluctuation LVLH(1), LVLH(2), and LVLH(3) and, at step 704, the values of DL(1), DL(2), and DL(3) on the broken line plus the target torque fluctuation value LVLLFB are made the levels of torque fluctuation LVLL(1), LVLL(2), and LVLL(3).

Figure 50B:
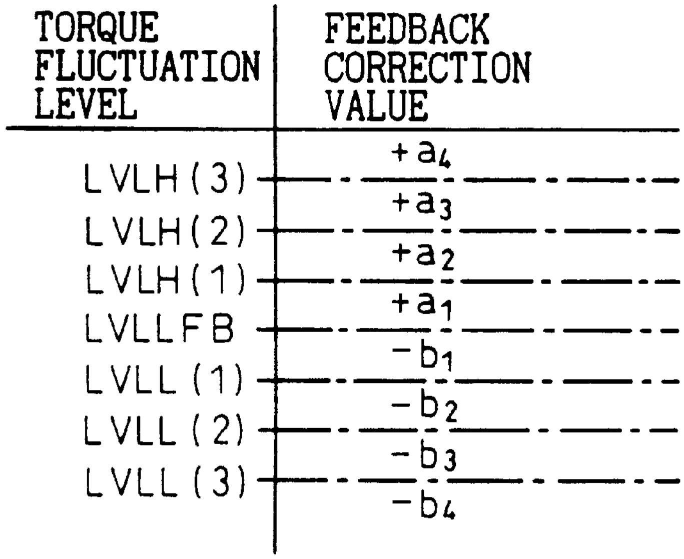

On the other hand, the feedback correction values $+a_1$, $+a_2$, $+a_3$, $+a_4$, $-b_1$, $-b_2$, $-b_3$, and $-b_4$ are determined in advance for the regions between the levels of torque fluctuation LVLH(n) and LVLL(n) as shown in FIG. 50B. For example, the feedback correction value becomes $+a_2$ for the region where the level of torque fluctuation is between LVLH(1) and LVLH(2). These feedback correction values are $+a_4>+a_3>+a_2>+a_1$ and $-b_1>-b_2>-b_3>-b_4$. The feedback correction values $+a_1$, $+a_2$, $+a_3$, $+a_4$, $-b_1$, $b_2$, $-b_3$, and $-b_4$ shown in FIG. 50B are shown in the corresponding regions of FIG. 50A.

When the levels of torque fluctuation LVLH(n) and LVLL (n) are calculated at step 703 and step 704, step 705 is proceeded to, where whether the mean torque fluctuation value DLNISM calculated in the routine for calculation of the torque fluctuation value shown in FIG. 47 and FIG. 48 is between the levels of torque fluctuation LVLH(n) and LVLL(n) shown in FIG. 50B or not is judged. Next, at step

706, the corresponding feedback correction value DLFB is calculated. For example, when the target fluctuation level LVLLFB is the value shown by the broken line in FIG. 50A and the calculated mean torque fluctuation value DLNISM is between LVLH(1) and LVLH(2) of FIG. 50B, that is the deviation of the mean torque fluctuation value DLNISM from the target fluctuation level LVLLFB is between DH(1) and DH(2) on the broken line in FIG. 50A, the feedback correction value DLFB is made $+a_2$.

Next, at step 707, what lean limit feedback correction coefficient of which learning region shown in FIG. 24 the lean limit feedback correction coefficient FLLBFiNT1O to be updated based on the average value of the engine speed $N_{AVE}$ and the average value $PM_{AVE}$ of the amount of intake air Q found at step 409 of the processing routine of CDLNIX shown in FIG. 24 is determined. Next, at step 708, the lean limit feedback correction coefficient $FLLFB_{ij}$ determined at step 707 is increased by the feedback correction value DLFB.

That is, as explained above, when for example, DLNISM>LVLLFB and LVLH(1)<DLNISM<LVLH(2), the lean limit feedback correction coefficient $FLLFB_{ij}$ is increased by $+a_2$. As a result, the air-fuel ratio becomes smaller, so the amount of torque fluctuation of each cylinder is reduced. On the other hand, when DLNISM<LVLLFB and LVLL(1)>DLNISM>LVLL(2), the lean limit feedback correction coefficient $FLLFB_{ij}$ is increased by $-b_2$. As a result, the air-fuel ratio becomes large, so the amount of torque fluctuation of the cylinders is increased. In this way the air-fuel ratio at the time of lean operation is controlled so that the mean torque fluctuation value DLNISM of all of the cylinders becomes the target torque fluctuation value LVLLFB.

Note that, when the conditions for calculation of the torque fluctuation value in the routine shown in FIG. 24 are not satisfied, at step 407, the DLNISM(i) for all of the cylinders is made LVLLFB and therefore the mean torque fluctuation value DLNISM is also made the target torque fluctuation value LVLLFB. Therefore, at this time, the lean limit feedback correction coefficient $FLLFB_{ij}$ is not updated.

On the other hand, as explained above, when the rough road judgement flags XAKURO1, XAKURO2, and XAKURO3 have all once again been reset, that is, when it is judged once again that the vehicle is not driving over a rough road, the average torque fluctuation value DLNISM is made the DLNISM just before it is judged that the vehicle is driving over a rough road, therefore when the rough road judgement flags are once again all reset, the feedback correction value DLFB is calculated based on the DLNISM. As a result, when the correction of the air-fuel ratio is resumed, it is possible to accurately calculate the feedback correction value DLFB and therefore it is possible to accurately control the average torque fluctuation value to the target torque fluctuation value.

Next, the routine for calculation of the fuel injection time will be explained with reference to FIG. 51.

Figure 2:
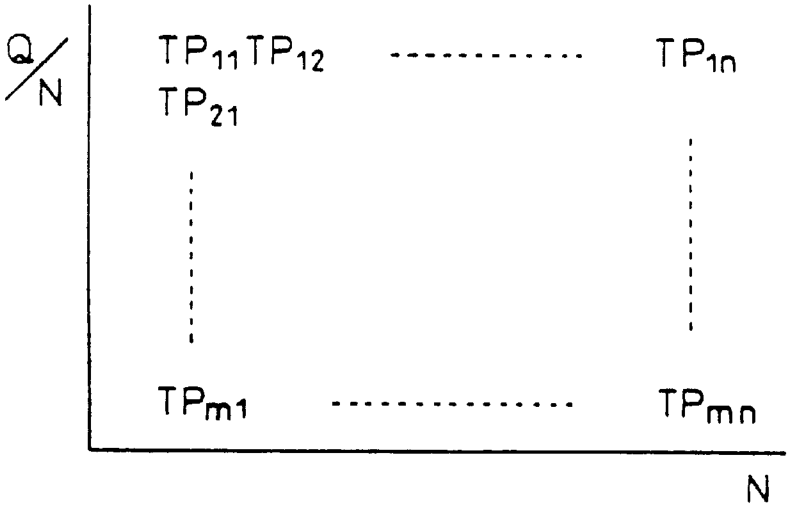
FIG. 2 is a view of a map of the basic fuel injection time.

Referring to FIG. 51, first, at step 801, the basic fuel injection time TP is calculated from the map shown in FIG. 2. Next, at step 802, whether the operating state is one in which a lean operation should be performed or not is judged. When the operating state is one in which a lean operation should be performed, step 803 is proceeded to, where the value of the stoichiometric air-fuel ratio feedback correction coefficient FAF is fixed at 1.0. Next, at step 804, the lean correction coefficient FLEAN is calculated from the map shown in FIG. 4, then at step 805, the lean limit feedback correction coefficient FLLFB is read from the map shown in FIG. 5. Next, at step 809, the fuel injection time TAU is calculated from the following equation:

$$TAU=TP\cdot FLEAN\cdot FLLFB\cdot FAF+TAUV$$

As opposed to this, when it is judged at step 802 that the operating state is not one where a lean operation should be performed, that is, when the air-fuel ratio should be made the stoichiometric air-fuel ratio, step 806 is proceeded to, where the lean correction coefficient FLEAN is fixed at 1.0, then, at step 807, the is lean limit feedback correction coefficient FLLFB is fixed at 1.0. Next, at step 808, the stoichiometric air-fuel ratio feedback correction coefficient FAF is controlled based on the output signal of the air-fuel ratio sensor 17 so that the air-fuel ratio becomes the stoichiometric air-fuel ratio. Next, step 809 is proceeded to, where the fuel injection time TAU is calculated.

In the embodiments discussed up to here, the rotational speed of the turbine runner 37 of the torque converter 32 is detected for detecting the vehicle speed. To detect the vehicle speed, however, for example, it is possible to detect the rotational speed of the output shaft 31 of the automatic transmission 30 or the axles or drive wheels rotating with the same.

Further, in the embodiments discussed up to here, whether the lockup mechanism is on or off, it is judged that the vehicle is driving over a rough road based on the fluctuations of the rotational speed of the turbine runner 37. When the lockup mechanism is on, that is, when the crankshaft and the input shaft 36 of the automatic transmission 30 are directly connected, the external force acting on the drive wheels is transmitted directly to the crankshaft. Therefore, when the lockup mechanism is on, it is also possible to judge if the vehicle is driving over a rough road based on the angular velocity of the crankshaft. However, when the vehicle is driving over a small depression/bump road, the cycle of the fluctuation becomes extremely short. Therefore, in this case, it is necessary to detect the angular velocity of the crankshaft over about 360° crank angle.

Further, to find the true output fluctuation or torque fluctuation of the engine, it is possible to correct the torsional vibration of the engine drive system or crankshaft itself or the effects of the variation of the spaces between the outer teeth of the rotor 14 in any way.

In this way, according to the present invention, it becomes possible to prevent erroneous correction of the air-fuel ratio when the vehicle is driving over a rough road.

While the invention has been described by reference to specific embodiments chosen for purposes of illustration, it should be apparent that numerous modifications could be made thereto by those skilled in the art without departing from the basic concept and scope of the invention.

What is claimed is:

1. A method of control of an air-fuel ratio in an engine, comprising the steps of:
   - setting a first crank angle range in a crank angle region from the end of a compression stroke to the beginning of an expansion stroke,
   - detecting a first angular velocity of the crankshaft in the first crank angle range,
   - setting a second crank angle range in a crank angle region in the middle of the expansion stroke a predetermined crank angle away from the first crank angle range,
   - detecting a second angular velocity of the crankshaft in the second crank angle range, finding the output fluctuation of the cylinders based on the first angular velocity and the second angular velocity, judging whether the vehicle is driving over a rough road from the elapsed time from when a peak value of fluctuation of the rotational speed of a vehicle's front wheels occurs to when a peak value of fluctuation of the rotational speed of the vehicle's rear wheels occurs and from the vehicle speed, and prohibiting the correction of the air-fuel ratio based on the output fluctuation when it is judged that the vehicle is driving over a rough road.

2. A method as set forth in claim 1, wherein an actual elapsed time from when the peak value of fluctuation of the rotational speed of the vehicle's front wheels occurs to when a peak value of fluctuation of the rotational speed of the vehicle's rear wheels occurs is detected, an assumed elapsed time from when a peak value of fluctuation of the rotational speed of the vehicle's front wheels assuming that the vehicle is driving over a rough road occurs to when a peak value of fluctuation of the rotational speed of the vehicle's rear wheels occurs is found based on the vehicle speed, and it is judged that the vehicle is driving over a rough road when the actual elapsed time and the assumed elapsed time are substantially equal.

3. A method as set forth in claim 2, wherein an assumed elapsed time is a time required for the vehicle to drive by the wheel base of the vehicle.

4. A method as set forth in claim 1, wherein an amplitude of fluctuation of the rotational speed of the vehicle's front wheels is found, it is judged that a peak value's of the fluctuation of the rotational speed of the vehicle's front wheels has occurred when the amplitude is larger than a predetermined first set value, an amplitude of the fluctuation of the rotational speed of the vehicle's rear wheels is found, and it is judged that a peak value of the fluctuation of the rotational speed of the vehicle's rear wheels has occurred when the amplitude is larger than a predetermined second set value.

5. A method as set forth in claim 1, wherein the average value of the output fluctuation is found and correction of the air-fuel ratio based on the average value is prohibited when it is judged that the vehicle is driving over a rough road.

6. A method as set forth in claim 5, wherein the air-fuel ratio is corrected based on the average value of the output fluctuation when it is judged that the vehicle is not driving over a rough road.

7. A method as set forth in claim 6, wherein the average value of the output fluctuation when it is judged that the vehicle is not driving over a rough road is stored and the correction of the air-fuel ratio is resumed based on the stored average value of the output fluctuation when the prohibition of the correction of the air-fuel ratio is lifted due to it being judged that the vehicle is not driving over a rough road.

8. A method as set forth in claim 6, wherein the air-fuel ratio is corrected so that the average value of the output fluctuation is in a predetermined range.

9. A method as set forth in claim 1, wherein the amount of output torque fluctuation is found from the first angular velocity and the second angular velocity and correction of the air-fuel ratio based on the amount of output torque fluctuation is prohibited when it is judged that the vehicle is driving on a rough road.

10. A method as set forth in claim 1, wherein combustion is performed at a first cylinder and then combustion is performed at a second cylinder, the amount of change between the first angular velocity at the time of a previous combustion and the first angular velocity at the time of a next combustion for the first cylinder is found, the amount of change between the first angular velocity at the time of a previous combustion and the first angular velocity at the time of a next combustion for the second cylinder is found, an assumed second angular velocity at the time of the next combustion of the first cylinder assuming that the output of the first cylinder does not fluctuate is found based on the amount of change of the first angular velocity of the first cylinder, the amount of change of the first angular velocity of the second cylinder, and the second angular velocity at the time of the previous combustion of the first cylinder, and the output fluctuation of the first cylinder is found based on the actual second angular velocity at the time of the next combustion of the first cylinder and the assumed second angular velocity.

11. A method as set forth in claim 10, wherein the amount of output torque fluctuation of the first cylinder is found from the difference between a square of the actual second angular velocity and a square of the assumed second angular velocity, the amount of the output torque fluctuation is found for each cylinder, the amount of output torque fluctuation of the engine is found from the amount of output torque fluctuation of the cylinders, and the correction of the air-fuel ratio based on the amount of output torque fluctuation of the engine is prohibited when it is judged that the vehicle is driving over a rough road.

* * * * *